(12) United States Patent
Watanabe et al.

(10) Patent No.: US 8,264,727 B2
(45) Date of Patent: Sep. 11, 2012

(54) DATA PROCESSING APPARATUS, METHOD, PROGRAM, AND STORAGE MEDIUM FOR SETTING IDENTIFICATION INFORMATION BASED ON METADATA, AND ADVANTAGEOUSLY DISPLAYING PRINT DATA

(75) Inventors: Akihiro Watanabe, Kanagawa (JP);
Tatsuya Narahara, Kanagawa (JP);
Kensuke Ohnuma, Tokyo (JP)

(73) Assignee: Sony Corporation, Tokyo (JP)

( * ) Notice: Subject to any disclaimer, the term of this patent is extended or adjusted under 35 U.S.C. 154(b) by 1095 days.

(21) Appl. No.: 12/121,274

(22) Filed: May 15, 2008

(65) Prior Publication Data
US 2008/0285081 A1    Nov. 20, 2008

(30) Foreign Application Priority Data

May 15, 2007 (JP) ................ P2007-129365
May 15, 2007 (JP) ................ P2007-129366
Jul. 25, 2007 (JP) ................ P2007-193249

(51) Int. Cl.
G06K 15/00 (2006.01)
G06K 1/00 (2006.01)
G06F 3/12 (2006.01)
G06F 7/00 (2006.01)
H04N 5/445 (2011.01)

(52) U.S. Cl. ...... 358/1.16; 358/1.9; 358/1.11; 358/1.15; 707/602; 725/44; 725/50

(58) Field of Classification Search ................ 358/1.11, 358/1.1, 1.9, 1.15, 1.16, 296; 707/602; 725/44, 725/50, 56
See application file for complete search history.

(56) References Cited

U.S. PATENT DOCUMENTS

2002/0087985 A1    7/2002    Kamen et al.
2007/0005629 A1*   1/2007    Tokuda et al. ............. 707/102

FOREIGN PATENT DOCUMENTS

| EP | 1 624 682 A1 | 8/2006 |
|----|----|----|
| JP | 2002-199294 | 3/1996 |
| JP | 11-261976 | 9/1999 |
| JP | 2002-27416 | 1/2002 |
| JP | 2006-352722 | 7/2002 |
| JP | 2004-133984 | 4/2004 |

(Continued)

OTHER PUBLICATIONS

European Search Report.

Primary Examiner — Thomas Lett
(74) Attorney, Agent, or Firm — Finnegan, Henderson, Farabow, Garrett & Dunner, L.L.P.

(57) ABSTRACT

Disclosed herein is a data processing apparatus that sets identification information for identifying each of a plurality of contents based on metadata added to each of the contents. The apparatus includes: title information acquisition means for acquiring title information of each of the contents, the title information concerning a title of the content and being included in the metadata; information extraction means for comparing the title information of each of the contents to extract a part of the title information that is common to all of the contents; and identification information setting means for setting the identification information of each of the contents based on the other part of the title information than the part of the title information that is common to all of the contents.

19 Claims, 36 Drawing Sheets

FOREIGN PATENT DOCUMENTS

| | | |
|---|---|---|
| JP | 2005-142763 | 6/2005 |
| JP | 2006-50000 | 2/2006 |
| JP | 2006-163710 | 6/2006 |
| JP | 2006-254140 | 9/2006 |
| JP | 2006-309854 | 11/2006 |
| JP | 08-077196 | 12/2006 |
| JP | 2006-352722 | 12/2006 |
| JP | 2007-6300 | 1/2007 |
| WO | WO 02/069641 A1 | 9/2002 |
| WO | WO 2005-041572 | 5/2005 |
| WO | WO 2005/041572 A1 | 5/2005 |
| WO | WO 2007/029348 A1 | 3/2007 |

* cited by examiner

FIG.5

| NO. | KEYWORD | PART OF SPEECH |
|---|---|---|
| 1 | MHK HIGH SCHOOL COURSE | PHRASE |
| 2 |  | DOUBLE SPACE |
| 3 | GENERAL | ADJECTIVE |
| 4 | SCIENCE | NOUN |
| 5 | A | ALPHABET |
| 6 | · | MARK |
| 7 | B | ALPHABET |
| 8 | ' | MARK |
| 9 | MECHANISM | NOUN |
| 10 | OF | PREPOSITION |
| 11 | WEATHER | NOUN |
| 12 | CHANGE | NOUN |
| 13 | ' | MARK |

| 1 | DOUBLE SPACE |
|---|---|
| 2 | ` |
| 3 | ' |
| 4 | \\ |
| 5 | " |
| 6 | ▽ |
| 7 | ／ |
| 8 | : |
| 9 | #1 |

| GROUP 1 | | | GROUP 2 | | | DIFFERENCE | | | |
|---|---|---|---|---|---|---|---|---|---|
| MHK HIGH SCHOOL COURSE | GENERAL | SCIENCE | A | . | B | MECHANISM | OF | WEATHER | CHANGE |
| MHK HIGH SCHOOL COURSE | GENERAL | SCIENCE | A | . | B | LET'S | USE | ELECTRIC | POWER |
| MHK HIGH SCHOOL COURSE | PHYSICS | | WORK | AND | POWER | | | | |
| MHK HIGH SCHOOL COURSE | PHYSICS | | LASHING | WAVES | | | | | |
| MHK SPECIAL | PLANET | BOOTH | VOL. 1 | LIVING | EARTH | | | | |
| MHK SPECIAL | PLANET | BOOTH | VOL. 2 | FRESH WATER | FULL OF | LIVES | | | |

231 — VIVA WORLD CUP 2006 'UK
6/29 (THU) 3:45AM (2H15M)

232 — VIVA WORLD CUP 2006 'BRAZIL' VS
6/27 (TUE) 11:45PM (3H00M)

211 — VIDEO

233 — VIVA WORLD CUP 2006 FINAL
6/26 (MON) 3:10AM (1H50M)

234 — VIVA WORLD CUP 2006
6/23 (FRI) 3:30AM (2H30M)

235 — VIVA WORLD CUP 2006 'JAPAN'
6/18 (SUN) 9:00AM (3H45M)

236 — VIVA WORLD CUP 2006 'SPA
6/14 (WED) 9:50AM (2H10M)

237 — VIVA WORLD CUP 2006 'TUNISI
6/15 (THU) 0:45AM (2H15M)

201

DATA PROCESSING APPARATUS, METHOD, PROGRAM, AND STORAGE MEDIUM FOR SETTING IDENTIFICATION INFORMATION BASED ON METADATA, AND ADVANTAGEOUSLY DISPLAYING PRINT DATA

CROSS REFERENCES TO RELATED APPLICATIONS

The present invention contains subject matter related to Japanese Patent Application JP 2007-193249, JP 2007-129365, and JP 2007-129366 all filed with the Japan Patent Office on Sep. 25, 2007, May 15, 2007, and May 15, 2007, respectively the entire contents of which being incorporated herein by reference.

BACKGROUND OF THE INVENTION

1. Field of the Invention

The present invention relates to a data processing apparatus and method, a program, and a storage medium. In particular, the present invention relates to a data processing apparatus and method, a program, and a storage medium which make it possible to achieve displaying and printing of titles with great convenience to a user.

2. Description of the Related Art

With the recent spread of recorders equipped with a large-capacity storage medium, such as hard disk drive (HDD) recorders, the number of contents which a user is able to record has increased dramatically. In known techniques, when reproducing a large number of recorded contents or the like, a list of content titles is displayed along with thumbnails or the like, for example, so that the user can find his or her desired content quickly.

One technique has been proposed that makes it easier for the user to search for a content even in a large-capacity device in which a large number of contents are recorded. According to this technique, a title list is generated such that programs having the same title are integrated into one, so that the programs having the same title can be reproduced in succession (see Japanese Patent Laid-open No. 2004-133984, for example).

SUMMARY OF THE INVENTION

In the case where there are a large number of recorded contents, displaying of the list of content titles according to known techniques does not provide a great convenience to the user. For example, the user may be demanded to search for his or her desired content while scrolling across the displayed list of content titles sequentially.

In order to facilitate the search for the desired content, it is conceivable to group the contents by broadcast channel, genre, or the like, and create different folders for different broadcast channels, genres, or the like, so that each group of contents are stored in the corresponding one of the folders. This method does not, however, facilitate the search for the desired content in the case where most of the recorded contents belong to the same genre, in the case where a series of programs have been recorded in succession, and so on.

Further, in the case where the content has a long title, a part of the title is sometimes not included in the list of titles displayed on a display, with the result that it is difficult for the user to identify a content of the content.

Still further, when the recorded contents have been recorded on a storage medium, the user may print titles of the contents on a surface of the storage medium or the like. According to known techniques, such content titles printed on the surface of the storage medium or the like are inconvenient to the user in many cases.

The present invention has been devised in view of the above situation, and an advantage of the present invention is to make it possible to achieve the displaying or printing of the titles with great convenience to the user.

According to one embodiment of the present invention, there is provided a data processing apparatus that sets identification information for identifying each of a plurality of contents based on metadata added to each of the contents. The apparatus includes: title information acquisition means for acquiring title information of each of the contents, the title information concerning a title of the content and being included in the metadata; and information extraction means for comparing the title information of each of the contents to extract a part of the title information that is common to all of the contents. The apparatus further includes identification information setting means for setting the identification information of each of the contents based on the other part of the title information than the part of the title information that is common to all of the contents.

The data processing apparatus may further include title information separating means for separating the title information into a plurality of pieces of unit information. The information extraction means may compare the pieces of unit information of the title information of each of the contents to extract unit information common to different ones of the contents, and the identification information setting means may set the identification information of each of the contents based on unit information that has not been extracted by the information extraction means from the pieces of unit information of the title information of the content.

The identification information setting means may set, as the identification information of the content, one or more of the pieces of unit information that are not included in the pieces of unit information of the title information of any other content.

The identification information setting means may set the identification information of the content based on another piece of information included in the metadata than the title information of the content, if one or more of the pieces of unit information that are not included in the pieces of unit information of the title information of any other content satisfy a predetermined condition.

The data processing apparatus may further include: recording means for recording data of each of the contents; and presenting means for presenting a list of the identification information. Data of a content corresponding to identification information selected from the list of the identification information may be read from the recording means.

The presenting means may present the identification information of the contents so as to be associated with the common part of the title information extracted by the information extraction means, the identification information corresponding to the title information including the common part of the title information.

The title information separating means may include: morphological analysis means for subjecting the title information of each of the contents acquired by the title information acquisition means to morphological analysis; and keyword detection means for detecting previously set keywords based on morphemes obtained as a result of the morphological analysis by the morphological analysis means. Each of the pieces of unit information may be composed of one or more of the keywords detected by the keyword detection means.

The title information separating means may separate the title information of each of the contents into the pieces of unit information by detecting predetermined keywords previously set.

The information extraction means may extract the common unit information so as to form a hierarchy.

An upper limit of the number of hierarchical levels concerning the common unit information extracted by the information extraction means so as to form the hierarchy may be set by a user.

According to another embodiment of the present invention, there is provided a data processing method employed by a data processing apparatus that sets identification information for identifying each of a plurality of contents based on metadata added to each of the contents. The method includes the steps of: acquiring title information of each of the contents, the title information concerning a title of the content and being included in the metadata; comparing the title information of each of the contents to extract a part of the title information that is common to all of the contents; and setting the identification information of each of the contents based on the other part of the title information than the part of the title information that is common to all of the contents.

According to yet another embodiment of the present invention, there is provided a program for causing a computer to perform a process of setting identification information for identifying each of a plurality of contents based on metadata added to each of the contents. The program causes the computer to function as: title information acquisition means for acquiring title information of each of the contents, the title information concerning a title of the content and being included in the metadata; and information extraction means for comparing the tithe information of each of the contents to extract a part of the title information that is common to all of the contents. The program further causes the computer to function as identification information setting means for setting the identification information of each of the contents based on the other part of the title information than the part of the title information that is common to all of the contents.

According to yet another embodiment of the present invention, with respect to each of the contents, the title information that concerns the title of the content and is included in the metadata is acquired; the acquired title information is separated into a plurality of pieces of unit information; and the pieces of unit information of the title information of each of the contents is compared with each other to extract unit information common to different ones of the contents. Furthermore, the identification information of each of the contents is set based on unit information that has not been extracted from the pieces of unit information of the title information of the content.

According to yet another embodiment of the present invention, there is provided a data processing apparatus that generates print data for printing, on a storage medium, information for identifying a plurality of contents stored in the storage medium, the apparatus including: title acquisition means for acquiring a character sequence denoting a title of each of the contents stored in the storage medium; and print data generation means for generating the print data. A part of the character sequence denoting the title of each of the contents, the part being common to all of the contents, is printed in a first area on the storage medium, and the other part of the character sequence denoting the title of each of the contents than the part of the character sequence that is common to all of the contents is printed in a second area on the storage medium.

Information concerning a date and time associated with each of the contents may be additionally printed in the second area.

The print data generation means may generate print data for additionally printing, in a third area on the storage medium, a character sequence that is generated based on the information concerning the date and time associated with each of the contents.

Out of the character sequences printed in the second area, a character sequence that is common to two or more of the contents may be printed at a predetermined position in the second area.

It may be so arranged that: the contents stored in the storage medium are classified into N sets; the first and second areas on the storage medium are each divided into N parts; and with respect to each of the N sets of contents, a part of the character sequence denoting the title of each of the contents, the part being common to all of the contents in the same set, is extracted and printed in a separate one of the N parts of the first area. Furthermore, with respect to each of the N sets of contents, the other part of the character sequence denoting the title of each of the contents than the part of the character sequence that is common to all of the contents in the same set is printed in a separate one of the N parts of the second area.

The data processing apparatus may further include printing means for printing the character sequences on the storage medium based on the print data.

According to yet another embodiment of the present invention, a character sequence denoting a title of each of the contents stored in the storage medium is acquired, and print data is generated. A part of the character sequence denoting the title of each of the contents, the part being common to all of the contents, is printed in a first area on the storage medium; and the other part of the character sequence denoting the title of each of the contents than the part of the character sequence that is common to all of the contents is printed in a second area on the storage medium.

According to the embodiment of the present invention, the displaying or printing of the titles is achieved with great convenience to the user.

BRIEF DESCRIPTION OF THE DRAWINGS

FIG. 5 is a table showing examples of keywords;

FIG. 9 is a diagram illustrating creation of folders;

DETAILED DESCRIPTION OF THE PREFERRED EMBODIMENTS

Hereinafter, embodiments of the present invention will be described. Correspondence between the constituent features of the present invention and the embodiments that will be described below in this specification taken in conjunction with the accompanying drawings is exemplified as follows. Note that this preliminary description is meant to confirm that embodiments that support the present invention are described in this specification and the accompanying drawings. Therefore, even if there is an embodiment that is described in this specification and the accompanying drawings but not described in this preliminary description as corresponding to a constituent feature of the present invention, that does not mean that that embodiment does not correspond to that constituent feature. Conversely, even if a certain embodiment is described in this preliminary description as corresponding to a certain constituent feature of the present invention, that does not mean that the certain embodiment does not correspond to any other constituent feature.

Figure 2:
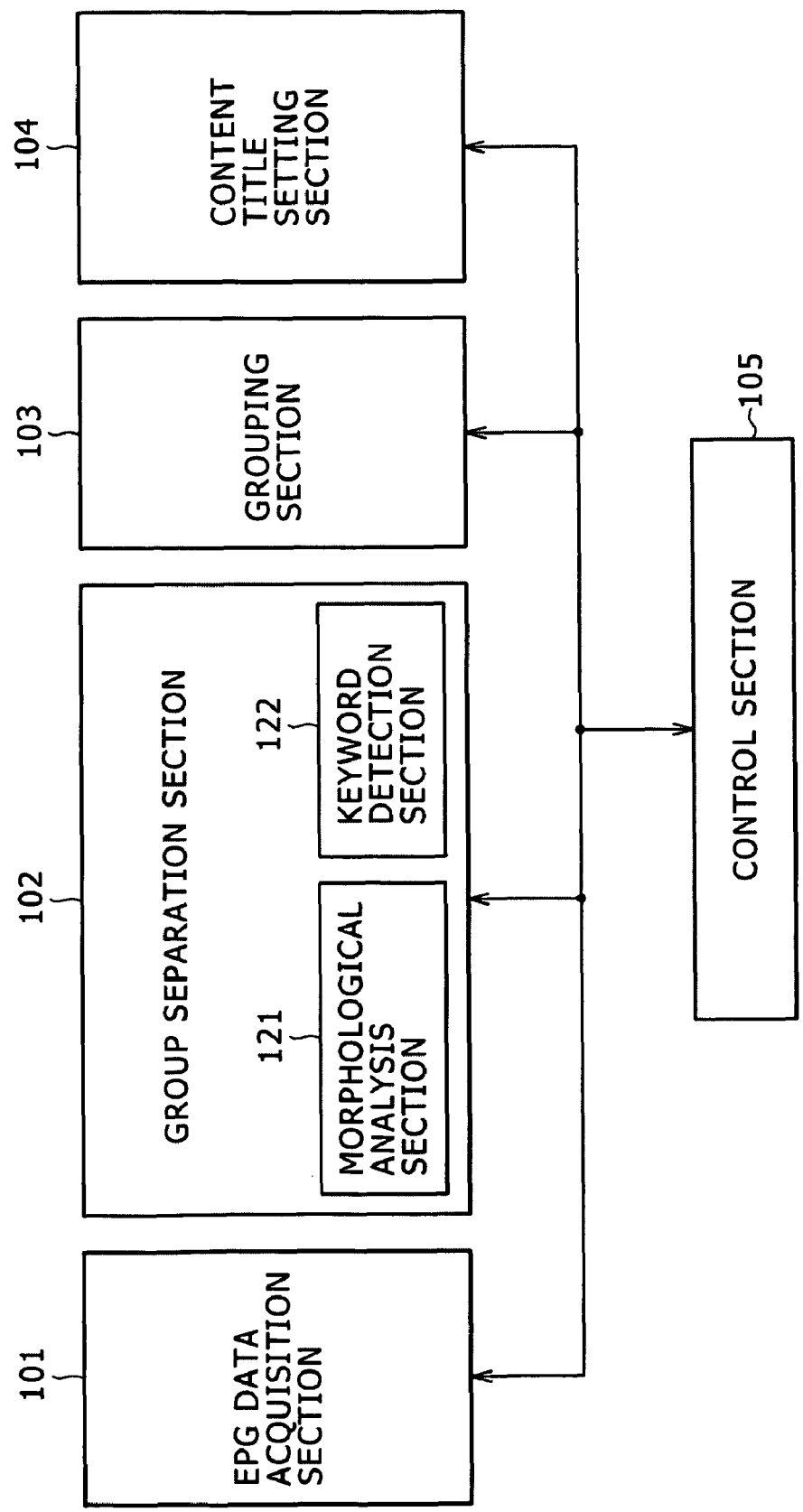
FIG. 2 is a block diagram illustrating an exemplary functional structure of software executed by a controller as shown in FIG. 1.

A data processing apparatus according to one embodiment of the present invention is a data processing apparatus that sets identification information for identifying each of a plurality of contents based on metadata added to each of the contents, the apparatus including title information acquisition means (e.g., an EPG data acquisition section 101 as shown in FIG. 2) for acquiring title information (e.g., EPG title data) of each of the contents, the title information concerning a title of the content and being included in the metadata. The apparatus further includes information extraction means (e.g., a grouping section 103 as shown in FIG. 2) for comparing the title information of each of the contents to extract a part (e.g., a part to be assigned to a folder) of the title information that is common to all of the contents. The apparatus further includes identification information setting means (e.g., a content title setting section 104 as shown in FIG. 2) for setting the identification information (e.g., content title data) of each of the contents based on the other part of the title information than the part of the title information that is common to all of the contents.

The data processing apparatus may further include title information separating means (e.g., a group separation section 102 as shown in FIG. 2) for separating the title information into a plurality of pieces of unit information (e.g., groups). The information extraction means may compare the pieces of unit information of the title information of each of the contents to extract unit information (e.g., a group to be assigned to a folder) common to different ones of the content. The identification information setting means may set the identification information of each of the contents based on unit information (e.g., the content title data) that has not been extracted by the information extraction means from the pieces of unit information of the title information of the content.

In the data processing apparatus, the identification information setting means may set the identification information of the content based on another piece of information (e.g., detailed information) included in the metadata than the title information of the content, if one or more of the pieces of unit information that are not included in the pieces of unit information of the title information of any other content satisfy a predetermined condition (e.g., if they do not exist).

Figure 3:
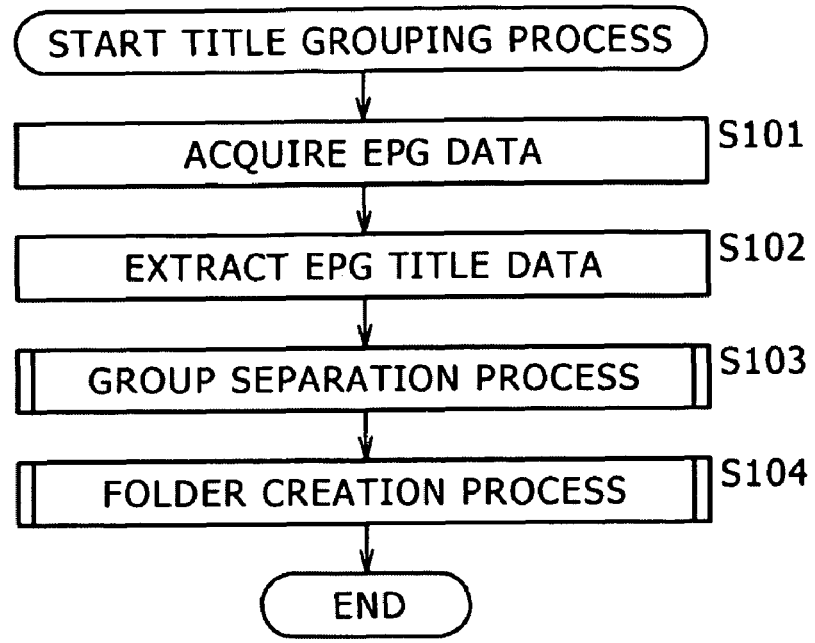
FIG. 3 is a flowchart illustrating an exemplary title grouping process.
Figure 11:
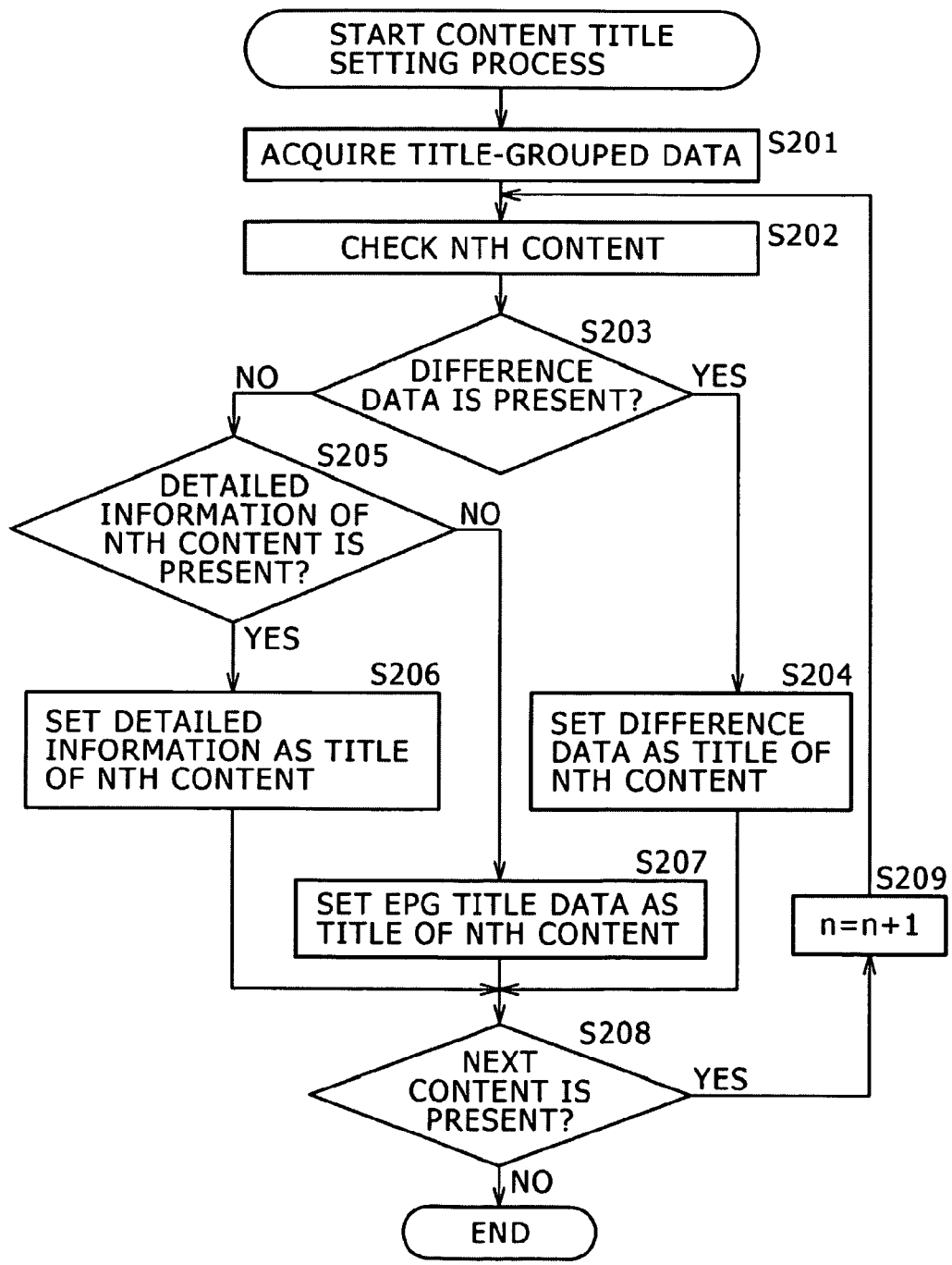
FIG. 11 is a flowchart illustrating an exemplary content title setting process.

A data processing method according to one embodiment of the present invention is a data processing method employed by a data processing apparatus that sets identification information for identifying each of a plurality of contents based on metadata added to each of the contents. The method includes the steps of: acquiring title information (e.g., the EPG title data) of each of the contents, the title information concerning a title of the content and being included in the metadata (e.g., processes of steps S101 and S102 as shown in FIG. 3); and comparing the title information of each of the contents to extract a part (e.g., a part to be assigned to a folder) of the title information that is common to all of the contents (e.g., a process of step S104 as shown in FIG. 3). The method further includes the step of setting the identification information (e.g., the content title data) of each of the contents based on the other part of the title information than the part of the title information that is common to all of the contents (e.g., processes of steps S201 to S209 as shown in FIG. 11).

Figure 1:
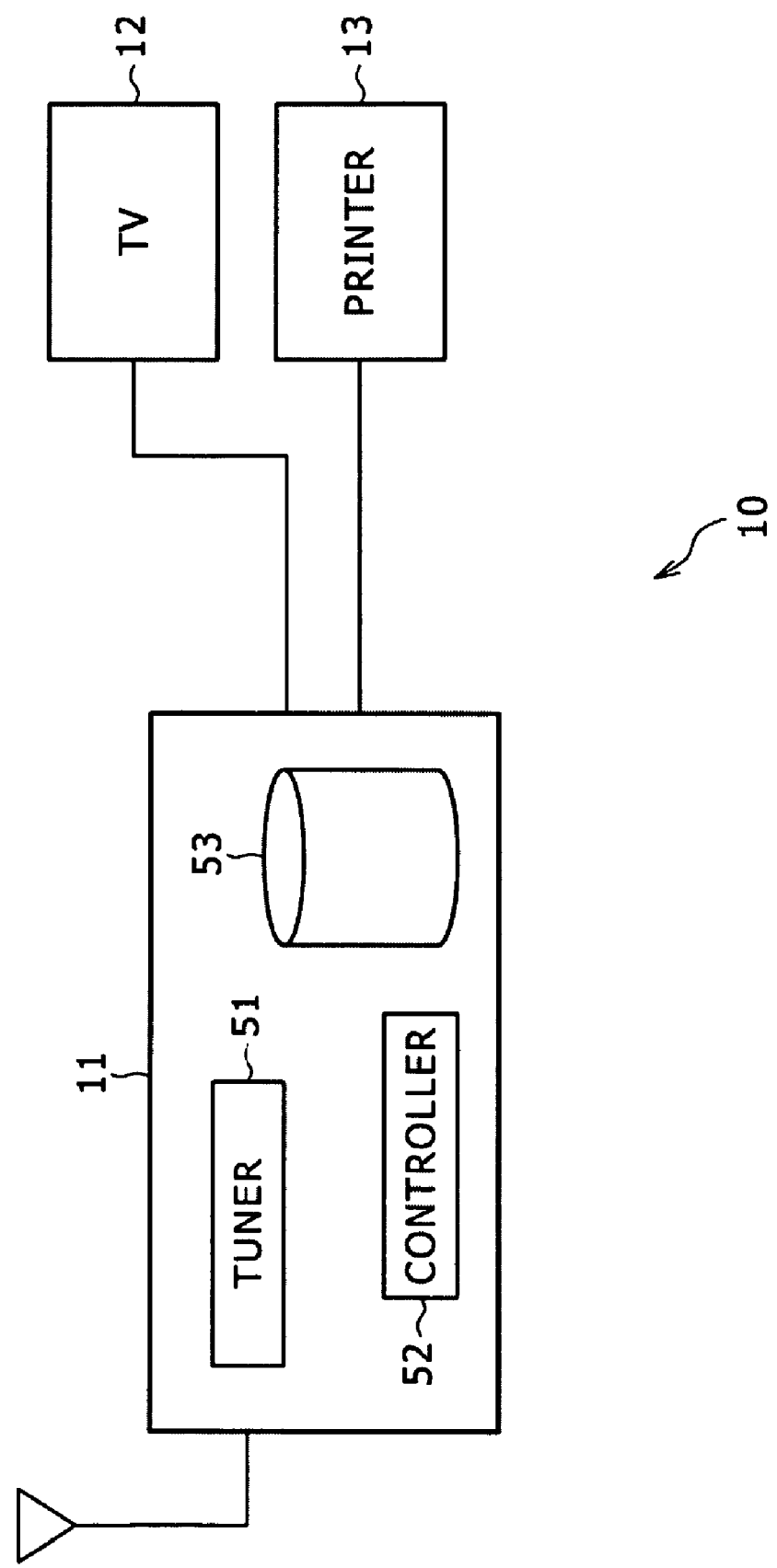
FIG. 1 is a block diagram illustrating an exemplary structure of a content recording system according to one embodiment of the present invention.

A data processing apparatus according to one embodiment of the present invention is a data processing apparatus that generates print data for printing, on a storage medium, information for identifying a plurality of contents stored in the storage medium, the apparatus including title acquisition means (e.g., the EPG data acquisition section 101 as shown in FIG. 2) for acquiring a character sequence (e.g., the EPG title data) denoting a title of each of the contents stored in the storage medium. The apparatus further includes print data generation means (e.g., a controller 52 as shown in FIG. 1) for generating the print data, wherein a part (e.g., a name of a folder) of the character sequence denoting the title of each of the contents, the part being common to all of the contents, is printed in a first area (e.g., an area 321 as shown in FIG. 20) on the storage medium, and the other part of the character sequence denoting the title of each of the contents than the part (e.g., the name of the folder) of the character sequence that is common to all of the contents is printed in a second area (e.g., an area 323 or an area 324 as shown in FIG. 20) on the storage medium.

Figure 20:
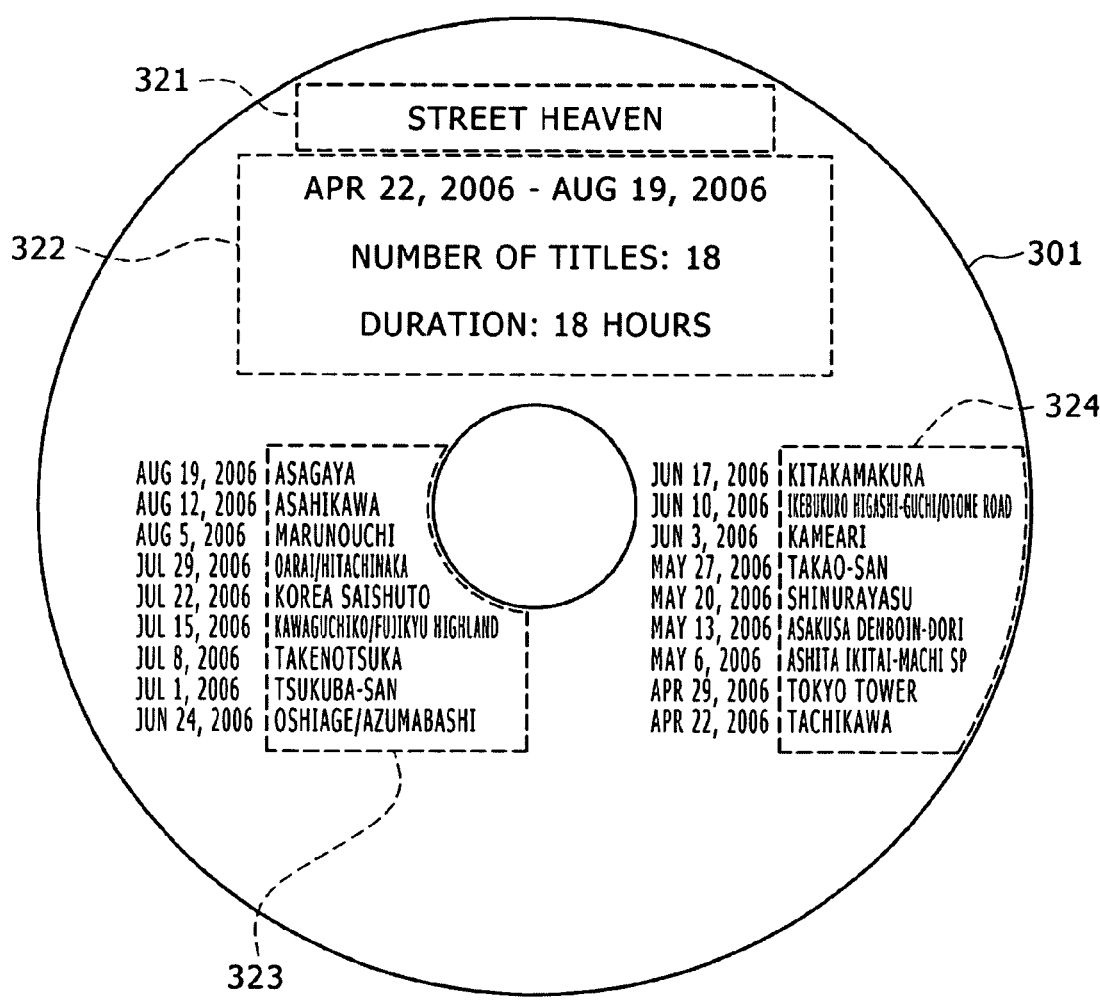
FIG. 20 shows an example of how the content titles are printed on the storage medium in accordance with one embodiment of the present invention.

In the data processing apparatus, the print data generation means may generate print data for additionally printing, in a third area (e.g., an area 322 as shown in FIG. 20) on the storage medium, a character sequence that is generated based on the information concerning the date and time associated with each of the contents.

Figure 23:
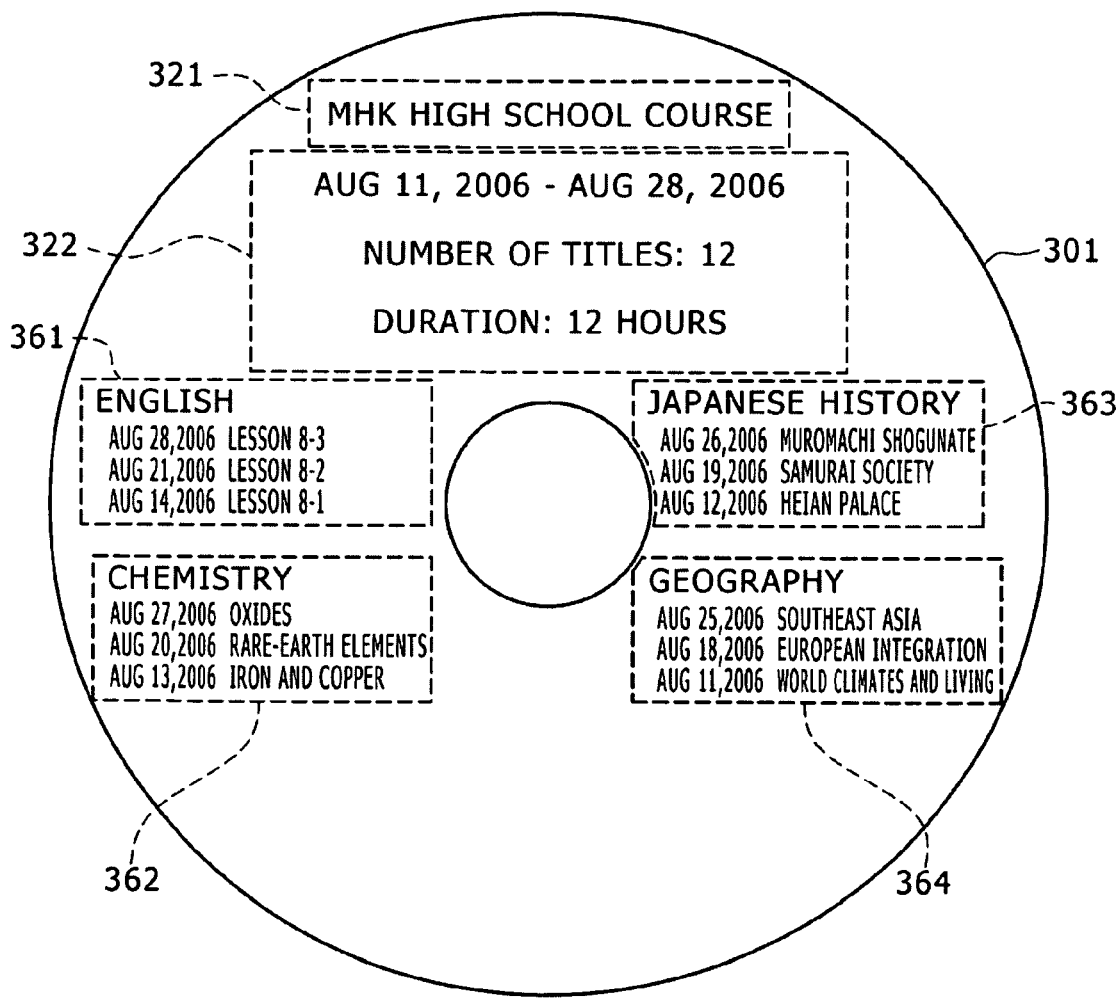
FIG. 23 shows yet another example of how the content titles are printed on the storage medium in accordance with one embodiment of the present invention.

In the data processing apparatus, out of the character sequences printed in the second area (e.g., areas 361 to 364 as shown in FIG. 23), a character sequence that is common to two or more of the contents may be printed at a predetermined position in the second area.

Figure 22:
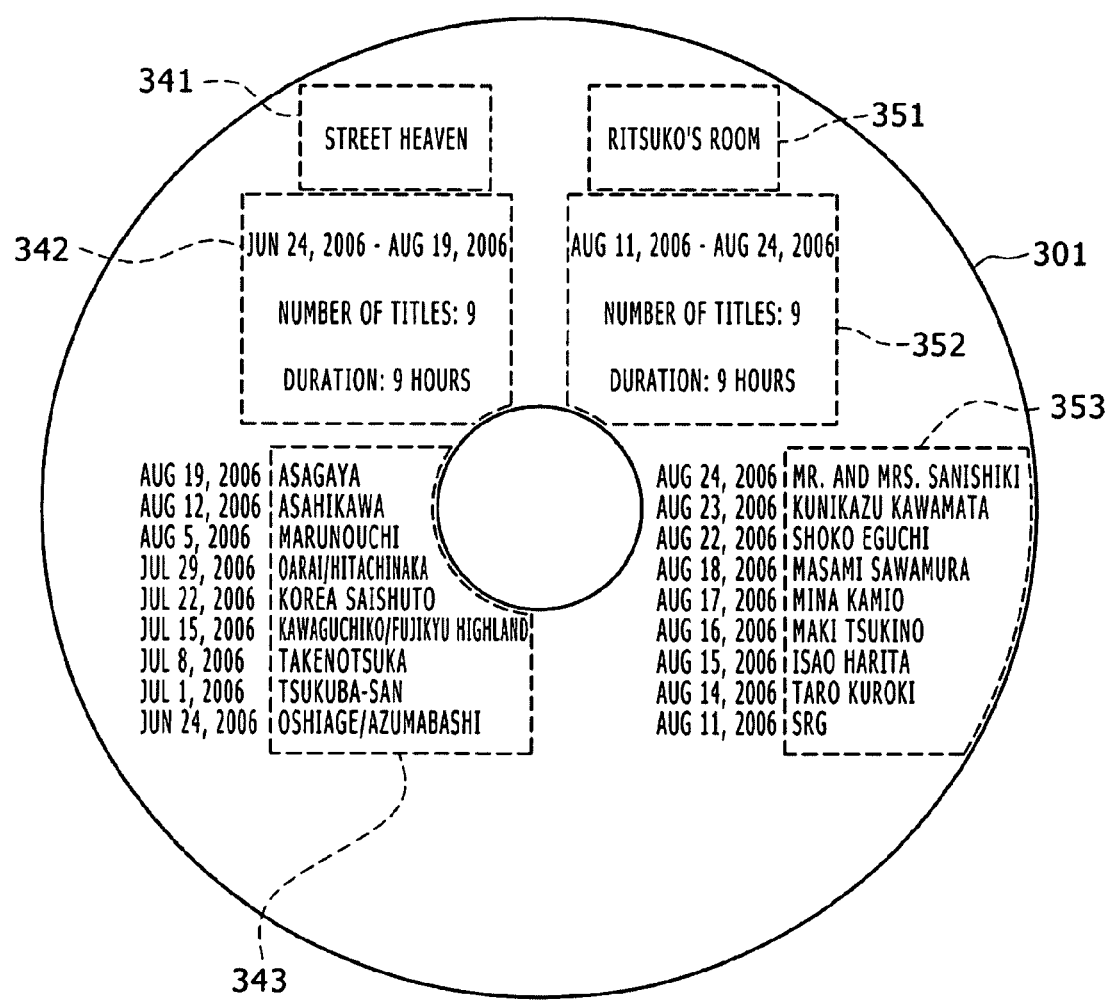
FIG. 22 shows yet another example of how the content titles are printed on the storage medium in accordance with one embodiment of the present invention.

In the data processing apparatus may generate print data, the apparatus may be so arranged that: the contents stored in the storage medium are classified into N sets; the first and second areas on the storage medium are each divided into N parts; and with respect to each of the N sets of contents, a part (e.g., the name of the folder) of the character sequence denoting the title of each of the contents, the part being common to all of the contents in the same set, is extracted and printed in a separate one of the N parts of the first area (e.g., areas 341 and 351 as shown in FIG. 22). The apparatus may further be so arranged that: with respect to each of the N sets of contents, the other part of the character sequence denoting the title of each of the contents than the part (e.g., the name of the folder) of the character sequence that is common to all of the contents in the same set is printed in a separate one of the N parts of the second area (e.g., areas 343 and 353 as shown in FIG. 22).

The data processing apparatus may further include printing means (e.g., a printer 13 as shown in FIG. 1) for printing the character sequences on the storage medium based on the print data.

Hereinafter, embodiments of the present invention will be described with reference to the accompanying drawings.

FIG. 1 is a block diagram illustrating an exemplary structure of a content recording system 10 according to one embodiment of the present invention. In FIG. 1, the content recording system 10 includes a data processing apparatus 11, a television receiver 12, and a printer 13. The data processing apparatus 11 processes data of contents. The television receiver 12 and the printer 13 are connected to the data processing apparatus 11.

The data processing apparatus 11 is formed as a hard disk drive (HDD) recorder or the like, for example, and contains a tuner 51, a controller 52, and an HDD 53.

The tuner 51 receives, for example, a broadcast content via an antenna, and supplies data of the received content to the controller 52. The tuner 51 also receives an electronic program guide (EPG) broadcast along with the content, for example, and supplies data of the received EPG to the controller 52.

The controller 52 decodes the data of the content supplied from the tuner 51, which has been encoded with a predetermined compression algorithm such as MPEG, and outputs a video or audio signal corresponding to the decoded data to the television receiver 12. In addition, the controller 52 records the data supplied from the tuner 51 on the HDD 53 as necessary.

In addition, based on a user instruction or the like received via a remote commander (not shown), for example, the controller 52 reads and decodes the content data recorded on the HDD 53 to reproduce the decoded content data.

That is, the data processing apparatus 11 is configured to record the content or reproduce the recorded content based on the user instruction or the like received via the remote commander (not shown), for example.

Further, when a user issues an instruction to reproduce a content, the controller 52 generates display data for displaying a list of content titles on a screen of the television receiver 12 or the like, for example. This list of content titles will be used by the user to identify the content which the user desires to reproduce.

Note that, in the data processing apparatus 11, the HDD 53, which is an example of a storage medium in which the data is stored, may be replaced with a digital versatile disk (DVD) or the like, for example. Also note that the data processing apparatus 11 may be configured to be capable of copying or moving the content recorded on the HDD 53 to the DVD.

The controller 52 includes a processor, a memory, and so on, for example. The controller 52 executes software, such as a program, installed previously to perform predetermined processing.

While it is assumed here that the television receiver 12 and the printer 13 are connected directly to the data processing apparatus 11, the data processing apparatus 11, the television receiver 12, and the printer 13 may be connected to one another via a network, such as a digital living network alliance (DLNA) network. Yet another, the data processing apparatus 11, the television receiver 12, and the printer 13 may be located remotely from one another and connected to one another via the Internet or the like.

Otherwise, the data processing apparatus 11, the television receiver 12, and the printer 13 may be integrated into a single data processing apparatus.

FIG. 2 is a block diagram illustrating an exemplary functional structure of the software executed by the controller 52.

In FIG. 2, an EPG data acquisition section 101 acquires the data of the EPG of the content recorded on the HDD 53. As noted previously, the data of the EPG is received by the tuner 51 and supplied to the controller 52. A control section 105 stores the data of the EPG supplied from the tuner 51 in a predetermined storage area in the HDD 53, for example, so as to be associated with information for identifying this content and so on.

The EPG data acquisition section 101 identifies and acquires data of an EPG of a content that is currently to be recorded, for example. Then, the EPG data acquisition section 101 extracts, as EPG title data, data in a region of the EPG in which information denoting a title of the content is stored, and supplies the EPG title data to a group separation section 102 via the control section 105.

The group separation section 102 separates the EPG title data, which has been supplied via the control section 105, into different groups as described later.

The group separation section 102 includes a morphological analysis section 121 and a keyword detection section 122. The morphological analysis section 121 converts the EPG title data into text format, and subjects resultant text data to morphological analysis, for example. The morphological analysis section 121 divides a character sequence included in the text data of the EPG title data into morphemes, and outputs the morphemes to the keyword detection section 122.

The keyword detection section 122 in the group separation section 102 detects keywords by, for example, comparing each of the morphemes supplied from the morphological analysis section 121 or a word or phrase composed of successive morphemes with dictionary data or the like. The dictionary data or the like is set in advance. The term "keywords" as used herein refers to words that can be suitably used when analyzing the content titles and which have been previously registered in the dictionary data, for example. The keyword detection section 122 detects, as a keyword, a morpheme or a word or phrase composed of successive morphemes which coincides with a word registered in the dictionary data, and outputs the detected keyword to the control section 105 together with information that denotes a part of speech of the keyword.

Then, groups each composed of one or more keywords are generated, so that the EPG title data subjected to group separation is obtained.

The control section 105 allows the EPG title data of each of the recorded contents, which has been subjected to the group separation by the group separation section 102, to be stored in a storage section, such as the internal memory of the controller 52 or the HDD 53.

A grouping section 103 subjects the EPG title data of each of the recorded contents, which has been subjected to the group separation by the group separation section 102, to grouping in a manner described later. As a result, a part of EPG titles that is common to different contents is integrated as a folder.

With respect to each of the recorded contents, for example, a content title setting section 104 sets, as content title data of the content, the other part of the EPG title data than the part of the EPG title data which has been integrated into the folder by the grouping section 103. The content title data corresponds to a content title that is set in order to enable the user to easily identify each of the contents that may share a common title in the EPG. For example, contents that are broadcast in series will have a common title in the EPG. The content title setting section 104 sets, as the content title data, data of a difference in the EPG title data of each of the contents, for example.

Further, for example, the content title setting section 104 acquires, out of the data of the EPG acquired by the EPG data acquisition section 101, data in a region other than the region in which the information denoting the title of the content is stored via the control section 105, and sets, as the content title data, a character sequence composed of a predetermined number of characters that can be obtained from this acquired data, for example. In the case where there is not the data of the difference in the EPG title data of the content, for example, the content title setting section 104 sets the content title data based on the data in the region other than the region in which the information denoting the title of the content is stored, as described above.

The control section 105 stores data that is demanded for processing by each of the EPG data acquisition section 101, the group separation section 102, the grouping section 103, and the content title setting section 104 in the storage section, such as the internal memory of the controller 52 or the HDD 53, and reads such data from the storage section. In addition, the control section 105, as necessary, sets and outputs a control signal or the like that is needed to control each part of the data processing apparatus 11.

Next, with reference to a flowchart of FIG. 3, an example of a title grouping process performed by the data processing apparatus 11 will now be described below. This process may be performed when the content is recorded or when a predetermined number of contents have been recorded on the HDD 53, for example. Besides, this process may be performed at a specified time based on a user instruction or the like.

At step S101, the EPG data acquisition section 101 acquires the data of the EPG of the content to be recorded on the HDD 53. At this time, the data of the EPG received by the tuner 51 and supplied to the controller 52 is acquired, as described above. For example, the EPG data acquisition section 10: identifies and acquires the data of the EPG of the content that is currently to be recorded.

At step S102, the EPG data acquisition section 101 extracts, as the EPG title data, the data in the region of the EPG in which the information denoting the title of the content is stored, and supplies the EPG title data to the group separation section 102 via the control section 105.

Figure 4:
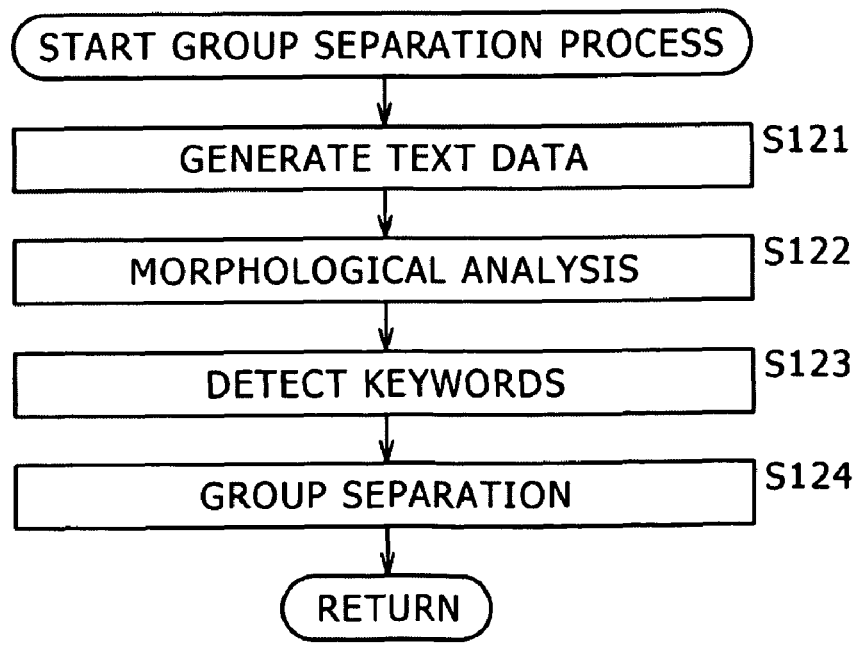
FIG. 4 is a flowchart illustrating an exemplary group separation process.

At step S103, based on the EPG title data extracted at step S102, the group separation section 102 performs a group separation process, which will be described below with reference to a flowchart of FIG. 4.

Here, a detailed example of the group separation process at step S103 in FIG. 3 will now be described below with reference to the flowchart of FIG. 4.

At step S121, the morphological analysis section 121 in the group separation section 102 converts the EPG title data extracted by the process of step S102 into text format to generate the text data of the EPG title data.

At step S122, the morphological analysis section 121 subjects the text data generated by the process of step S121 to the morphological analysis. As a result, the character sequence included in the EPG as the title of the content is divided into the morphemes, for example.

At step S123, the keyword detection section 122 in the group separation section 102 detects the keywords by, for example, comparing each of the morphemes obtained as a result of the process of step S122 or the word or phrase composed of successive morphemes with the dictionary data or the like, which has been set in advance. As noted previously, the keywords refer to the words or phrases that can be suitably used when analyzing the content titles and which have been previously registered in the dictionary data, for example. Each morpheme or each word or phrase composed of successive morphemes which coincides with a word or phrase registered in the dictionary data is detected as the keyword, and each of the detected keywords is outputted together with the information denoting the part of speech of the keyword.

For example, suppose that an EPG of a certain content includes, as a title of the content, information composed of a character sequence "MHK High School Course General Science A•B 'Mechanism of Weather Change'". In this case, as a result of the processes of steps S122 and S123, a list of keywords as shown in FIG. 5 is obtained, for example.

Keywords No. 1 to No. 13 are shown in FIG. 5. These keywords have been obtained as a result of subjecting the information composed of the character sequence (i.e., the text data) "MHK High School Course General Science A•B 'Mechanism of Weather Change'" to the morphological analysis and keyword detection.

In this example, keyword No. 1 (i.e., a first keyword) is "MHK High School Course", and the part of speech for this keyword is "Phrase". A second keyword is " " (double space), and the part of speech for this keyword is "Double Space". Thus, the double space is also detected as a keyword. A third keyword is "General", and the part of speech for this keyword is "Adjective". A fourth keyword is "Science", and the part of speech for this keyword is "Noun". A fifth keyword is "A", and the part of speech for this keyword is "Alphabet".

A sixth keyword is "•", and the part of speech for this keyword is "Mark". Thus, marks are also detected as keywords. In this example, marks "'" and "'" (single quotation marks) are detected as eighth and thirteenth keywords, respectively.

Ninth to twelfth keywords are detected as "Noun" or "Preposition" keywords.

Returning to FIG. 4, at step S124, the group separation section 102 separates the character sequence of the EPG title data into the different groups based on the list of keywords as shown in FIG. 5, for example, obtained via the process of step S123.

Figure 6:
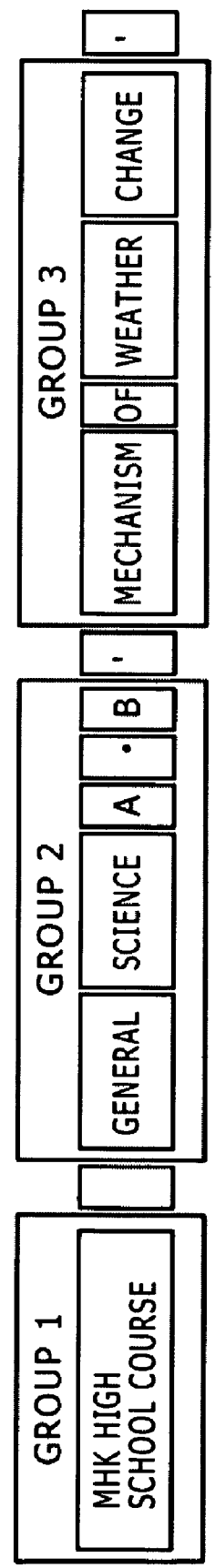
FIG. 6 shows an example of EPG title data as separated into groups.

Here, the character sequence of the EPG title data is separated into the different groups in a manner as shown in FIG. 6, for example. In FIG. 6, each of the thirteen keywords as mentioned above is within a quadrilateral frame, and the character sequence of the EPG title data composed of the thirteen keywords is separated into three groups.

Specifically, a first group, Group 1, is composed of the first keyword "MHK High School Course". A second group, Group 2, is composed of the third to seventh keywords "General Science A•B". A third group, Group 3, is composed of the ninth to twelfth keywords "Mechanism of Weather Change". Thus, the groups each composed of one or more keywords are generated, so that the EPG title data subjected to the group separation is obtained.

The group separation section 102 separates the character sequence of the EPG title data into the different groups based on predetermined mark keywords, for example. In the exemplary character sequence of the EPG title data as shown in FIG. 6, Groups 1 and 2 are separated based on the "double space" mark, which is the second keyword. Groups 2 and 3 are separated based on the "'" and "'" marks (i.e., the single quotation marks), which are the eighth and thirteenth keywords, respectively. It is assumed here that the sixth keyword "•" is not used for the group separate although it is a mark.

As described above, the character sequence of the EPG title data is separated into the different groups based on the predetermined mark keywords. Examples of marks that are used for the group separation are shown in FIG. 7.

Figures 7, 8:
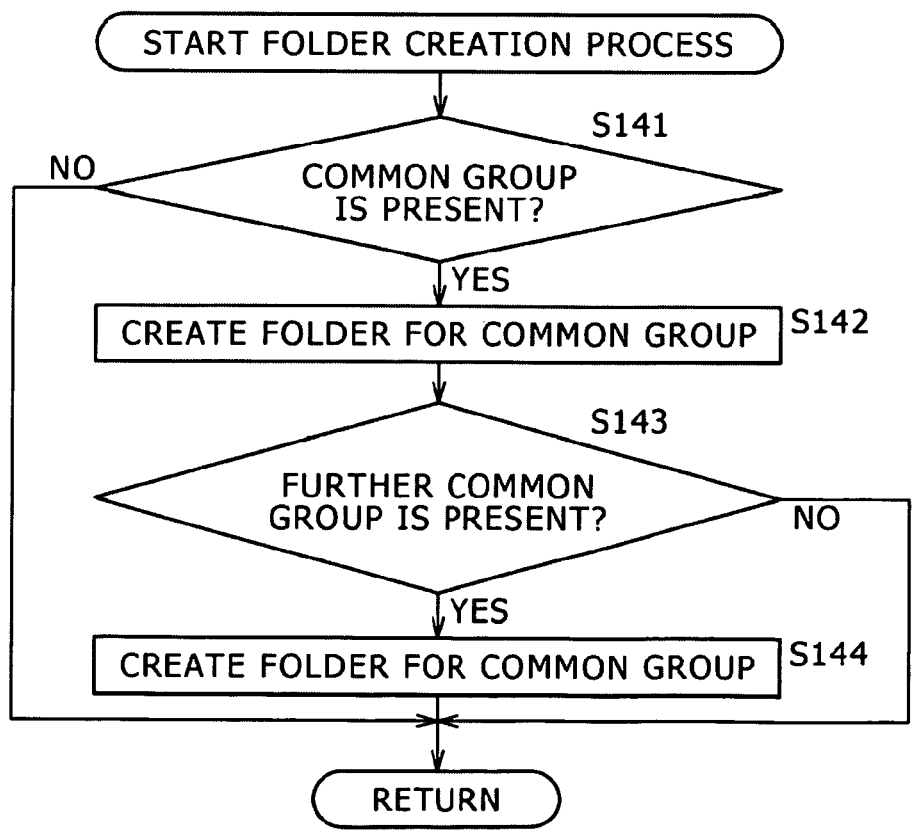
FIG. 7 shows examples of marks used in the group separation process.
FIG. 8 is a flowchart illustrating an exemplary folder creation process.

In FIG. 7, in addition to the double space and the single quotation marks, double quotations marks, """, "/", ":", "#1", and other marks are shown as the marks that are used for the group separation. Of these marks, "#1" denotes a mark keyword made up of a combination of a mark "#" and a number, for example.

The group separation process is performed in the above-described manner.

Returning to FIG. 3, after the process of step S103, the grouping section 103 performs a folder creation process at step S104, which will be described below with reference to FIG. 8. At this time, regarding the EPG title data of each of the recorded contents, which has been subjected to the group separation via the process of step S103, that part of the EPG title data which is common to different contents is integrated as the folder, for example.

Here, a detailed example of the folder creation process at step S104 in FIG. 3 will now be described below with reference to a flowchart of FIG. 8.

At step S141, the grouping section 103 determines whether the EPG title data of each of the recorded contents, which has been subjected to the group separation, includes a group that is common to different pieces of EPG title data, for example.

If it is determined at step S141 that there is such a common group, the grouping section 103 creates a folder for that common group at step S142.

As an example, a case will be described below where the EPG title data of six contents, as separated into different groups in a manner as shown in FIG. 9 via the process of step S103, has already been stored in the HDD 53. In this example, a first piece of EPG title data, which has been subjected to the group separation, is "MHK High School Course General Science A•B 'Mechanism of Weather Change'". A second piece of EPG title data, which has been subjected to the group separation, is "MHK High School Course General Science A•B 'Let's Use Electric Power'". A third piece of EPG title data, which has been subjected to the group separation, is "MHK High School Course Physics 'Work and Power'". A fourth piece of EPG title data, which has been subjected to the group separation, is "MHK High School Course Physics 'Lashing Waves'".

In step S141, it is determined whether there is a character sequence in the first group (i.e., Group 1) that is common to different pieces of EPG title data subjected to the group separation. In this example, the character sequence "MHK High School Course" in Group 1 is common to the first to fourth pieces of EPG title data subjected to the group separation as shown in FIG. 9. Accordingly, a folder "MHK High School Course" is created at step S142. Similarly, a character sequence "MHK Special" in Group 1 is common to fifth and sixth pieces of EPG title data subjected to the group separation. Accordingly, a folder "MHK Special" is created at step S142.

Returning to FIG. 8, after the process of step S142, the grouping section 103 determines whether the EPG title data of each of the contents, which has been subjected to the group separation, includes a further common group at step S143, for example.

If it is determined at step S143 that there is such a common group, the grouping section 103 creates a folder for that common group at step S144.

In step S143, it is determined whether there is further a character sequence in the second group (i.e., Group 2) that is common to different pieces of EPG title data subjected to the group separation. In this example, a character sequence "General Science A•B" in Group 2 is common to the first and second pieces of EPG title data subjected to the group separation as shown in FIG. 9. Accordingly, at step S143, a folder "General Science A•B" is created as a folder subordinate to the folder "MHK High School Course". Similarly, a character sequence "Physics" in Group 2 is common to the third and fourth pieces of EPG title data subjected to the group separation. Accordingly, a folder "Physics" is created as a folder subordinate to the folder "MHK High School Course". Still further, a character sequence "Planet Booth" in Group 2 is common to the fifth and sixth pieces of EPG title data subjected to the group separation. Accordingly, a folder "Planet Booth" is created as a folder subordinate to the folder "MHK Special".

That is, in FIG. 9, each portion enclosed by a dotted or dashed line corresponds to the folder, whereas each hatched portion corresponds to difference data in the EPG title data.

Note that the fifth and sixth pieces of EPG title data subjected to the group separation share common character sequences in both Groups 1 and 2. Therefore, a single folder "MHK Special Planet Booth" may be created, instead of the two folders "MHK Special" and "Planet Booth".

If it is determined at step S141 in FIG. 8 that there is not any common group, or if it determined at step S143 that there is not any common group, the folder creation process is finished.

Note that the above example described with reference to FIGS. 8 and 9 is simply one example of folder creation, and that the folder creation may be performed in a different manner. For example, the number of levels of folder hierarchy may not be limited to two as in the example of FIGS. 8 and 9, but three or more levels of folders may be created. Further, for example, even when different contents share a common group in Group 1, the folder may not be created for this common group if the number of keywords included in this group is less than a predetermined number. Still further, when different contents share a common group in Group 2 but not in Group 1, a folder may be created for the common group in Group 2 as an upper level folder.

Regarding the EPG title data of the plurality of contents subjected to the group separation, the common parts are integrated as the folders in the above-described manner.

As a result, the title grouping process as shown in FIG. 3 is also finished.

Figure 10:
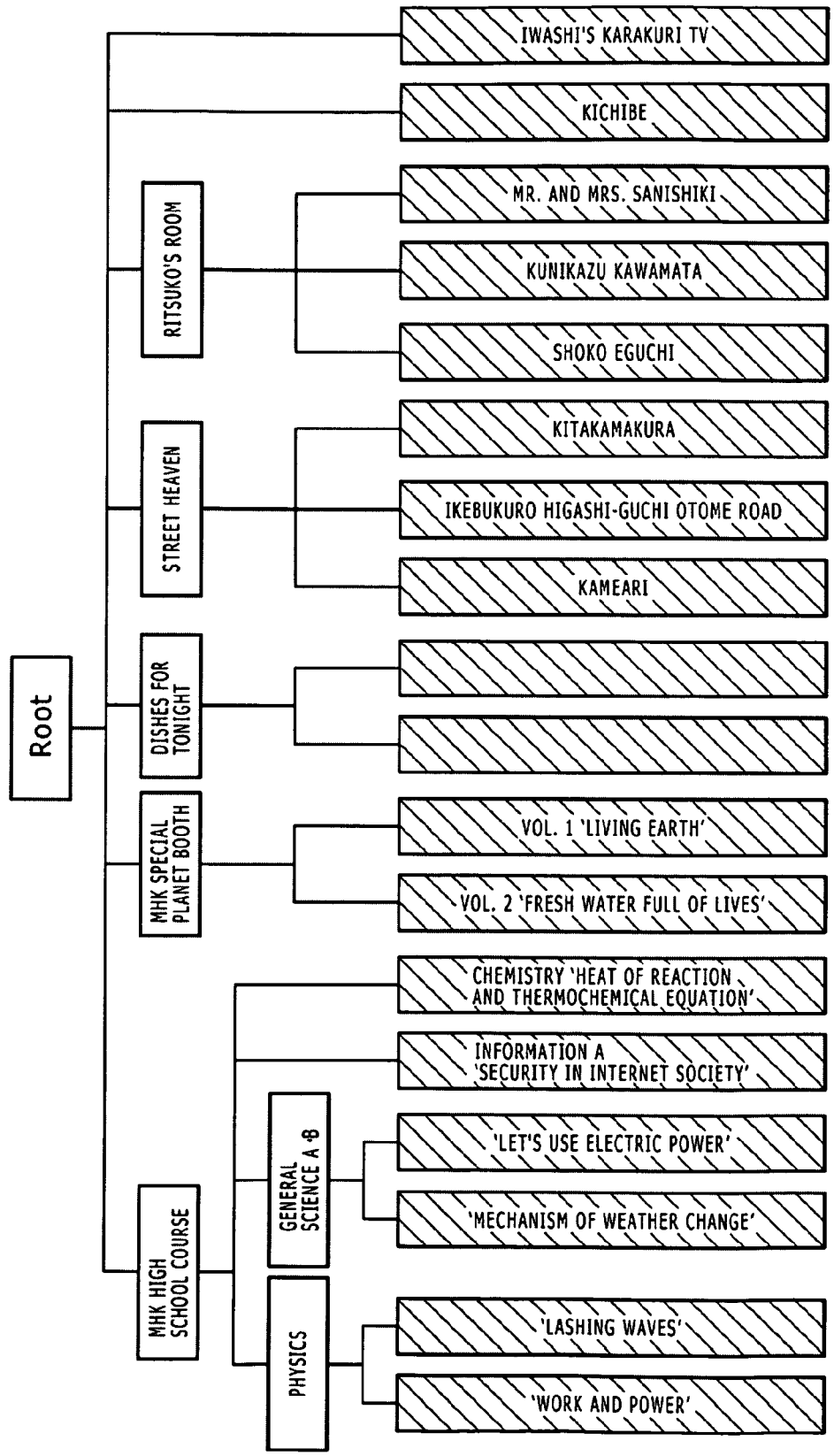
FIG. 10 shows an example of title-grouped data.

As a result of the title grouping process, title-grouped data as shown in FIG. 10 is generated, for example.

In the example of FIG. 10, a folder "Root" is the highest-level folder in the title-grouped data. Folders "MHK High School Course", "MHK Special Planet Booth", "Dishes for Tonight", "Street Heaven", and "Ritsuko's Room" have been created as folders subordinate to the folder "Root". Further, the folders "Physics" and "General Science A•B" have been created as the folders subordinate to the folder "MHK High School Course".

In FIG. 10, character sequences within hatched boxes correspond to the difference data in the EPG title data.

That is, in the example of FIG. 10, six contents are collected in the folder "MHK High School Course". Of these six contents, two contents are collected in the folder "Physics", which is contained in the folder "MHK High School Course", whereas other two contents are collected in the folder "General Science A•B", which is contained in the folder "MHK High School Course".

Similarly, two contents are collected in the folder "MHK Special Planet Booth", two contents are collected in the folder "Dishes for Tonight", three contents are collected in the folder "Street Heaven", and three contents are collected in the folder "Ritsuko's Room".

A content whose EPG title data denotes "Kichibe" and a content whose EPG title data denotes "Iwashi's Karakuri TV" are not collected in any folder, because the EPG title data of the two contents subjected to the group separation does not share a common part with any other content.

While two contents are collected in the folder "Dishes for Tonight", the difference data of the two contents as hatched in the figure is blank. This shows that the EPG title data of the two contents both denote "Dishes for Tonight" alone, and that the two contents do not have the difference data in the EPG title data.

Note that the control section 105 allows the title-grouped data as shown in FIG. 10 to be stored in a predetermined area in the HDD 53, for example. Each of the hatched parts of the title-grouped data is stored so as to be associated with the difference data in the EPG title data or the like and information for identifying the corresponding content. Examples of such information include information (such as an address) that denotes a location at which the data of the content is stored in the HDD 53.

Next, a content title setting process will now be described below with reference to a flowchart of FIG. 11. This process is performed, for example, when, in a situation where the plurality of contents have already been stored in the HDD 53, the content title data is set for the individual contents.

At step S201, the content title setting section 104 acquires the title-grouped data. At this time, the title-grouped data as shown in FIG. 10, for example, is acquired via the control section 105.

At step S202, the content title setting section 104 checks an nth content. Note that an initial value of the variable n is 1. The hatched quadrilateral boxes as shown in FIG. 10 are checked one by one as the nth content, for example.

At step S203, the content title setting section 104 determines whether the nth content has the difference data. If it is determined at step S203 that the nth content has the difference data, control proceeds to step S204.

At step S204, the content title setting section 104 sets the difference data, the presence of which has been determined by the process of step S203, as the content title data of the nth content.

In the case where the title-grouped data as shown in FIG. 10 has been acquired at step S201 and a first content is checked at step S202, for example, the process of step S203 checks whether or not the first content has the difference data. In this example, the first content corresponds to a quadrilateral box that encloses the character sequence "'Work and Power'", and the character sequence "'Work and Power'" is the difference data of the first content. Accordingly, at step S204, the character sequence "'Work and Power'" is set as the content title data of the first content.

Similarly, in the case of a fifth content, for example, a character sequence "Information A 'Security in Internet Society'" is set as content title data of the content. In the case of an eighteenth content (which corresponds to the rightmost quadrilateral box in FIG. 10), for example, a character sequence "Iwashi's Karakuri TV" is set as the content title data of the content.

Meanwhile, if it is determined at step S203 that the nth content does not have the difference data, control proceeds to step S205.

At step S205, the content title setting section 104 determines whether there is detailed information of the nth content. It is assumed here that the detailed information is included in the EPG and describes details of the content, such as a content of the content or a guest in the content.

For example, the content title setting section 104 outputs, to the EPG data acquisition section 101 via the control section 105, information for identifying the nth content and a request to acquire the detailed information included in the EPG data of the nth content. If the detailed information included in the EPG data of the nth content is acquired by the EPG data acquisition section 101 successfully, the acquired detailed information is supplied to the content title setting section 104 via the control section 105, and it is determined at step S205 that there is the detailed information of the nth content.

Meanwhile, if the detailed information included in the EPG data of the nth content is not acquired by the EPG data acquisition section 101 successfully, for example, it is determined at step S205 that there is not the detailed information of the nth content.

If it is determined at step S205 that there is the detailed information of the nth content, control proceeds to step S206.

At step S206, the content title setting section 104 sets the detailed information, the presence of which has been determined by the process of step S205, as the content title data of the nth content. Note that, in the case where the number of characters included in the detailed information is greater than a predetermined number, a predetermined number of characters are extracted from the detailed information, and the extracted characters are set as the content title data, for example.

If it is determined at step S205 that there is not the detailed information of the nth content, control proceeds to step S207. At step S207, the content title setting section 104 sets the EPG title data as the content title data of the nth content.

For example, in FIG. 10, the two contents collected in the folder "Dishes for Tonight" do not have the difference data. Therefore, in the case of these contents, control proceeds from step S203 to step S205.

Then, if the two contents collected in the folder "Dishes for Tonight" have the detailed information, the respective pieces of detailed information are set as the content title data thereof. In this case, a character sequence that describes the content of the content, such as a name of a dish or a guest in the content, is set as the content title data of the content. Such a character sequence is included in the EPG data as the detailed information, for example.

In the case where the two contents collected in the folder "Dishes for Tonight" do not have the detailed information, "Dishes for Tonight" is set as the content title data of both the contents.

After the process of step S206 or step S207, control proceeds to step S208. At step S208, the content title setting section 104 determines whether there is a next content for which the content title data has not been set. If it is determined at step S208 that there is such a content, control proceeds to step S209. At step S209, the value of the variable n is incremented by one, and control returns to step S202.

Thereafter, the processes of steps S202 to S209 are repeated until it is determined at step S208 that there is not the next content.

If it is determined at step S208 that there is not the next content, the content title setting process is finished.

While it has been noted earlier that the content title setting process is performed when, in the situation where the plurality of contents have already been stored in the HDD 53, the content title data is set for the individual contents, the content title data may be set for the individual contents while the title grouping process as shown in FIG. 3 is performed, for example.

In that case, the processes of steps S203 to S207 in FIG. 11 may be performed following the process of step S144 in FIG. 8, for example.

For example, when the content title setting section 104 sets the content title data at step S204, step S206, or step S207, the content title setting section 104 may acquire, via the EPG data acquisition section 101, information of a broadcast date and time, information of a broadcast duration, or the like included in the EPG of the content, and add a character sequence denoting the broadcast date and time, the broadcast duration, or the like of the content to the content title data thereof.

In the above-described manner, the content title is set for each of the individual contents.

Thus, the display data can be generated for allowing the list of content titles, which is used for identifying the desired content when the user issues the instruction to reproduce the content, for example, to be displayed on the screen in a more user-friendly manner.

Figure 12:
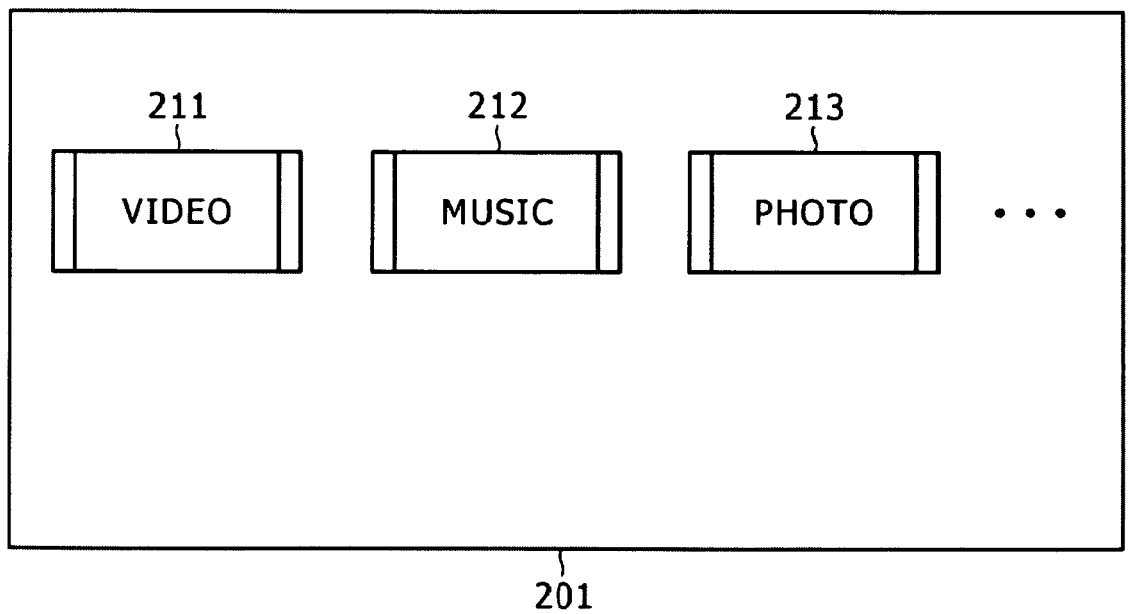
FIG. 12 shows an example of a GUI.

For example, suppose the case where a graphical user interface (GUI) as shown in FIG. 12 is used to display a list of contents. In FIG. 12, an icon 211, an icon 212, an icon 213, and so on are displayed on a display screen 201. The icon 211 is an icon denoting a video content. The icon 212 is an icon denoting a music content. The icon 213 is an icon denoting a photo (picture or still image) content. If the icon 211 is selected by a user operation, for example, a list of video contents stored in the HDD 53 of the data processing apparatus 11 is displayed.

Figure 13:
FIG. 13 shows one known manner of displaying a list of contents.

FIG. 13 shows one known manner of displaying a list of contents. This figure shows a GUI that is displayed on the display screen 201 when the icon 211 has been selected by the user operation, for example. In this GUI, thumbnails 231, 232, 233, 234, 235, 236, and 237 of the contents and the EPG title data of each of the contents are being displayed. If the user selects one of the thumbnails displayed on the display screen 201, for example, data of the content corresponding to that thumbnail is read from the HDD 53 and reproduced.

In this example, the thumbnails 231 to 237 are being displayed vertically in a line on the left-hand side of the display screen 201, while the EPG title data is being displayed to the right of each of the thumbnails 231 to 237. A list of seven contents, which correspond to the thumbnails 231 to 237, is being displayed on the display screen 201, and these contents correspond to broadcasts of a plurality of games in an international soccer competition "VIVA World Cup 2006", for example. To the right of the thumbnail 231, for example, a character sequence "VIVA World Cup 2006 'Uk" is being displayed. In addition, below this character sequence, a broadcast date and time of the content, "6/29 (Thu) 3:45 AM", and a broadcast duration of the content, "(2H15M)" (which denotes 2 hours and 15 minutes) are being displayed.

The character sequence "VIVA World Cup 2006 "Uk", which is being displayed to the right of the thumbnail 231, is a part of "VIVA World Cup 2006 'Ukraine' vs 'Switzerland'", which is the actual EPG title data of the content. The remaining part of the EPG title data, i.e., "raine' vs 'Switzerland'", is omitted due to the limited display area of the screen.

Similarly, the EPG title data that is being displayed to the right of each of the thumbnails 232 to 237 is also partially omitted due to the limited display area of the screen.

In this example, the EPG title data as known is being displayed as the title of the content. Accordingly, for example, while a part of the EPG title data, "VIVA World Cup 2006", is being displayed repetitively for all of the contents, character sequences (e.g., "'Ukraine' vs 'Switzerland'") that denote competing countries are partially or entirely omitted despite the fact that this part of the information is important for the user.

Figure 14:
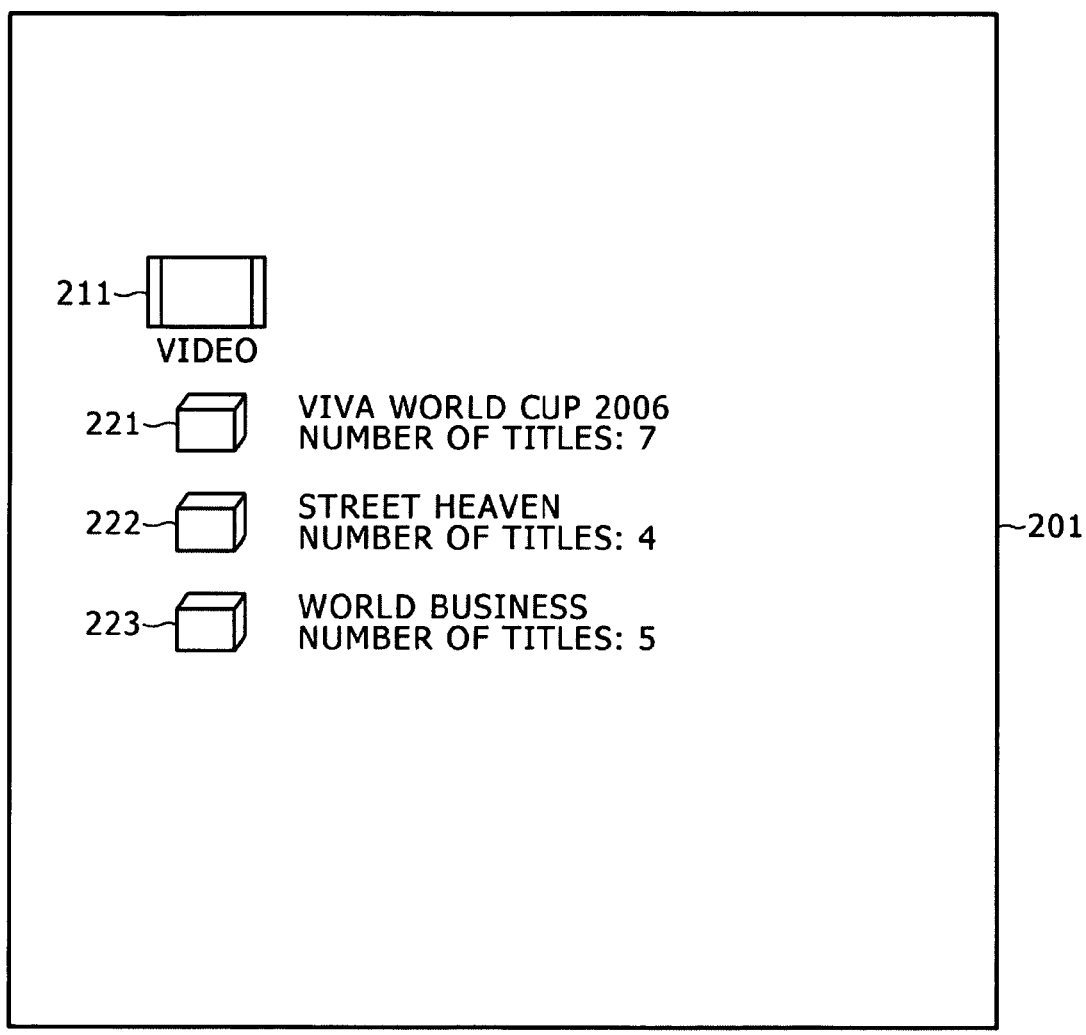
FIG. 14 shows an example of a GUI showing a list of contents that is displayed in accordance with one embodiment of the present invention.
Figure 15:
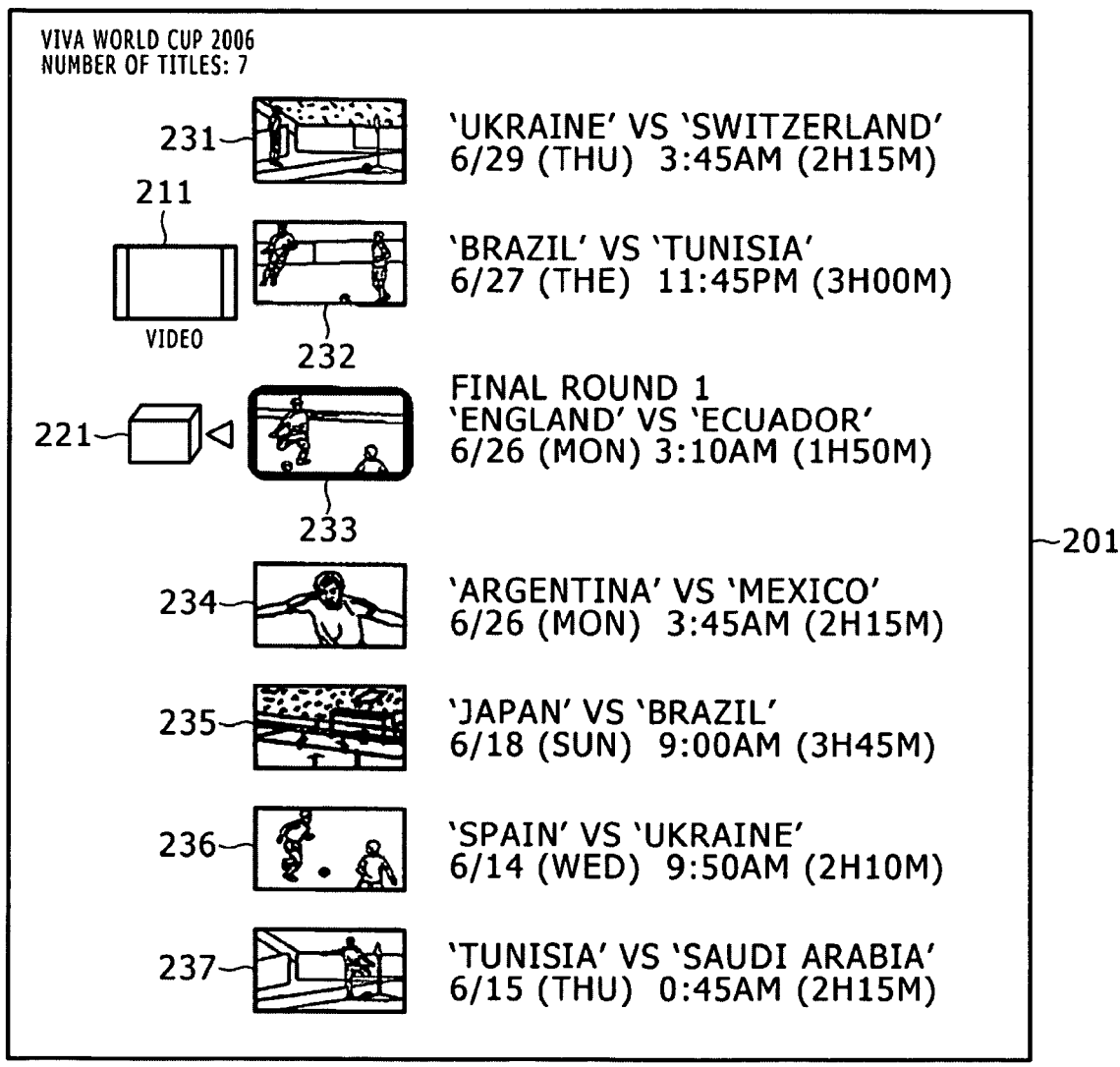
FIG. 15 shows an example of a list of contents that is displayed in accordance with one embodiment of the present invention.

In contrast, according to this embodiment of the present invention, the list of contents can be displayed in a manner as shown in FIGS. 14 and 15, for example. For example, the controller 52 of the data processing apparatus 11 generates display data as described below for the display screen, and outputs the generated display data to the television receiver 12, so that the list of contents is displayed on the screen of the television receiver 12 as described below.

In the case where the user desires to reproduce a desired video content stored in the HDD 53, the icon 211 for the video contents is selected in the GUI as shown in FIG. 12 by the user operation, for example. As a result, a GUI as shown in FIG. 14, for example, is displayed on the display screen 201. In the example of FIG. 14, folders 221, 222, and 223, in which video contents are collected, are being displayed on the display screen 201 along with the icon 211. The folders 221 to 223 are folders created by the process as described above with reference to FIG. 8, for example, and a plurality of contents are collected in each of the folders 221 to 223.

To the right of the folder 221 in FIG. 14, a name of the folder, "VIVA World Cup 2006", is being displayed, and below it, a character sequence "Number of Titles: 7", which indicates the number of contents collected in this folder, is being displayed. As described above, the folder corresponds to that part of the EPG title data subjected to the group separation which is common to the different contents, and therefore, in this example, seven contents whose EPG title data includes the character sequence "VIVA World Cup 2006" are collected in the folder 221.

Similarly, a folder name of the folder 222 is "Street Heaven", and four contents are collected in this folder 222. A folder name of the folder 223 is "World Business", and five contents are collected in this folder 223.

If, in the GUI as shown in FIG. 14, the folder 221 is selected by a user operation, for example, a GUI as shown in FIG. 15, for example, is displayed on the display screen 201. In the example of FIG. 15, the icon 211 and the folder 221, which is the selected folder corresponding to the icon 211, are being displayed on the display screen 201, and in addition, the thumbnails 231 to 237 of the seven contents contained in the folder 221 are being displayed vertically in a line on the display screen 201. For example, if the user selects one of the thumbnails displayed on the display screen 201, the data of the content corresponding to that thumbnail is read from the HDD 53 and reproduced.

Notice that, in this example, the name of the folder 221, "VIVA World Cup 2006", and the character sequence "Number of Titles: 7", which indicates the number of contents collected in the folder 221, are being displayed at the upper left corner of the display screen 201.

In addition, to the right of each of the thumbnails 231 to 237, the content title data of the corresponding content is being displayed. To the right of the thumbnail 231, for example, a character sequence "'Ukraine' vs 'Switzerland'" is being displayed. In addition, below it, the broadcast date and time of the content, "6/29 (Thu) 3:45 AM", and the broadcast duration of the content, "(2H15M)" (which denotes 2 hours and 15 minutes), are being displayed.

The character sequence "'Ukraine' vs 'Switzerland'", which is being displayed to the right of the thumbnail 231, corresponds to the content title data as set by the process as described above with reference to FIG. 11, and corresponds to a difference-data part of the actual EPG title data "VIVA World Cup 2006 'Ukraine' vs 'Switzerland'".

Similarly, the content title data that is being displayed to the right of each of the thumbnails 232 to 237 also corresponds to the difference data within the actual EPG title data.

Note that, as described above, in the case where there is not the difference data within the EPG title data, the character sequence included in the detailed information in the EPG is set as the content title data. That is, the content title data that is displayed to the right of any of the thumbnails 231 to 237 may be the character sequence included in the detailed information in the EPG.

Note that the content title setting section 104 may acquire, via the EPG data acquisition section 101, the information of the broadcast date and time and the information of the broadcast duration included in the EPG of the content and add them to the content title data when the content title setting section 104 sets the content title data at step S204, step S206, or step S207 in FIG. 11, for example. In that case, the character sequences such as "6/29 (Thu) 3:45 AM", which is displayed to indicate the broadcast date and time of the content, and "(2H15M)", which is displayed to indicate the broadcast duration of the content, can be displayed easily when the list of contents is displayed.

As described above, according to this embodiment of the present invention, for example, that part of the EPG title data which is common to the different contents, "VIVA World Cup 2006", is displayed as the name of the folder 221, while the character sequences (e.g., "'Ukraine' vs 'Switzerland'") that denote competing countries, which are important for the user, are displayed as the titles of the individual contents. Thus, the user is able to select the desired content quickly.

Figure 16:
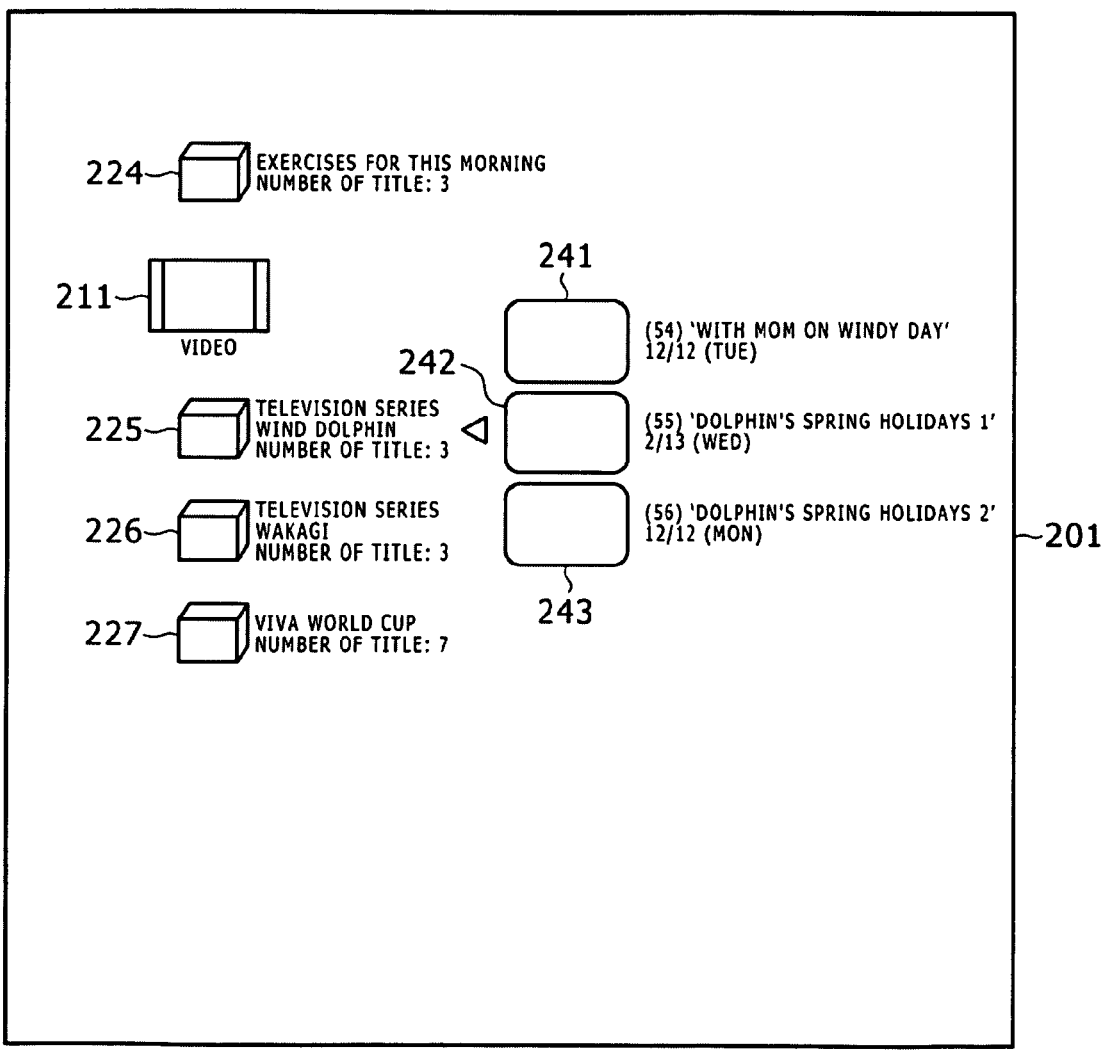
FIG. 16 shows another exemplary GUI showing a list of contents that is displayed in accordance with one embodiment of the present invention.

FIG. 16 shows another exemplary list of contents as displayed on the display screen 201 according to this embodiment of the present invention.

In this case, when the user desires to reproduce a desired video content as stored in the HDD 53, the icon 211 for the video contents is selected in the GUI as shown in FIG. 12 by the user operation, for example, so that the GUI as described above with reference to FIG. 14, for example, in which the icon 211 and the plurality of folders in which the video contents are collected are displayed, is displayed on the display screen 201, and when one of the folders has been selected, a GUI as shown in FIG. 16 is displayed. Note that it is assumed here that a folder 225 has been selected. Also note that folders 224, 225, 226, and 227 are also folders created by the process as described above with reference to FIG. 8, for example, and that a plurality of contents are collected in each of the folders 224 to 227.

To the right of the folder 225, a name of this folder, "Television Series Wind Dolphin", is being displayed, and below it, a character sequence "Number of Titles: 3" is being displayed. As described above, the folder corresponds to that part of the EPG title data subjected to the group separation which is common to different contents, and therefore, in this example, three contents whose EPG title data includes the character sequence "Television Series Wind Dolphin" are collected in the folder 225.

As a result of the folder 225 been selected, thumbnails 241, 242, and 243, which correspond to the three contents collected in the folder 225, are being displayed. If the user selects one of the thumbnails as displayed on the display screen 201, for example, data of a content corresponding to that selected thumbnail is read from the HDD 53 and reproduced.

To the right of each of the thumbnails 241 to 243, the content title data of the corresponding content is being displayed. To the right of the thumbnail 241, for example, a character sequence "(54) 'With Mom on Windy Day'" is being displayed. In addition, below this character sequence, a character sequence "12/12 (Thu)", which indicates a broadcast date of this content, is being displayed.

The character sequence "(54) 'With Mom on Windy Day'", which is being displayed to the right of the thumbnail 241, corresponds to the content title data as set by the process as described above with reference to FIG. 11, and corresponds to a difference-data part of actual EPG title data "Television Series Wind Dolphin (54) 'With Mom on Windy Day'".

Similarly, the content title data that is being displayed to the right of each of the thumbnails 242 and 243 also corresponds to the difference data within the actual EPG title data.

Note that, as described above, in the case where there is not the difference data within the EPG title data, the character sequence included in the detailed information in the EPG is set as the content title data. That is, the content title data that is being displayed to the right of any of the thumbnails 241 to 243 may be the character sequence included in the detailed information in the EPG.

Figure 17:
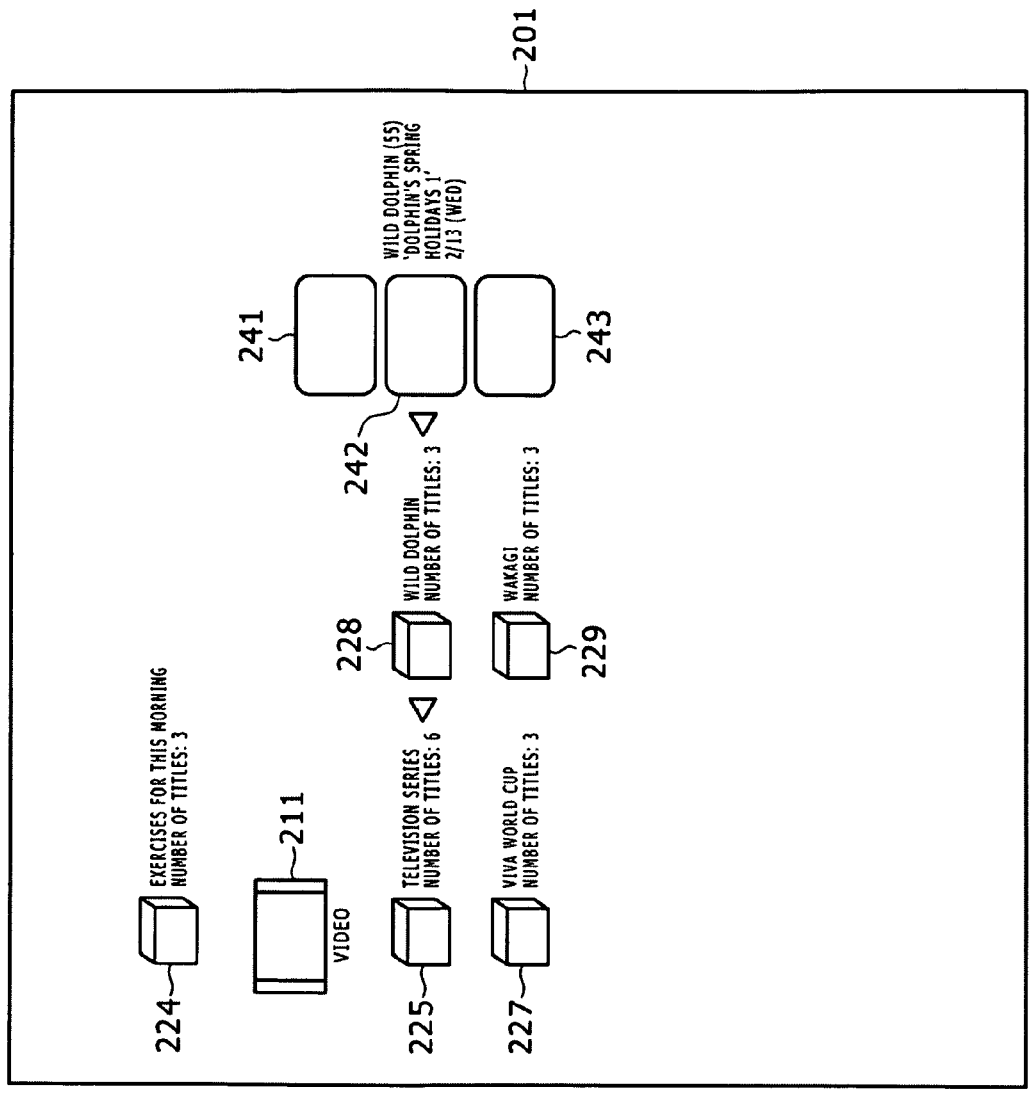
FIG. 17 shows yet another exemplary GUI showing a list of contents that is displayed in accordance with one embodiment of the present invention.

FIG. 17 shows yet another exemplary list of contents as displayed on the display screen 201 according to this embodiment of the present invention.

In the case of FIG. 17 also, as in the case of FIG. 16, when the user desires to reproduce a desired video content as stored in the HDD 53, the icon 211 for the video contents is selected in the GUI as shown in FIG. 12 by the user operation, for example, so that the GUI as described above with reference to FIG. 14, for example, in which the icon 211 and the plurality of folders in which the video contents are collected are displayed, is displayed on the display screen 201, and when one of the folders has been selected, a GUI as shown in FIG. 17 is displayed.

It is assumed in the case of FIG. 17 that the contents collected in the folders 225 and 226 in FIG. 16 are collected in a parent folder 225. Specifically, the contents whose EPG title data includes "Television Series Wind Dolphin" and contents whose EPG title data includes "Television Series Wakagi" share a part of the EPG title data, "Television Series", and accordingly, the folder 225 named "Television Series" has been created by the process as described above with reference to FIG. 8, for example.

Then, when the folder 225 has been selected, folders 228 and 229 are displayed to the right of the folder 225. A name of the folder 228 is "Wind Dolphin", and three contents are collected in this folder 228 (hence "Number of Titles: 3"). Meanwhile, a name of the folder 229 is "Wakagi", and three contents are collected in this folder 229 (hence "Number of Titles: 3"). Both of the folders 228 and 229 have been created by the process as described above with reference to FIG. 8, for example.

Further, as a result of the folder 228 being selected, the thumbnails 24: to 243, which correspond to the three contents collected in the folder 228, are being displayed. If the user selects one of the thumbnails as displayed on the display screen 201, for example, data of a content that corresponds to that selected thumbnail is read from the HDD 53 and reproduced.

In this example, if the user moves a cursor to one of the thumbnails on the GUI, for example, content title data of only one content that corresponds to that thumbnail, on which a focus is placed, is displayed to the right of the thumbnail. In this example, of the thumbnails 241 to 243, the focus is placed on the thumbnail 242, and content title data of a content corresponding to the thumbnail 242, i.e., "(55) 'Dolphin's Spring Holidays'", is being displayed to the right of the thumbnail 242. In addition, below the content title data, a character sequence "12/13 (Wed)" is being displayed to indicate the broadcast date of the content.

As described above, displaying the folders in which the contents are collected in hierarchical form enables the user to search for his or her desired content more easily.

As described earlier with reference to FIG. 1, the printer 13 is connected to the data processing apparatus 11. When the contents stored in the HDD 53 have been copied or moved to the DVD, for example, the printer 13 may be used to print the content title data of those contents on the DVD.

It is assumed here that the printer 13 is capable of printing characters and so on a surface (which is different from a recording surface) of a disk-shaped storage medium, such as the DVD, based on print-use data supplied from the data processing apparatus 11, for example.

Figure 18:
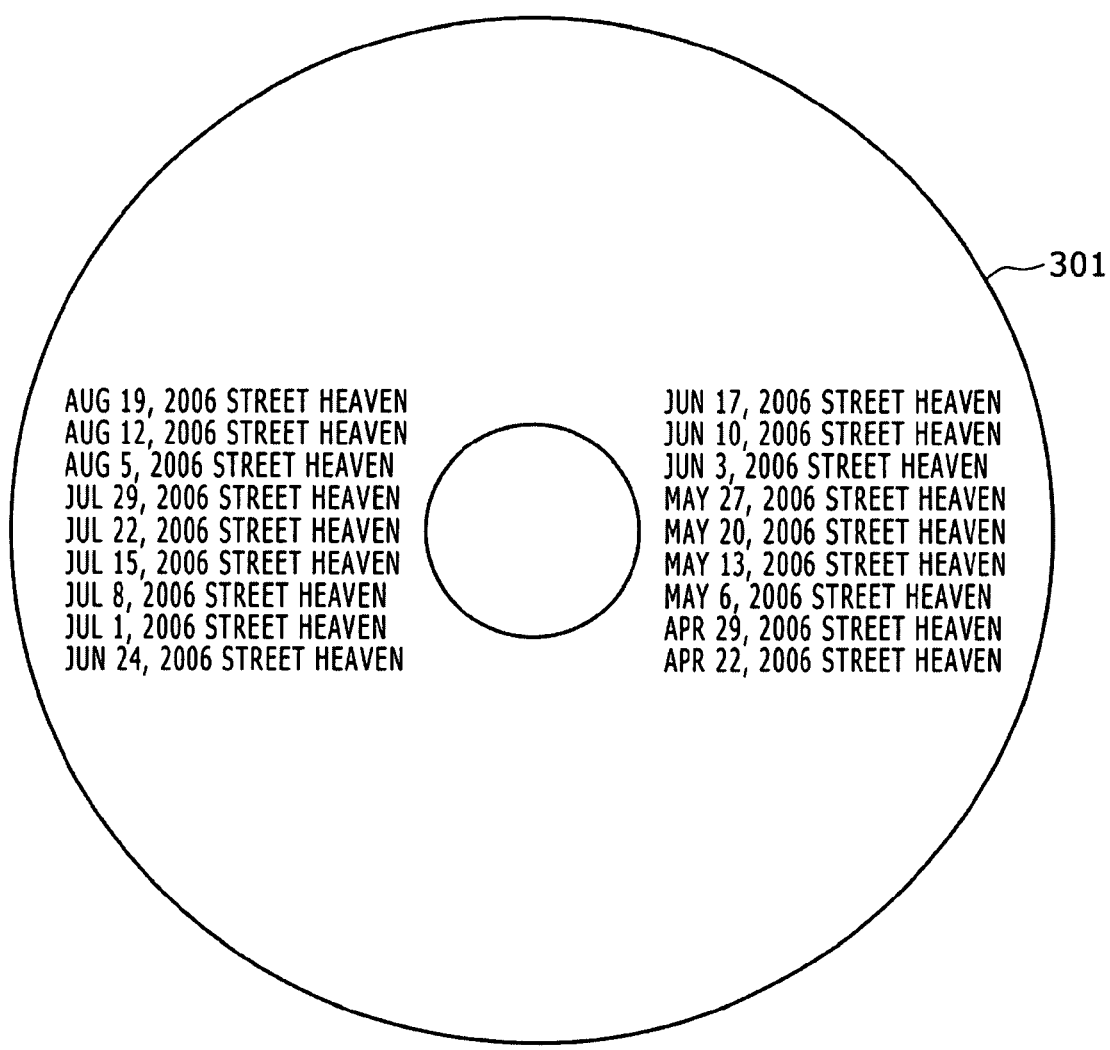
FIGS. 18 and 19 show examples of how content titles are printed on a storage medium in related art.
Figure 19:
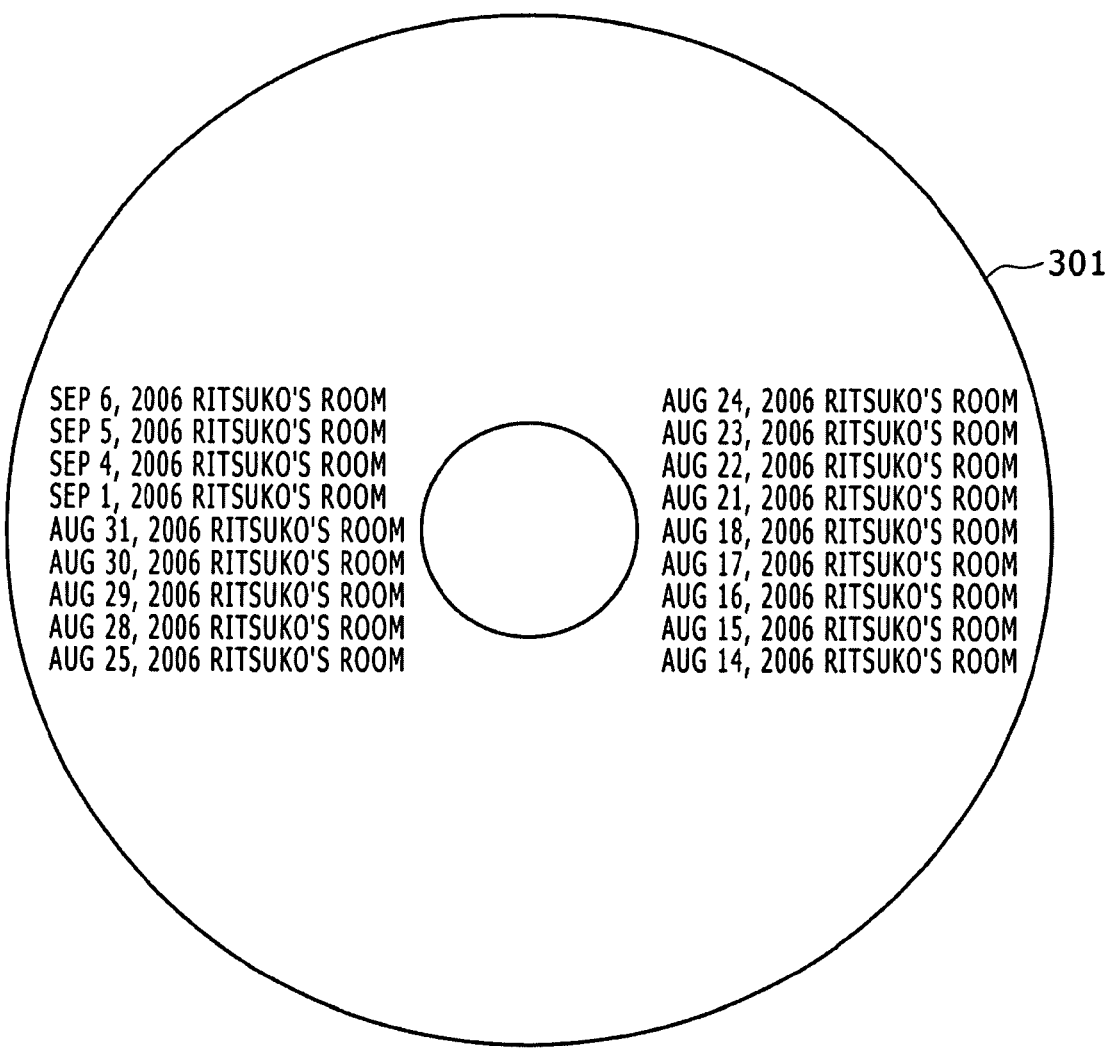

Printing of the content titles and so on the storage medium, such as the DVD, has been common for years. FIGS. 18 and 19 show examples of how the content titles are printed on the storage medium in related art.

FIG. 18 shows a disk 301 on which eighteen contents of a series of programs "Street Heaven", which had been broadcast in series, are recorded. In FIG. 18, broadcast dates and EPG title data of the contents are shown vertically in two lines. On the right-hand side of the disk 301, the EPG title data ("Street Heaven") of nine contents, which were broadcast from Apr. 22, 2006 to Jun. 17, 2006, are printed along with the broadcast dates of the respective contents. Meanwhile, on the left-hand side of the disk 301, the EPG title data ("Street Heaven") of nine contents, which were broadcast from Jun. 24, 2006 to Aug. 19, 2006, are printed along with the broadcast dates of the respective contents.

FIG. 19 shows a disk 301 on which eighteen contents of a series of programs "Ritsuko's Room", which had been broadcast in series, are recorded. In FIG. 19 as well, broadcast dates and EPG title data of the contents are shown vertically in two lines. On the right-hand side of the disk 301, the EPG title data ("Ritsuko's Room") of nine contents, which were broadcast from Aug. 14, 2006 to Aug. 24, 2006, are printed along with the broadcast dates of the respective contents. Meanwhile, on the left-hand side of the disk 301, the EPG title data ("Ritsuko's Room") of nine contents, which were broadcast from Aug. 25, 2006 to Sep. 6, 2006, are printed along with the broadcast dates of the respective contents.

Note, however, that when the user desires to reproduce a desired content recorded on a certain storage medium, it may be difficult for the user to judge whether the desired content is recorded on the disk 301 by seeing the print on the storage medium as shown in FIG. 18 or FIG. 19. For example, in the case of series of programs that are broadcast in series, different locations or guests are often featured on different broadcast dates, and the user may desire to reproduce a particular content that features a location or guest that interests the user. In such a situation, the user cannot judge whether or not the content that features the location or guest that interests the user is recorded on the disk, by seeing the content titles as printed in the manner as shown in FIG. 18 or FIG. 19.

In some cases, the EPG title data includes a character sequence that indicates the location or guest of the content. In such cases, however, it may be difficult to print the entire character sequence of the EPG title data of each content within a limited printable area on the surface of the disk 301. If the entire character sequence of the EPG title data of each content is printed on the surface of the disk 301, a character size may need to be extremely small, with the result that those character sequences are illegible for the user.

As such, in one embodiment of the present invention, the content title data as described above is printed on the storage medium.

Figure 21:
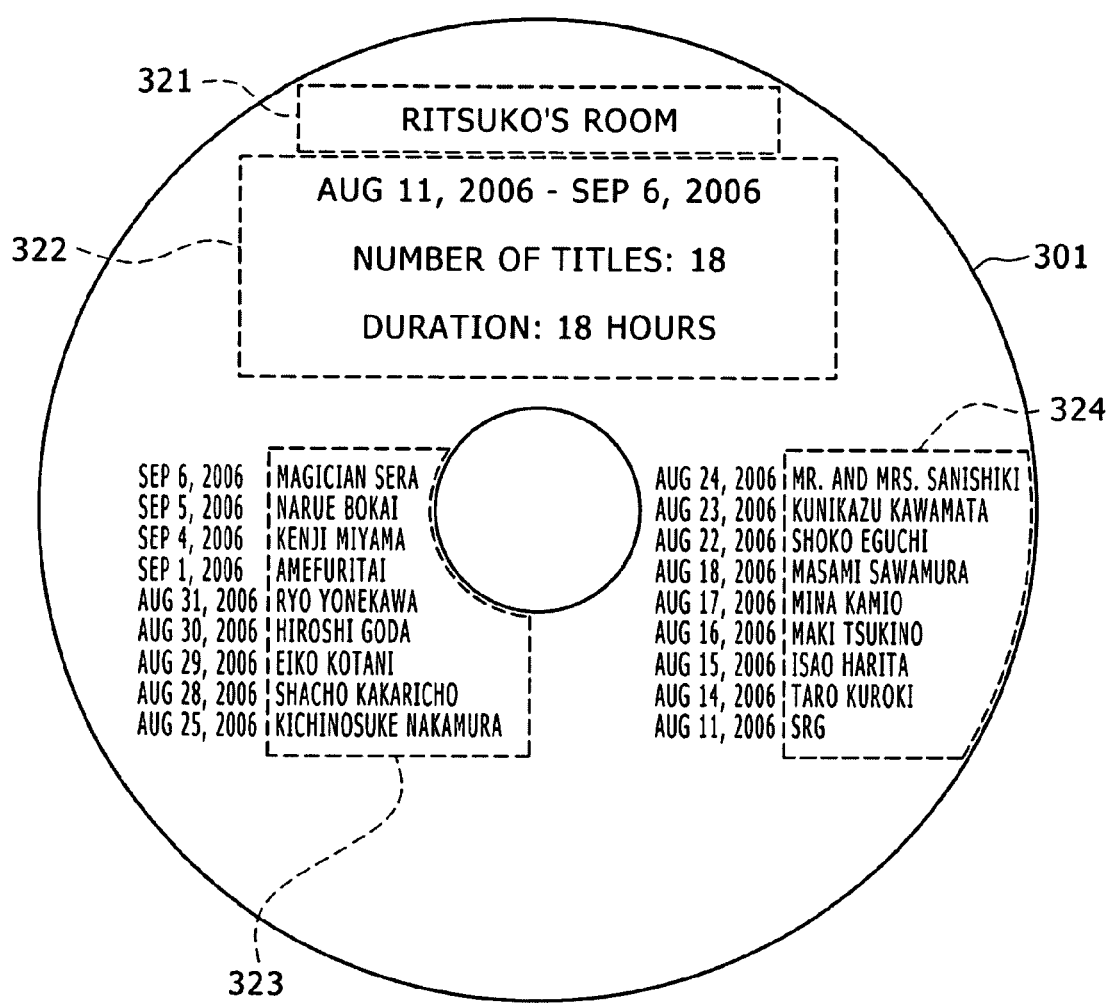
FIG. 21 shows another example of how the content titles are printed on the storage medium in accordance with one embodiment of the present invention.

FIGS. 20 and 21 show examples of how the content titles are printed on the storage medium in this embodiment of the present invention. That is, FIGS. 20 and 21 show examples of the surface of the disk 301 on which the printer 13 has printed characters and so on based on the print-use data generated and supplied by the controller 52 in the data processing apparatus 11.

FIG. 20 shows the disk 301 on which the eighteen contents of the series of programs "Street Heaven", which were broadcast in series, are recorded, as in the case of FIG. 18. In FIG. 20, a part of the EPG title data of the contents is printed in an area 321 on the surface of the disk 301. In this example, the character sequence "Street Heaven" is printed in the area 321. That is, a part of the EPG title data that is common to all of the eighteen contents, e.g., the name of the folder that has been created by the process as described above with reference to FIG. 8, is printed in the area 321.

In an area 322, the earliest (Apr. 22, 2006) and last (Aug. 19, 2006) ones of the broadcast dates of the contents recorded on the disk 301 are printed. In addition, in the area 322, a character sequence "Number of Titles: 18", which indicates that the number of contents recorded on the disk 301 is 18, is printed below the earliest and last broadcast dates. Still further, in the area 322, a character sequence "Duration: 18 hours", which indicates that the total broadcast duration of the contents recorded on the disk 301 is 18 hours, is printed below the character sequence "Number of Titles: 18".

In areas 323 and 324, pieces of content title data of the contents, which having their respective broadcast dates, are printed. These pieces of content title data are the content title data that has been set by the process as described above with reference to FIG. 11, and are the character sequences that correspond to the difference data in the EPG title data of the respective contents, for example. In the example of FIG. 20, to the left of each piece of content title data, the broadcast date of the corresponding content is printed, and each piece of content title data indicates the location featured in the program "Street Heaven" which was broadcast on the corresponding date.

FIG. 21 shows the disk 301 on which the eighteen contents of the series of programs "Ritsuko's Room", which were broadcast in series, are recorded, as in the case of FIG. 19. In FIG. 21, a part of the EPG title data of the contents is printed in the area 321 on the surface of the disk 301. In this example, the character sequence "Ritsuko's Room" is printed in the area 321. That is, a part of the EPG title data that is common to all of the eighteen contents, e.g., the name of the folder that has been created by the process as described above with reference to FIG. 8, is printed in the area 321.

It is assumed here that the EPG title data of all of the eighteen contents that are recorded on the disk 301 as shown in FIG. 21 denotes "Ritsuko's Room" alone and includes no difference data.

In the area 322, the earliest (Aug. 11, 2006) and last (Sep. 6, 2006) ones of the broadcast dates of the contents recorded on the disk 301 are printed. In addition, in the area 322, a character sequence "Number of Titles: 18", which indicates that the number of contents recorded on the disk 301 is 18, is printed below the earliest and last broadcast dates. Still further, in the area 322, a character sequence "Duration: 18 hours", which indicates that the total broadcast duration of the contents recorded on the disk 301 is 18 hours, is printed below the character sequence "Number of Titles: 18".

In the areas 323 and 324, pieces of content title data of the contents, which have their respective broadcast dates, are printed. These pieces of content title data are the content title data that has been set by the process as described above with reference to FIG. 11, and correspond to the character sequences that have been extracted from the detailed information in the EPG of the respective contents, for example. In the example of FIG. 21, to the left of each piece of content title data, the broadcast date of the corresponding content is printed, and each piece of content title data indicates a main guest of the program "Ritsuko's Room" which was broadcast on the corresponding date.

FIG. 22 shows an example of how the content titles are printed on the storage medium in the case where a plurality of contents of the series of programs "Street Heaven", which were broadcast in series, and a plurality of contents of the series of programs "Ritsuko's Room", which were broadcast in series, are recorded on the same disk 301. That is, FIG. 22 shows an example of the surface of the disk 301 on which the printer 13 has printed characters and so on based on the print-use data supplied from the data processing apparatus 11.

FIG. 22 shows the disk 301 on which nine contents of the series of programs "Street Heaven", which were broadcast in series, and nine contents of the series of programs "Ritsuko's Room", which were broadcast in series, are recorded. That is, a plurality of sets of series of programs are recorded collectively on the single disk 301.

In FIG. 22, a part of the EPG title data of the contents is printed in areas 341 and 351 on the surface of the disk 301. In this example, the character sequence "Street Heaven" is printed in the area 341, and the character sequence "Ritsuko's Room" is printed in the area 351. That is, a part of the EPG title data that is common to the nine contents, e.g., the name of the folder that has been created by the process as described above with reference to FIG. 8, is printed in the area 341. Meanwhile, a part of the EPG title data that is common to the other nine contents, e.g., the name of the folder that has been created by the process as described above with reference to FIG. 8, is printed in the area 351.

In an area 342, the earliest (Jun. 24, 2006) and last (Aug. 19, 2006) ones of the broadcast dates of the nine contents recorded on the disk 301 and which are collected in the folder having a name corresponding to the area 341 are printed. In addition, a character sequence "Number of Titles: 9", which indicates that the number of recorded contents is 9, is printed below those broadcast dates. Still further, a character sequence "Duration: 9 hours", which indicates that the total broadcast duration of the recorded contents is 9 hours, printed below the character sequence "Number of Titles: 9".

In an area 343, the content title data of each of the nine contents that are collected in the folder having the name corresponding to the area 341 is printed. These pieces of content title data are the content title data that has been set by the process as described above with reference to FIG. 11, and in this example, the broadcast date of each content is printed to the left of the corresponding piece of content title data.

In an area 352, the earliest (Aug. 11, 2006) and last (Aug. 24, 2006) ones of the broadcast dates of the nine contents recorded on the disk 301 and which are collected in a folder having a name corresponding to the area 351 are printed. In addition, a character sequence "Number of Titles: 9", which indicates that the number of recorded contents is 9, is printed below those broadcast dates. Still further, a character sequence "Duration: 9 hours", which indicates that the total broadcast duration of the recorded contents is 9 hours, is printed below the character sequence "Number of Titles: 9".

In an area 353, the content title data of each of the nine contents that are collected in the folder having the name corresponding to the area 351 is printed. These pieces of content title data are the content title data that has been set by the process as described above with reference to FIG. 11, and in this example, the broadcast date of each content is printed to the left of the corresponding piece of content title data.

As described above, in this embodiment of the present invention, the part of the EPG title data which is common to a plurality of contents, e.g., "Street Heaven" or "Ritsuko's Room", is printed as the name of the folder, while the character sequences (e.g., the locations, the guests, etc.) that denote the information that is important for the user is printed as the title of each individual content, for example. Therefore, the user is able to identify easily whether the content that features the location or guest that interests the user is recorded on the storage medium.

FIG. 23 shows an example of how the content titles are printed on the storage medium according to this embodiment of the present invention, in the case where a plurality of contents that are collected in folders on different hierarchical levels are recorded on a single storage medium. That is, FIG.

23 also shows an example of the surface of the disk 301 on which the printer 13 has printed characters and so on based on the print-use data supplied from the data processing apparatus 11.

In this example, it is assumed that, as a result of the process as described above with reference to FIG. 8, for example, the folder "MHK High School Course" has been created as a high-level folder; four folders "English", "Chemistry", "Japanese History", and "Geography" have been created as folders subordinate to the folder "MHK High School Course"; and three contents are collected in each of the four folders. It is also assumed that these twelve (=4×3) contents are recorded on the disk 301.

In FIG. 23, a part of the EPG title data of the contents is printed in the area 321 on the surface of the disk 301. In this example, the character sequence "MHK High School Course" is printed in the area 321. That is, that part of the EPG title data which is common to all of the twelve contents, e.g., the name of the highest-level folder created by the process as described above with reference to FIG. 8, is printed in the area 321.

The earliest (Aug. 11, 2006) and last (Aug. 28, 2006) ones of the broadcast dates of the contents recorded on the disk 301 are printed in the area 322. In addition, a character sequence "Number of Titles: 12", which indicates that the number of recorded contents is 12, is printed below those broadcast dates. Still further, a character sequence "Duration: 12 hours", which indicates that the total broadcast duration of the recorded contents is 12 hours, is printed below the character sequence "Number of Titles: 12".

In areas 361, 362, 363, and 364, content title data of each of the contents, which were broadcast on their respective broadcast dates, is printed. At the top of each of the areas 361 to 364, the name of the corresponding one of the four folders, which are subordinate to the folder whose name is printed in the area 321, is printed.

Specifically, in the area 361, the content title data of each of the three contents collected in the folder "English" is printed. In the area 362, the content title data of each of the three contents collected in the folder "Chemistry" is printed. In the area 363, the content title data of each of the three contents collected in the folder "Japanese History" is printed. In the area 364, the content title data of each of the three contents collected in the folder "Geography" is printed.

These pieces of content title data are the content title data that has been set by the process as described above with reference to FIG. 11, and are the character sequences that correspond to the difference data in the EPG title data of the respective contents, for example. In the example of FIG. 23, to the left of each piece of content title data, the broadcast date of the corresponding content is printed.

As described above, the folders in which the contents are collected are printed in hierarchical form. This enables the user to identify more easily whether or not the content that features the location, guest, or the like that interests the user is recorded on the storage medium.

In the foregoing description, it has been assumed that the storage medium on which the contents are recorded is the disk 301. Note, however, that the storage medium on which the contents are recorded is not limited to disk-shaped storage media, and that the present invention is applicable to any type of storage media.

According to the embodiment of the present invention, the title-grouped data as shown in FIG. 10 is generated, and if there is a part of the EPG title data subjected to the group separation which is common to different contents, a folder is created for that common part, and those contents are collected in this folder as described above. How many levels of folders are created depends on the EPG title data of the contents.

Specifically, as described above, if a plurality of pieces of EPG title data that share a common character sequence in the first group share a common character sequence in the second group as well, a subordinate folder is additionally created. In this manner, the number of levels of folders may further increase from two to three, four, and so on. This may make it easier for the user to identify the content to be reproduced when the user issues the instruction to reproduce the content, for example. However, an excessive increase in the number of levels of folders may result in an increase in the time demanded for finding the desired content, rather than making it easier to find the desired content.

As such, in one embodiment of the present invention, the user is allowed to specify the number of levels of folders that can be created when the pieces of EPG title data of the contents are subjected to the group separation and the grouping, for example. In other words, the user is allowed to specify an upper limit of the number of levels of the folders that can be created when the pieces of EPG title data are subjected to the group separation and the grouping, so that a folder will not be created on an additional level.

Figure 24:
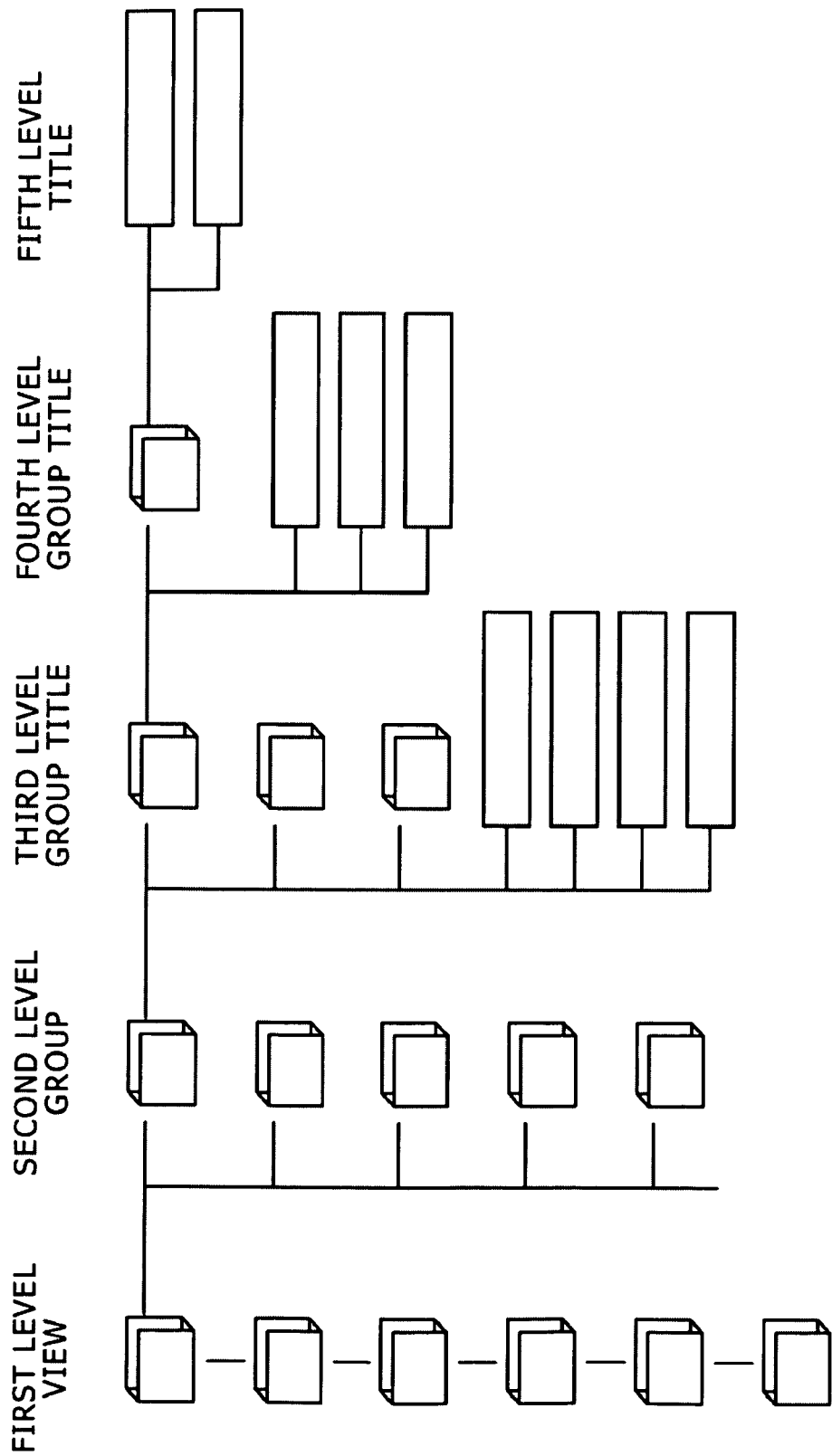
FIG. 24 illustrates an exemplary folder hierarchy in accordance with one embodiment of the present invention.

FIG. 24 is a diagram for explaining about an example of folder levels according to one embodiment of the present invention. FIG. 24 shows an exemplary case where the upper limit of the number of levels of the folders that can be created when the pieces of EPG title data are subjected to the group separation and the grouping is set to 2.

In FIG. 24, a first level is referred to as "View", and this level is used for specifying a manner of displaying the list of contents, for example. A second level is referred to as "Group", and on this level, a collection of contents that are made selectable in accordance with the display manner specified on the first level are displayed.

Third and fourth levels are referred to as "Group Title", and on these levels, the lists of contents that have been grouped by subjecting the pieces of EPG title data to the group separation and the grouping as described above are displayed. On the third and fourth levels, the folder is created for the contents that share a common part in the EPG title data subjected to the group separation, while the content title is displayed for the content that does not share a common part in the EPG title data with any other content.

A fifth level is referred to as "Title", and on this level, the content titles are displayed. That is, because the upper limit of the number of levels of the folders that can be created when the pieces of EPG title data are subjected to the group separation and the grouping is set to 2, no folder is created on the fifth level even if different contents share a common part in the EPG title data, and instead the content titles of the respective contents are displayed.

Figure 25:
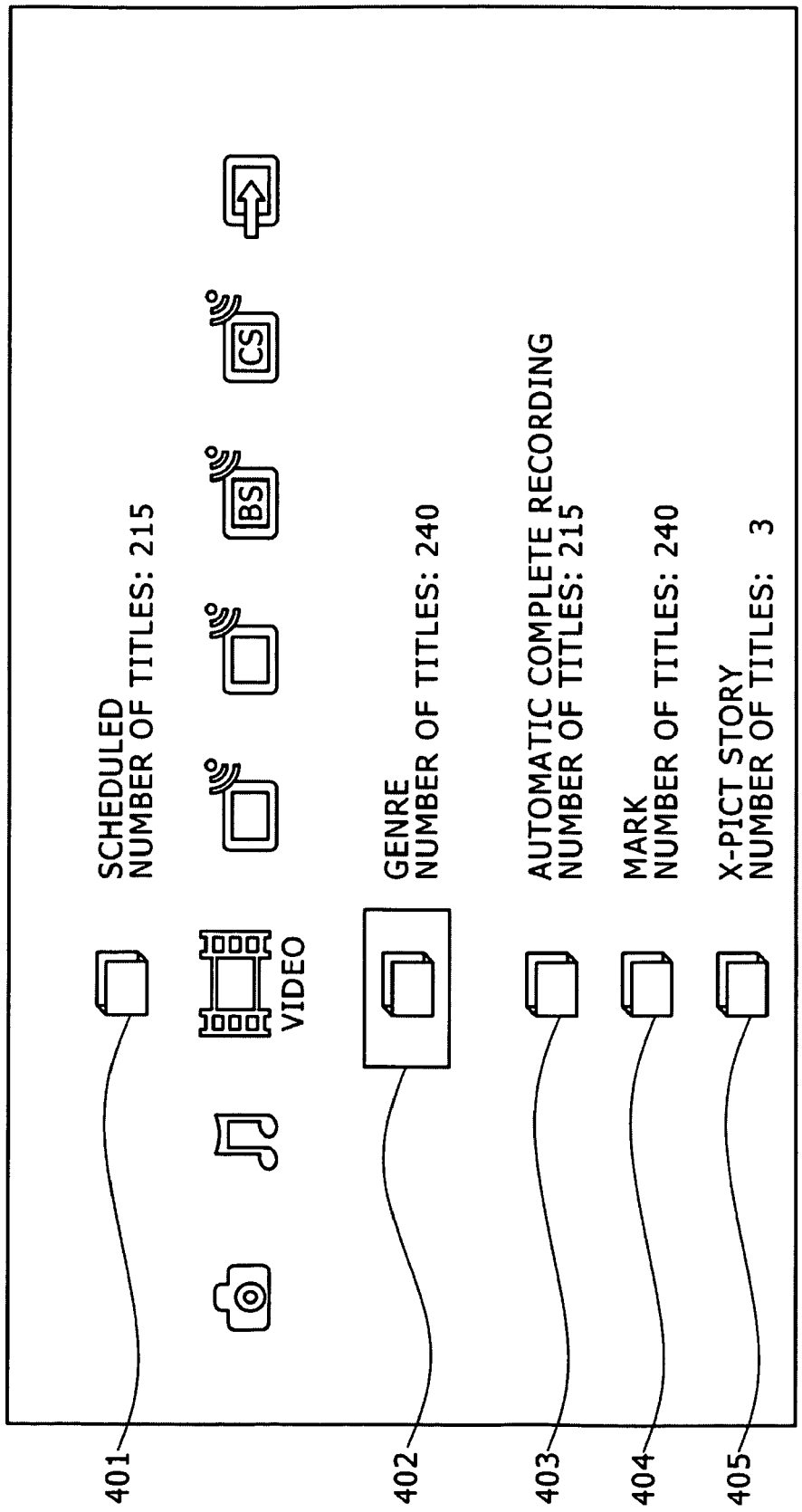
FIG. 25 shows an example of a first-level screen as displayed.

FIG. 25 shows an example of a first-level screen being displayed. In the example of FIG. 25, icons 401, 402, 403, 404, and 405 are being displayed as icons that are selectable on the first level.

The icon 401 is a "Scheduled" icon. If this icon is selected, contents that have been recorded by scheduled recording will be displayed on the second and lower levels. The icon 402 is a "Genre" icon. If this icon is selected, all contents that are stored in the data processing apparatus 1: will be displayed on the second and lower levels. The icon 403 is an "Automatic Complete Recording" icon. If this icon is selected, contents that have been recorded automatically will be displayed on the second and lower levels. Similarly, if the icon 404 or the icon 405 is selected, the contents will be displayed on their corresponding predetermined bases on the second and lower levels.

Notice that to the right of each of the icons 401 to 405, the number of contents that can be displayed if the icon is selected is being displayed as "Number of Titles".

Figure 26:
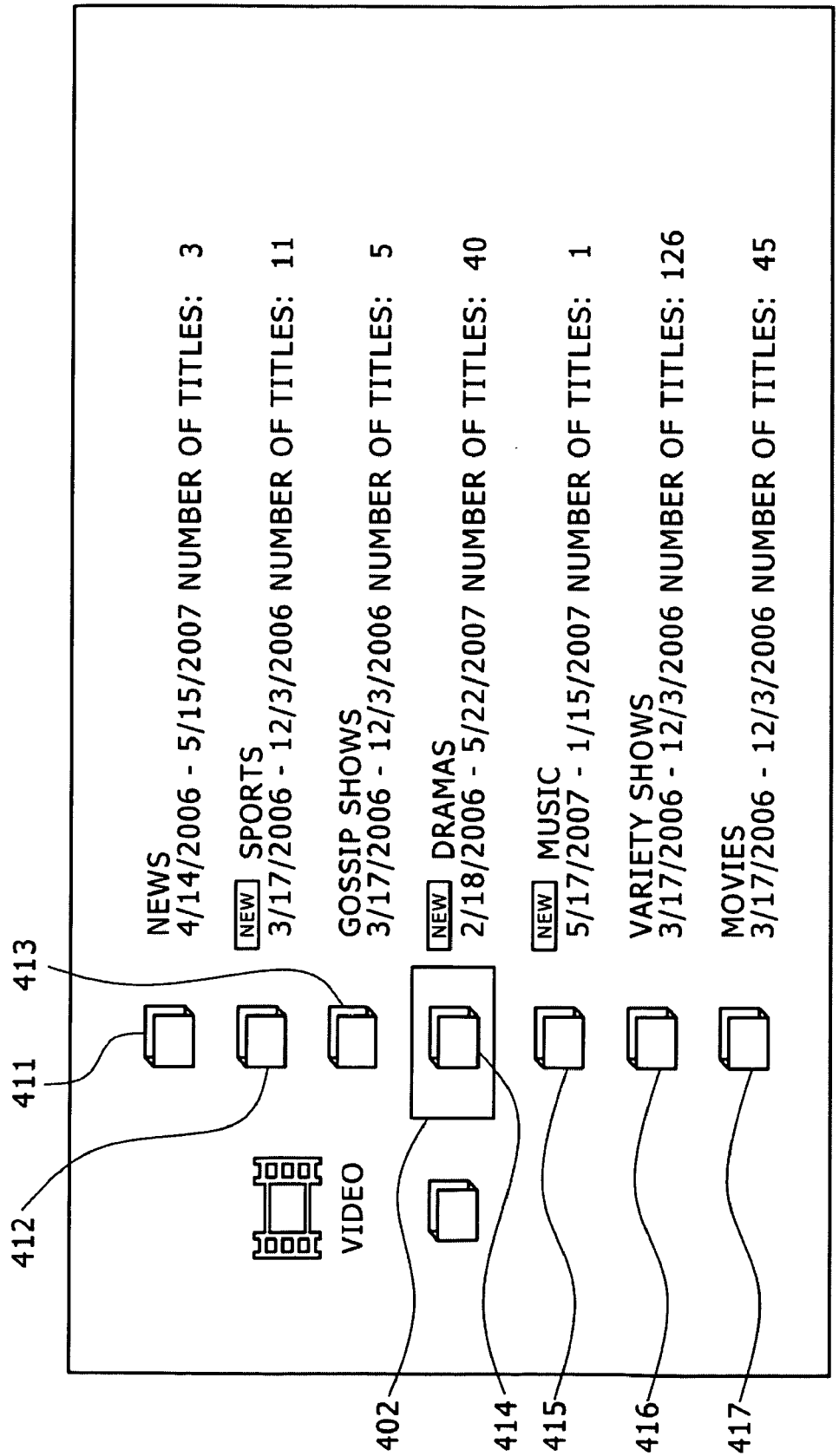
FIG. 26 shows an example of a second-level screen as displayed.

FIG. 26 shows an example of a second-level screen that is displayed when the Icon 402 in FIG. 25 has been selected. In the example of FIG. 26, as a result of the "Genre" icon 402 being selected, an icon 411 corresponding to a genre "News", an icon 412 corresponding to a genre "Sports", an icon 413 corresponding to a genre "Gossip Shows", an icon 414 corresponding to a genre "Dramas", an icon 415 corresponding to a genre "Music", an icon 416 corresponding to a genre "Variety Shows", and an icon 417 corresponding to a genre "Movies" are being displayed. If one of the icons 411 to 417 is selected, a content or contents belonging to the corresponding genre will be displayed on the third and lower levels.

Notice that to the right of each of the icons 411 to 417, the number of contents that can be displayed if the icon is selected is being displayed as "Number of Titles". A sign "NEW", which is being displayed to the right of each of the icons 412, 414, and 415, indicates that a content that has never been reproduced can be displayed if the icon is selected.

Figure 27:
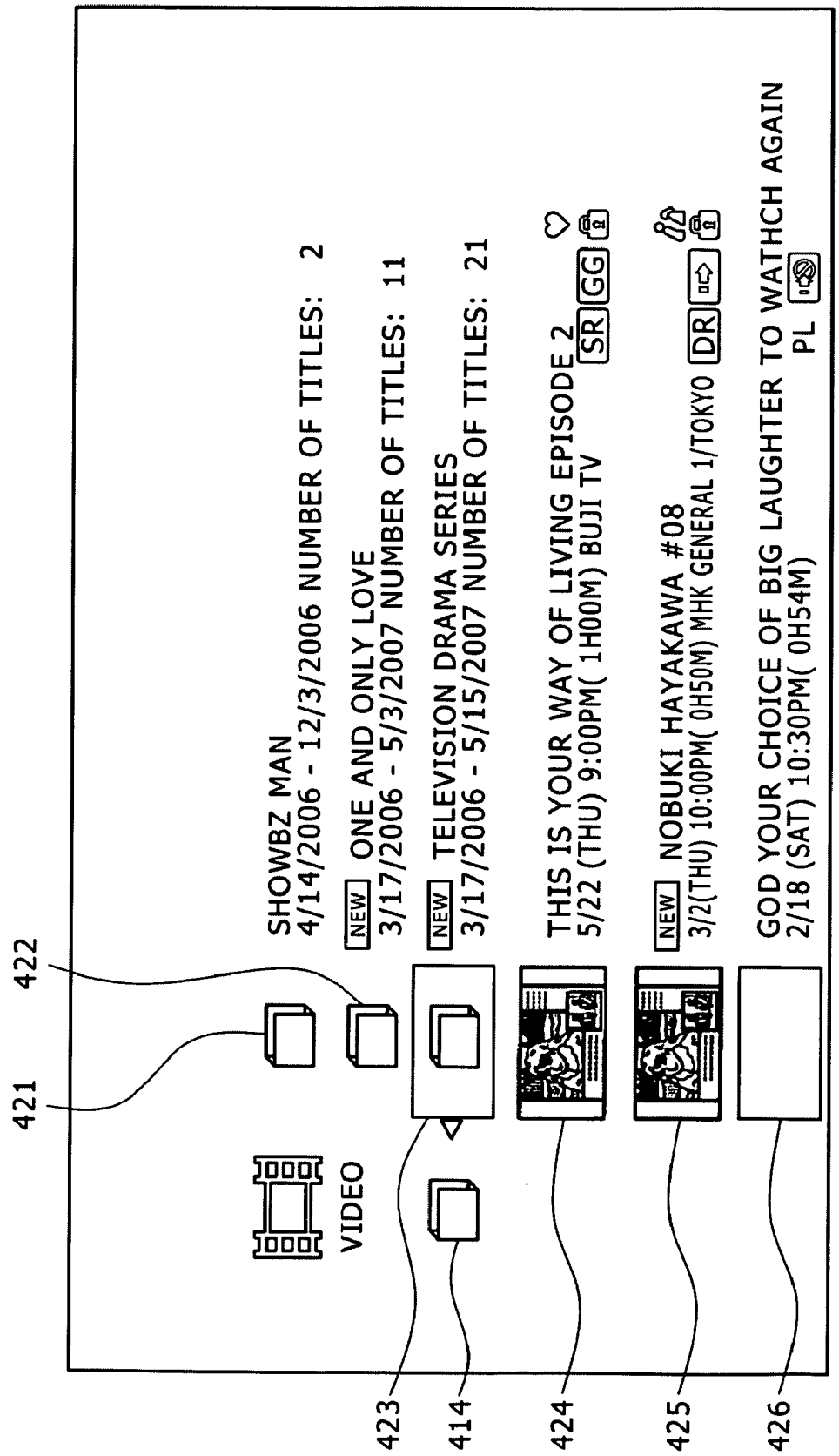
FIG. 27 shows an example of a third-level screen as displayed.

FIG. 27 shows an example of a third-level screen that is displayed when the icon 414 in FIG. 26 has been selected. In the example of FIG. 27, as a result of the icon 414, which corresponds to the genre "Dramas", being selected, contents that belong to the genre "Drama" and folders in which such contents are collected are being displayed.

For example, contents whose EPG title data includes a character sequence "SHOWBZ MAN" are collected in a folder 421. A character sequence "4/14/2006-12/3/2006", which is being displayed to the right of the folder 421, indicates that the contents that are collected in the folder 421 were recorded from Apr. 14, 2006 to Dec. 3, 2006. Notice that the number of contents that are collected in the folder 421 is being displayed as "Number of Titles" (2 in this example).

Contents whose EPG title data includes a character sequence "One and Only Love" are collected in a folder 422. The contents collected in the folder 422 were recorded from Mar. 17, 2006 to May 3, 2007. The number of contents that are collected in the folder 422, i.e., 11, is indicated by "Number of Titles: 11". Contents whose EPG title data includes a character sequence "Television Drama Series" are collected in a folder 423. The contents collected in the folder 423 were recorded from Mar. 17, 2006 to May 25, 2007. The number of contents that are collected in the folder 423, i.e., 21, is indicated by "Number of Titles: 21".

Notice that the sign "NEW" is being displayed to the right of the folders 422 and 423. This means that a content that has never been reproduced is contained in both the folders 422 and 423.

A thumbnail 424 corresponds to a single content whose EPG title data indicates a title "This Is Your Way of Living Episode 2". Thumbnails 425 and 426 also correspond to a single content. The sign "NEW" is being displayed to the right of the thumbnail 425, and this means that the corresponding content has never been reproduced. Note that the thumbnail may denote a playlist, instead of a content, for example.

Figure 28:
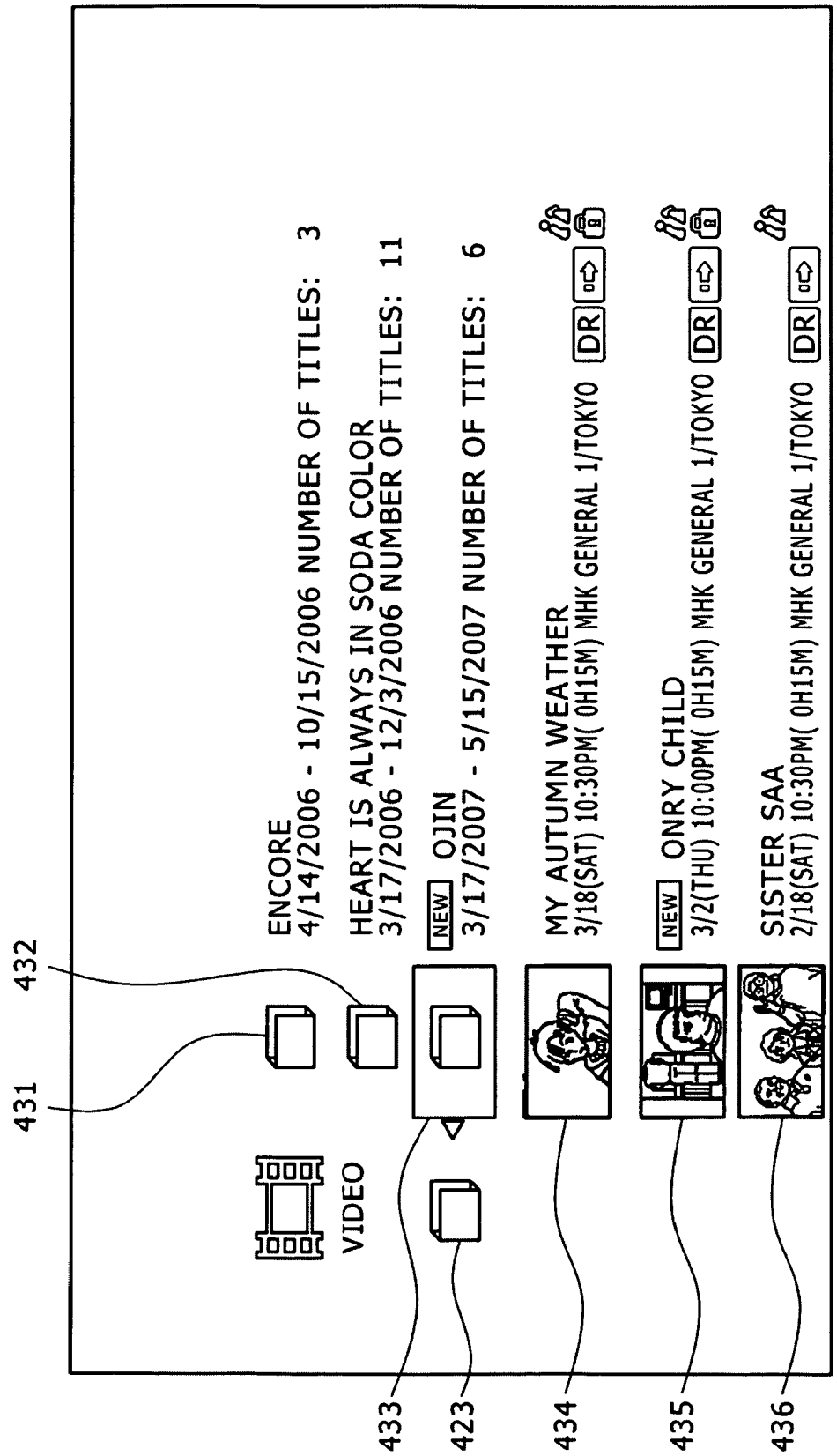
FIG. 28 shows an example of a fourth-level screen as displayed.

FIG. 28 shows an example of a fourth-level screen that is displayed when the folder 423 in FIG. 27 has been selected. In the example of FIG. 28, as a result of the folder 423 being selected, the contents whose EPG title data includes the character sequence "Television Drama Series" and folders in which such contents are collected are being displayed.

Contents whose EPG title data includes a character sequence "Encore" are collected in a folder 431. That is, the EPG title data of each of the contents collected in the folder 431 includes the character sequences "Television Drama Series" and "Encore". The contents collected in the folder 431 were recorded from Apr. 14, 2006 to Oct. 15, 2006. The number of contents that are collected in the folder 431, i.e., 3, is indicated by "Number of Titles: 3".

Similarly, contents are collected in folders 432 and 433 as well. The sign "NEW" is being displayed to the right of the folder 433, and this means that a content that has never been reproduced is contained in the folder 433.

A thumbnail 434 corresponds to a single content whose EPG title data indicates a title "Television Drama Series My Autumn Weather". That is, that part of the title of this content, which is contained in the third-level folder, which corresponds to a difference is being displayed on the fourth-level screen. Similarly, thumbnails 435 and 436 each correspond to a single content. Notice that the sign "NEW" is being displayed to the right of the thumbnail 435. This means that the corresponding content has never been reproduced.

Figure 29:
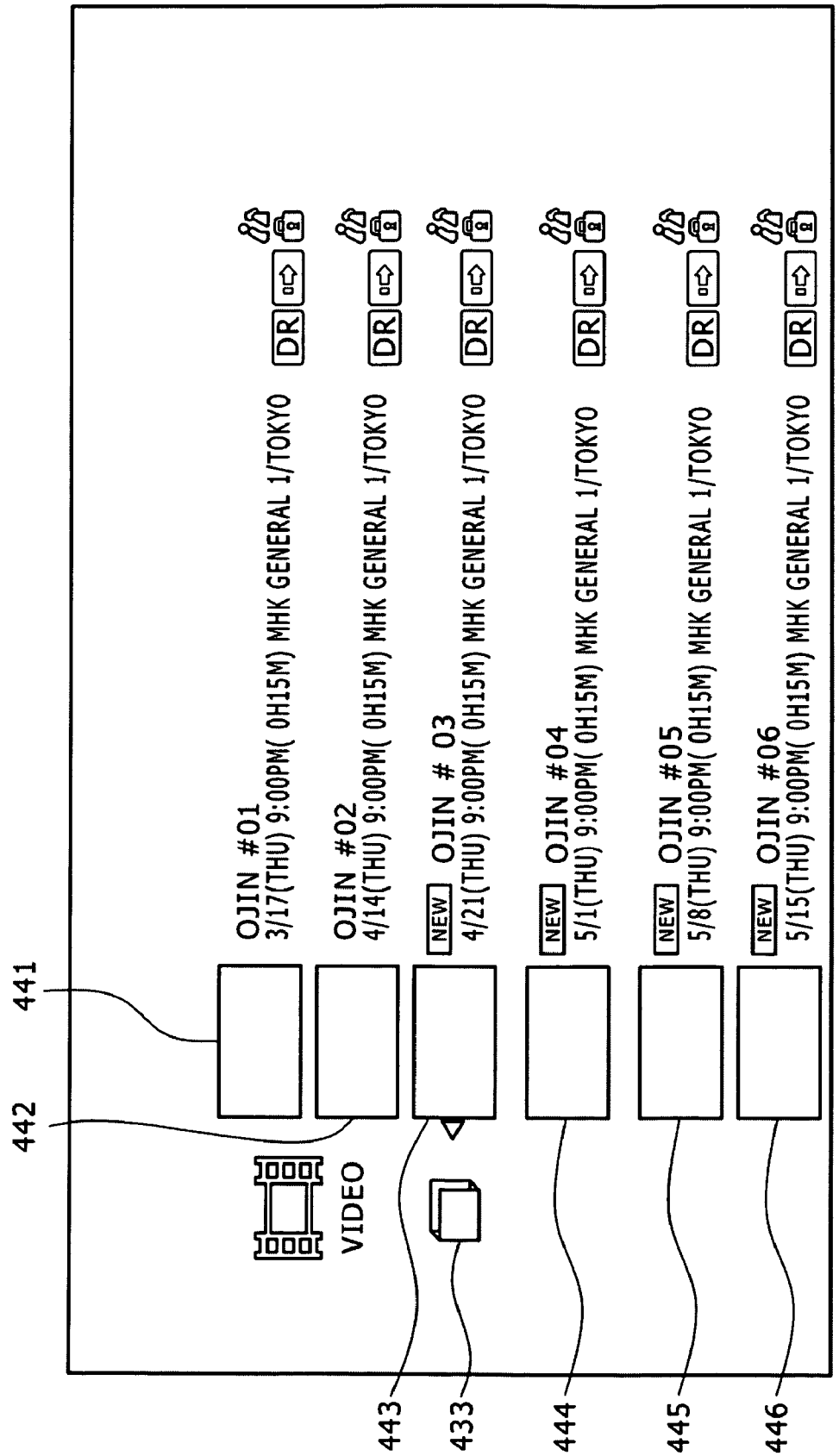
FIG. 29 shows an example of a fifth-level screen as displayed.

FIG. 29 shows an example of a fifth-level screen that is displayed when the folder 433 in FIG. 28 has been selected. In the example of FIG. 29, as a result of the folder 433 being selected, titles of contents whose EPG title data includes "Television Drama Series" and "Ojin" are being displayed.

A thumbnail 441 corresponds to a single content whose EPG title data indicates a title "Television Drama Series Ojin #01". That is, because no folder is displayed on the fifth-level screen, that part of the title of this content, which is contained in the fourth-level folder, which corresponds to a difference is being displayed together with the name (in this example, "Ojin") of the fourth-level folder (in this example, the folder 433) selected on the fourth level.

Thumbnails 442, 443, 444, 445, and 446 also correspond to a single content. Notice that the sign "NEW" is being displayed to the right of each of the thumbnails 443 to 446. This means that the corresponding contents have never been reproduced.

The contents are collected in the folders and displayed in hierarchical form in the above-described manner.

Note that the examples of the displays that have been described above with reference to FIGS. 25 to 29 assume the case where the icon 402 ("Genre") is selected on the first level (View). In the case where the icon 405 ("x-Pict Story") has been selected on the first level, for example, the contents are not collected in a folder, and all of the individual contents are displayed on a single screen corresponding to one level, along with the thumbnails and so on. In other words, the contents are collected in the folders and displayed in hierarchical form depending on the type of "View" selected by the user.

Figure 30:
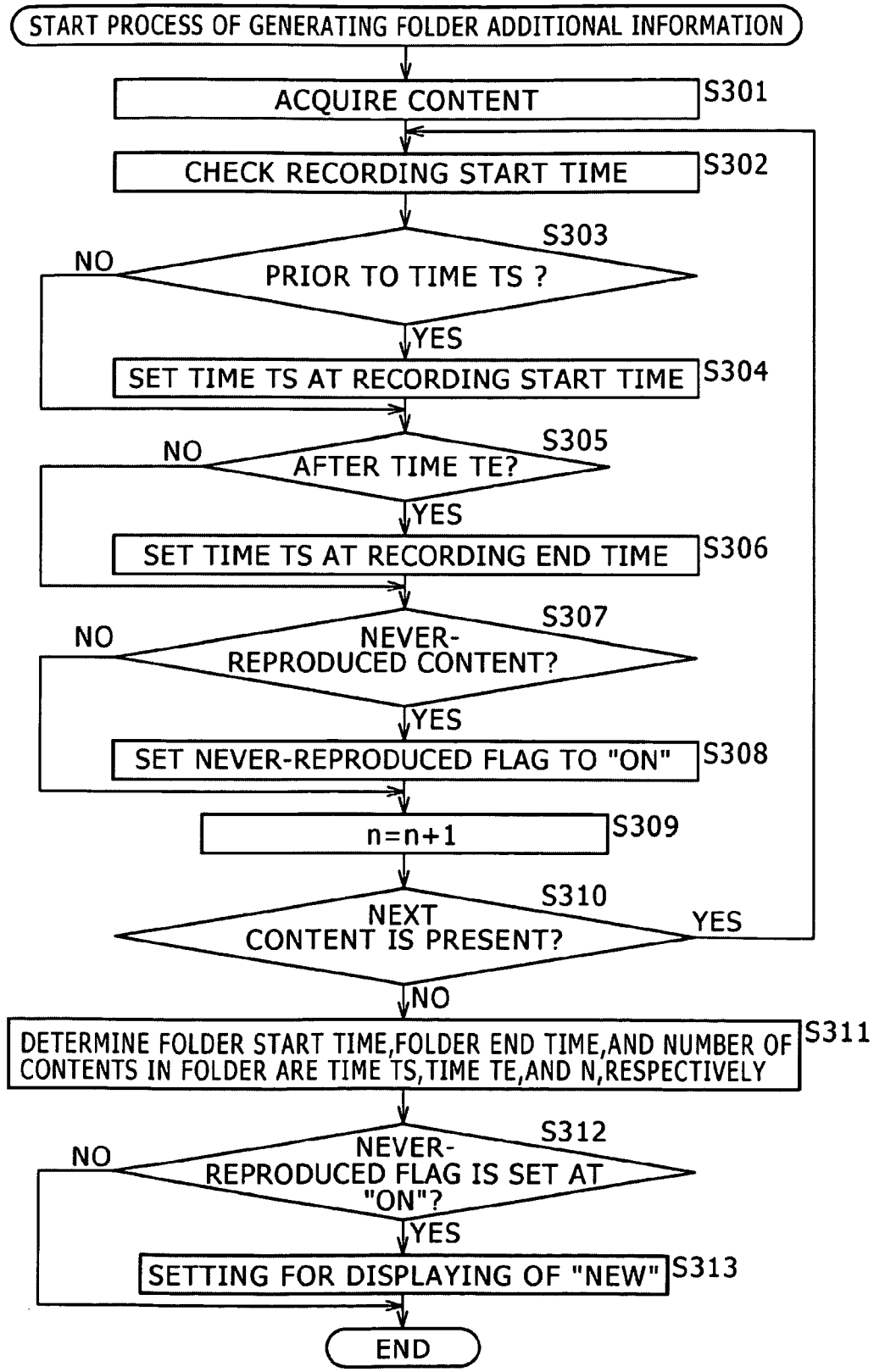
FIG. 30 is a flowchart illustrating an exemplary process of generating folder additional information.

FIG. 30 is a flowchart illustrating a process of generating "folder additional information", which is displayed to the right of each folder as displayed on the screen as described above with reference to FIG. 27. This process is performed after the folder has been created by the folder creation process as described above with reference to FIG. 8, for example.

At step S301, the grouping section 103 acquires one of the contents collected in one folder.

At step S302, the grouping section 103 checks a recording start time of the content acquired at step S301.

At step S303, the grouping section 103 determines whether the recording start time obtained at step S302 is prior to a time Ts. Here, Ts is assumed to be a variable, and a current time is set as an initial value of Ts, for example. If it is determined at step S303 that the recording start time is prior to the time Ts, control proceeds to step S304. If it is determined at step S303 that the recording start time is not prior to the time Ts, control proceeds to step S305, skipping step S304.

At step S304, the grouping section 103 sets the time Ts at the recording start time obtained at step S302.

At step S305, the grouping section 103 determines whether the recording start time obtained at step S302 is after a time Te. Here, Te is assumed to be a variable, and a time at which the apparatus was manufactured is set as an initial value of Te, for example. If it is determined at step S305 that the recording start time is after the time Te, control proceeds to step S306. If it is determined at step S305 that the recording start time is not after the time Te, control proceeds to step S307, skipping step S306.

At step S306, the grouping section 103 sets the time Te at the recording end time obtained at step S302.

At step S307, the grouping section 103 determines whether the content in question has never been reproduced. If it is determined at step S307 that the content in question has never been reproduced, control proceeds to step S308. If it is determined at step S307 that the content in question has been reproduced previously, control proceeds to step S309, skipping step S308.

At step S308, the grouping section 103 set a "never-reproduced flag" to "ON".

At step S309, the grouping section 103 increments a variable n by one. The variable n denotes the number of contents collected in the folder in question. Note that an initial value of the variable n is 0.

At step S310, the grouping section 103 determines whether the folder in question contains a next content. If it is determined at step S310 that the folder contains the next content, control returns to step S301, and the subsequent processes are repeated. If it is determined at step S310 that the folder does not contain the next content, control proceeds to step S311.

At step S311, the grouping section 103 determines that a start time of the folder is Ts, an end time of the folder is Te, and the number of contents in the folder is n. As a result, information corresponding to "4/14/2006-12/3/2006" and "Number of Titles: 3" will be displayed to the right of the folder 421 in FIG. 27, for example.

At step S312, the grouping section 103 determines whether the never-reproduced flag is set at "ON". If it is determined at step S312 that the never-reproduced flag is set at "ON", control proceeds to step S313. If it is determined at step S312 that the never-reproduced flag is not set at "ON", control skips step S313.

At step S313, the grouping section 103 sets a predetermined flag or the like for displaying the sign "NEW" for the folder in question. As a result, the sign "NEW" will be displayed to the right of the folder, as is the case with the folders 422 and 423 in FIG. 27, for example.

Note that the processes of steps S301 to S313 are performed with respect to each of the folders created as a result of the group separation and grouping of the EPG title data of the contents.

The folder additional information is generated in the above-described manner.

As described above, the folders in which the contents are collected are displayed in hierarchical form according to this embodiment of the present invention. Suppose that the user has selected one folder (or icon) on a certain level, and a list of contents collected in this folder and lower-level folders has been displayed, for example. At this time, a new content may be added, or a content may be deleted.

There will now be described a change in display of the list of contents and folders in one embodiment of the present invention, when a new content is added or a content is deleted while the list of contents and lower-level folders collected in the folder selected by the user on the certain level by selecting the corresponding icon, for example, is being displayed.

For example, referring to FIG. 27, suppose that the list of the contents and folders corresponding to the icon 414 is being displayed as a result of selecting the icon 414 on the second level. In this case, if a new content whose EPG title data includes "One and Only Love" is recorded, for example, the display screen as shown in FIG. 27 will be changed into a state as shown in FIG. 31.

Figure 31:
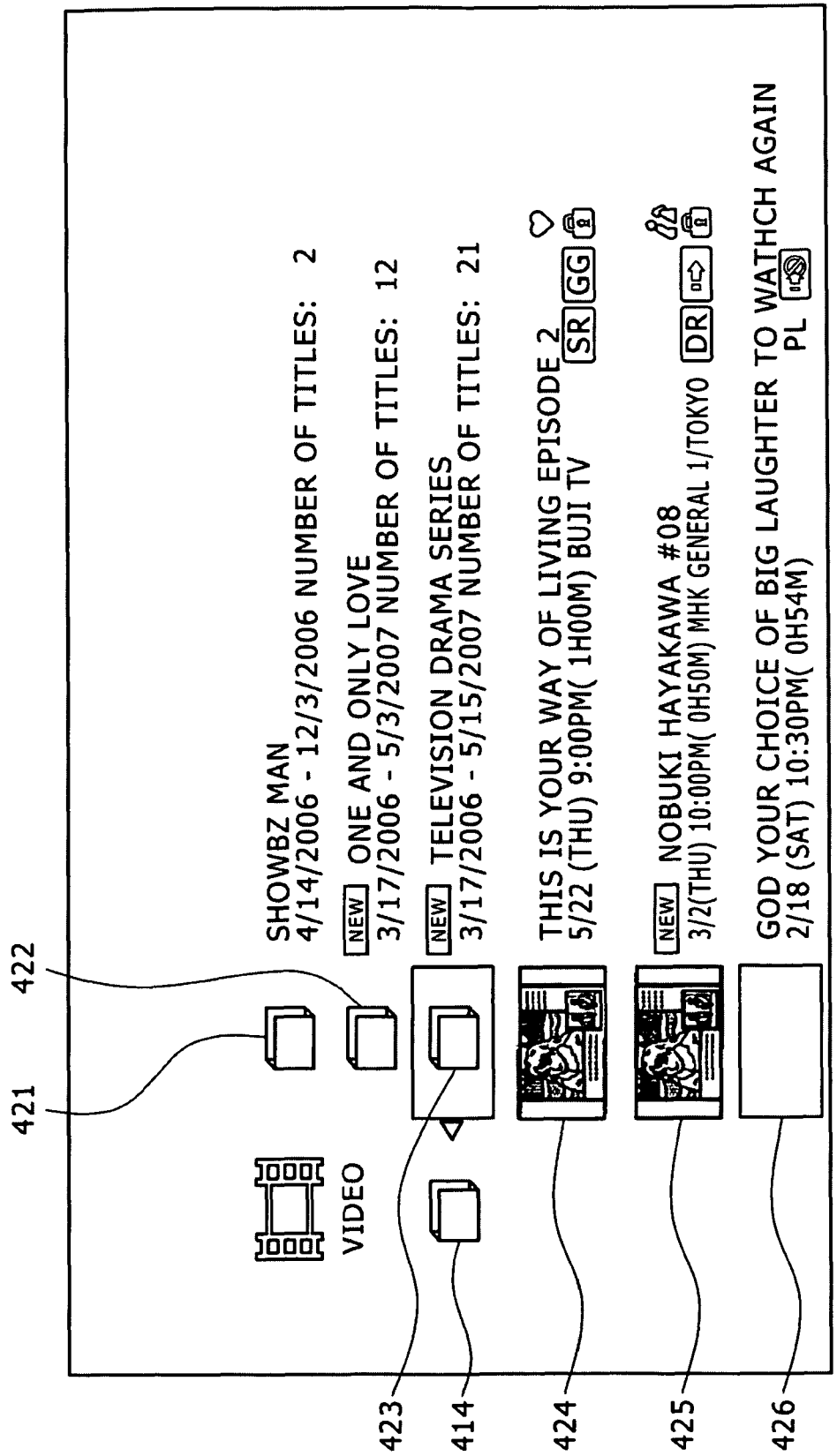
FIG. 31 is a diagram for explaining a change in a display screen when a new content has been added.

In the example of FIG. 31, "Number of Titles" (i.e., the number of contents) for the third-level folder 422, whose folder name is "One and Only Love", indicates "12", instead of "11" as in FIG. 27. That is, in the case where, while the list of the third-level folders and the contents corresponding to the icon selected on the second level is being displayed, a new content to be contained in one of the third-level folders is added, the folder additional information that is displayed to the right of that third-level folder is changed.

In the example of FIG. 31, only the "Number of Titles" part of the folder additional information of the folder 422 has been changed. Note, however, that the display of the start time or end time of the folder 422 is also changed as necessary depending on the added content.

In the above example, the added content is contained in the folder 422 on the third level, and accordingly, "Number of Titles" for the third-level folder 422 is changed (increased in value). Also in the case where the added content is contained in a folder on the fourth level, which is contained in the folder on the third level, "Number of Titles" for that third-level folder is increased in value.

For example, suppose that a new content whose EPG title data indicates a title "Television Drama Series Ojin #07" has been recorded when the display screen is in the state as shown in FIG. 27. In this case, the number of contents in the folder 433, whose name is "Ojin" and which is one of the fourth-Level folders collected in the third-level folder 423 named "Television Drama Series", increases by one, so that "Number of Titles" for the third-level folder 423 is changed to "22".

Now suppose that one of the contents whose EPG title data includes "SHOWBZ MAN" has been deleted when the display screen is in the state as shown in FIG. 31. In this case, the display screen will be changed into a state as shown in FIG. 32.

Figure 32:
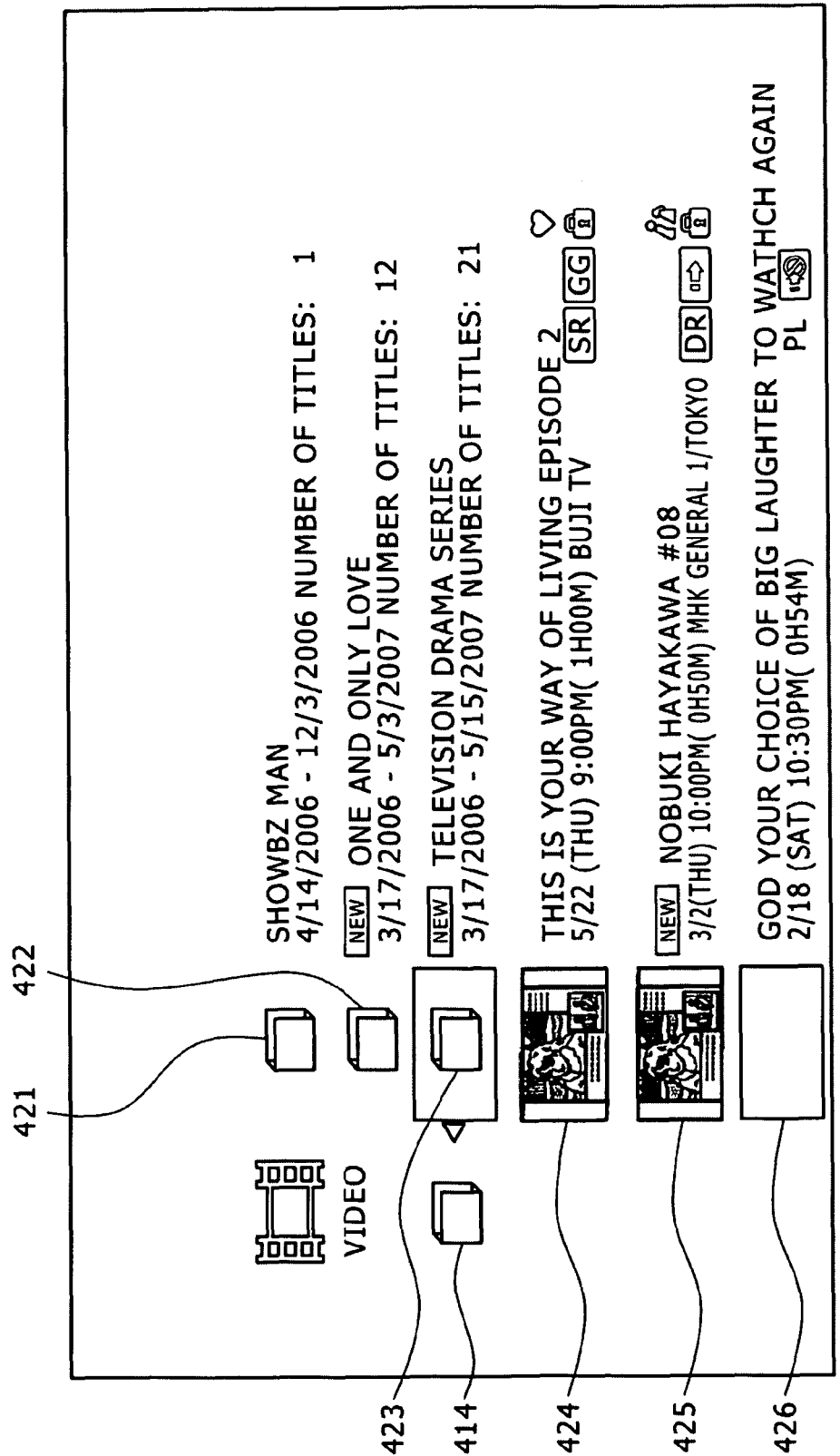
FIG. 32 is a diagram for explaining a change in the display screen when a content has been deleted.

In the example of FIG. 32, "Number of Titles" (i.e., the number of contents) for the third-level folder 421, whose folder name is "SHOWBZ MAN", is "1", instead of "2" as in FIG. 31. That is, in the case where, while the list of the third-level folders and the contents corresponding to the icon selected on the second level is being displayed, a content in one of the third-level folders is deleted, the folder additional information that is displayed to the right of that third-level folder is changed.

In the example of FIG. 32, only the "Number of Titles" part of the folder additional information of the folder 421 has been changed. Note, however, that the display of the start time or end time of the folder 421 is also changed as necessary depending on the deleted content.

In the above example, the content to be deleted is contained in the folder 421 on the third level, and accordingly, "Number of Titles" for the third-level folder 421 is changed (decreased in value). Also in the case where the content to be deleted is contained in a folder on the fourth level, which is contained in the folder on the third level, "Number of Titles" for that third-level folder is decreased in value.

For example, suppose that the content whose EPG title data indicates the title "Television Drama Series Ojin #01" has been deleted when the display screen is in the state as shown in FIG. 27. In this case, the number of contents in the folder 433, whose name is "Ojin" and which is one of the fourth-level folders collected in the third-level folder 423 named "Television Drama Series", decreases by one, so that "Number of Titles" for the third-level folder 423 is changed to "20".

Figure 33:
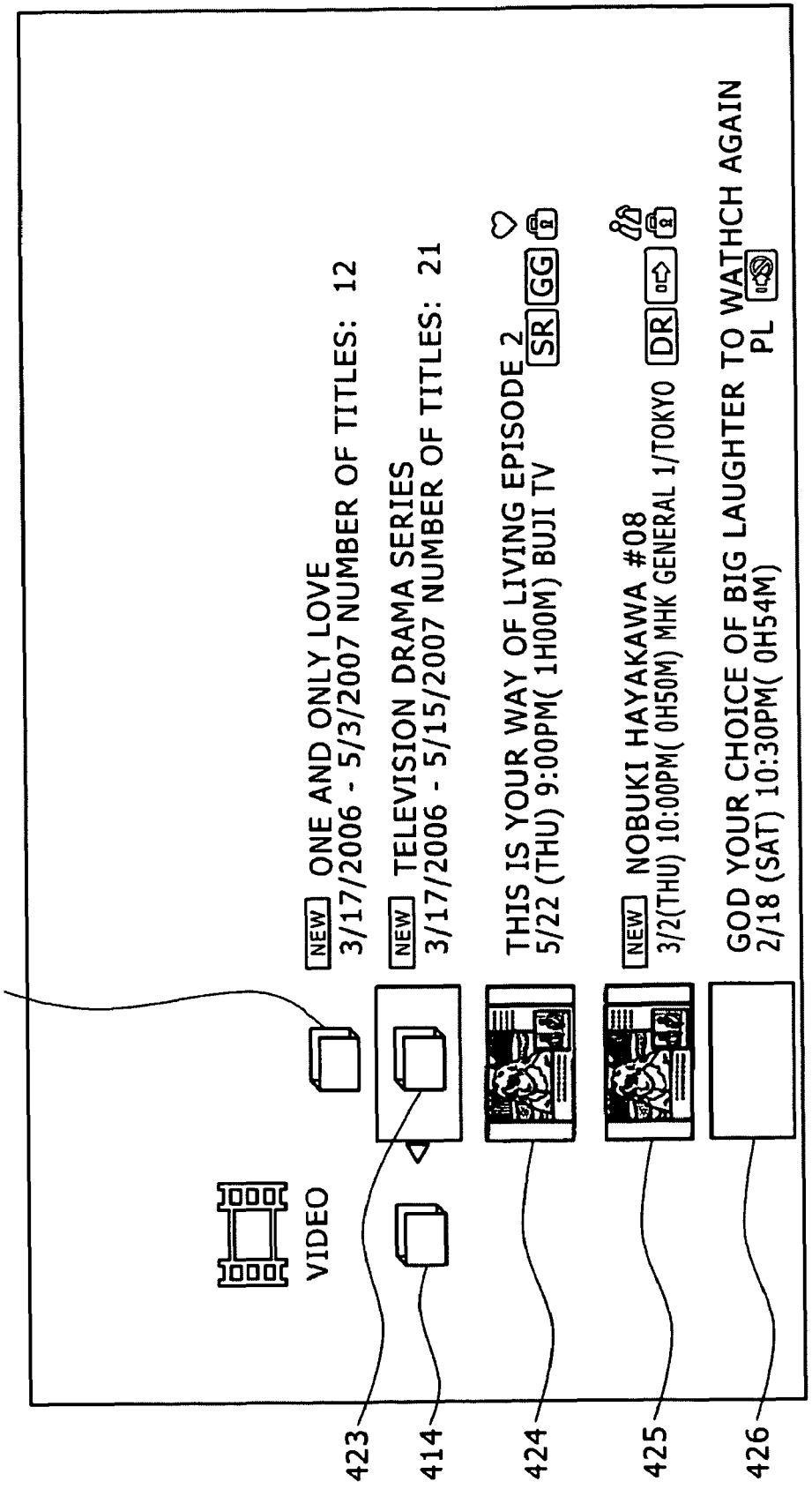
FIG. 33 is a diagram for explaining a change in the display screen when another content has been additionally deleted.

If the content whose EPG title data includes "SHOWBZ MAN" is further deleted when the display screen is in the state as shown in FIG. 32, the display screen is changed into a state as shown in FIG. 33.

In the example of FIG. 33, the third-level folder 421, whose folder name is "SHOWBZ MAN", is not being displayed because it has been deleted. That is, in the case where, while the list of the third-level folders and the contents corresponding to the icon selected on the second level is being displayed, all contents collected in a folder on the third level have been deleted, that third-level folder is deleted.

When only one content remains in the folder, the displaying of this folder may not be necessary any longer, and accordingly the display on the screen may be changed so that this remaining content will be displayed with a corresponding thumbnail while the folder is deleted, for example. However, suppose that when the list of the contents and lower-level folders collected in the folder selected by the user on the certain level by selecting the corresponding icon, for example, is being displayed, one of the lower-level folders is deleted. In this case, the user may be confused into thinking that all of the contents that correspond to the name of the deleted folder have been deleted. Moreover, the deletion of the folder would make it difficult for the user to find the content that had been contained in the deleted folder on the screen.

As such, in this embodiment of the present invention, as described above with reference to FIGS. 32 and 33, even if only one content remains in one of the lower-level folders while the list of the contents and lower-level folders collected in the folder selected by the user on the certain level by selecting the corresponding icon, for example, is being displayed, that lower-level folder is allowed to continue being displayed on the screen, and after all of the contents collected in the lower-level folder have been deleted, the folder is deleted.

Thus, a user-friendly manner of displaying the list of contents is achieved.

Figure 34:
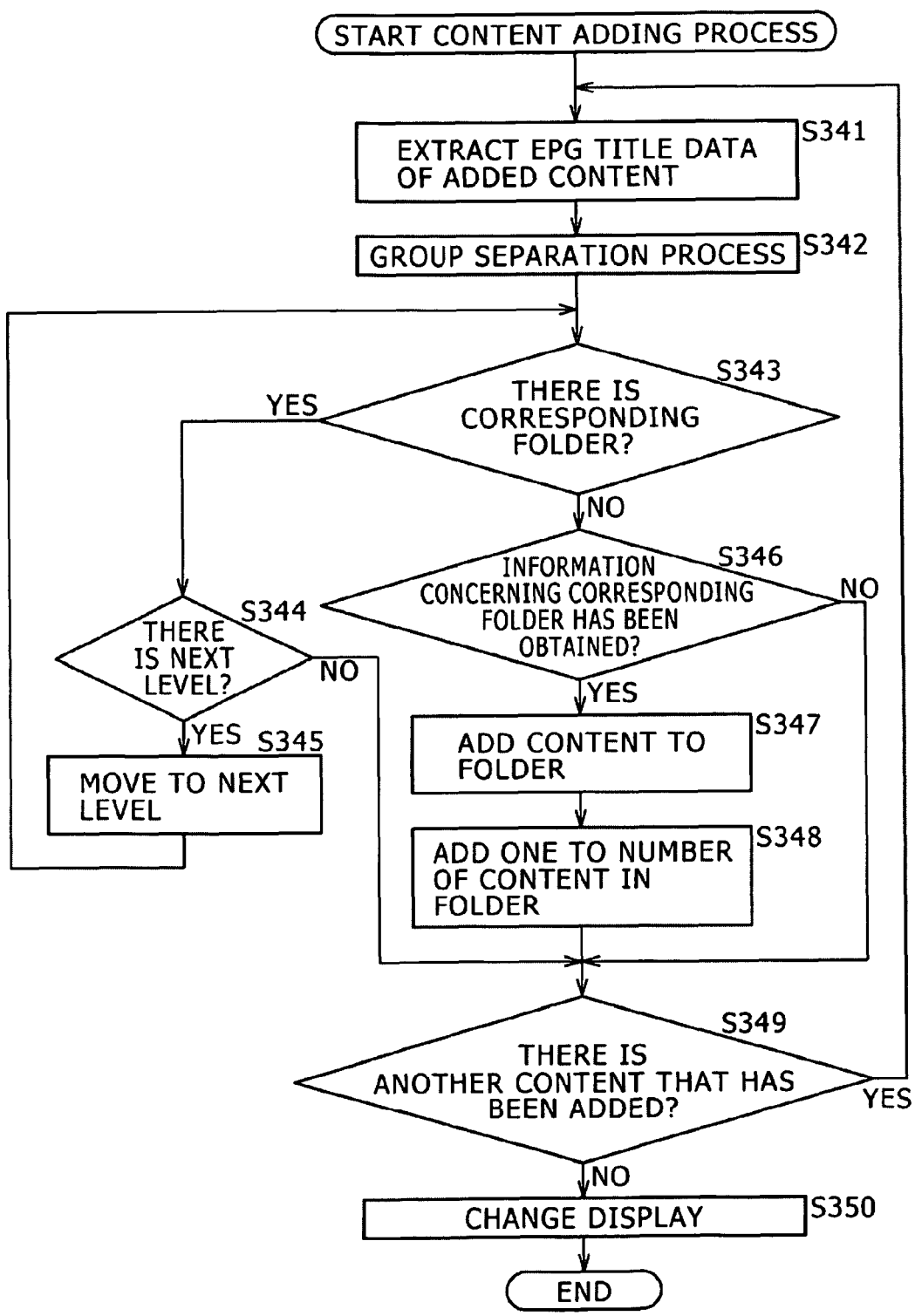
FIG. 34 is a flowchart illustrating an exemplary content adding process.

Next, a content adding process will now be described below with reference to a flowchart of FIG. 34. This process is performed when a new content has been added while the list of the contents and lower-level folders collected in the folder selected by the user on the certain level by selecting the corresponding icon, for example, is being displayed, for example.

At step S341, the EPG data acquisition section 101 extracts the EPG title data of the added content, and supplies the EPG title data to the group separation section 102 via the control section 105.

At step S342, the group separation section 102 performs the group separation process based on the EPG title data extracted at step S341. This process is the same as the process as described above with reference to FIG. 4, and a detailed description thereof is omitted. As a result of this process, the character sequence of the EPG title data is separated into different groups based on the predetermined mark keywords.

At step S343, the grouping section 103 determines whether there is a folder that corresponds with the character sequence of the EPG title data, which has been subjected to the group separation by the process of step S342. More specifically, the grouping section 103 determines whether any of the lower-level folders collected in the folder selected by the user by selecting the corresponding icon, for example, corresponds with the character sequence of the EPG title data. For example, suppose that the user has selected the icon 414 on the second level, and the list of the contents and third-level folders (i.e., the folders 421 to 423) corresponding to the icon 414 is being displayed. In this case, the grouping section 103 determines whether any of the third-level folders 421 to 423 corresponds with the character sequence of the EPG title data.

If it is determined at step S343 that there is the corresponding folder, control proceeds to step S344.

At step S344, the grouping section 103 determines whether the corresponding folder found by the process of step S343 contains any lower-level folder, thereby determining whether there is a next level. If it is determined at step S344 that there is the next level, control proceeds to step S345, and moves to the next level (i.e., the subordinate level). Then, control returns to step S343.

If it is determined at step S343 that there is no corresponding folder, control proceeds to step S346. At step S346, it is determined whether information for identifying the folder that has been determined by the process of step S343 to correspond with the character sequence of the EPG title data has been obtained.

If it is determined at step S346 that the information for identifying the folder that has been determined to correspond with the character sequence of the EPG title data has been obtained, control proceeds to step S347. At step S347, the grouping section 103 adds the content to the folder that corresponds with the character sequence of the EPG title data. That is, the number of contents collected in this folder increases by one.

At step S348, the grouping section 103 adds one to the number of contents collected in this folder. As a result, the "Number of Titles" part of the folder additional information of this folder is changed. Moreover, the start time or end time in the folder additional information of the folder is also changed as necessary.

If it is determined at step S346 that the information for identifying the folder that has been determined to correspond with the character sequence of the EPG title data has not been obtained, control proceeds to step S349, skipping steps S347 and S348.

After the process of step S348, or if it is determined at step S346 that the information for identifying the folder that has been determined to correspond with the character sequence of the EPG title data has not been obtained, or if it is determined at step S344 that there is not the next level, control proceeds to step S349. At step S349, the grouping section 103 determines whether there is another content that has been added. If it is determined at step S349 that there is another content that has been added, control returns to step S341, and the subsequent processes are repeated.

Note that if it is determined at step S346 that the information for identifying the folder that has been determined to correspond with the character sequence of the EPG title data has not been obtained, that means that there is no folder that corresponds with the character sequence of the EPG title data, and accordingly, the added content is not added to any folder and instead displayed on its own.

If it is determined at step S349 that there is no other content that has been added, control proceeds to step S350, and the display on the screen is changed. As a result, the display screen as shown in FIG. 27 is changed into the state as shown in FIG. 31, as described above, for example.

The content adding process is performed in the above-described manner.

Figure 35:
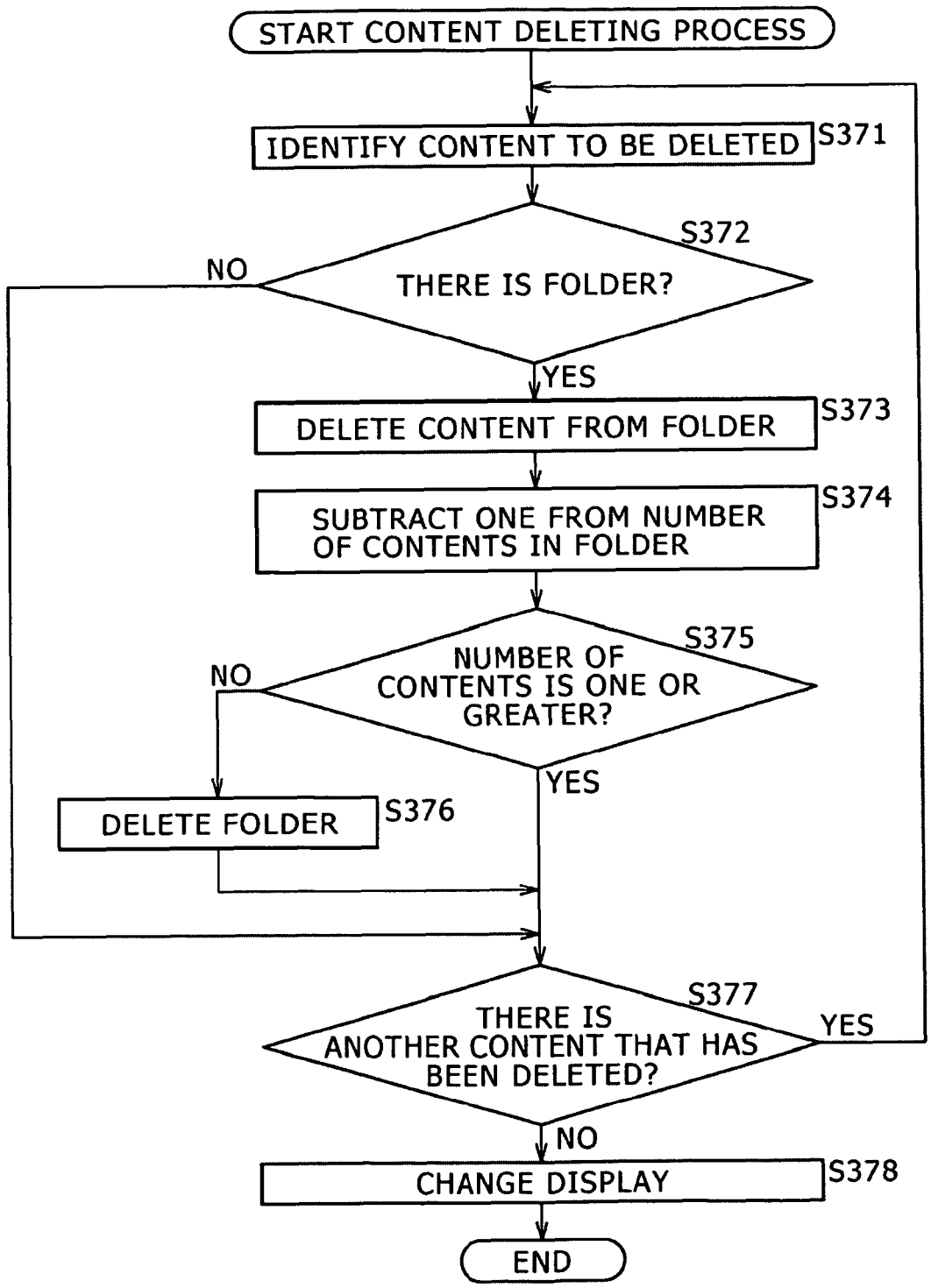
FIG. 35 is a flowchart illustrating an exemplary content deleting process.

Next, a content deleting process will now be described below with reference to a flowchart of FIG. 35. This process is performed when a content has been deleted while the list of the contents and lower-level folders collected in the folder selected by the user on the certain level by selecting the corresponding icon, for example, is being displayed, for example.

At step S371, the grouping section 103 identifies the content to be deleted.

At step S372, the grouping section 103 determines whether there is a folder that contains the content identified by the process of step S371. More specifically, the grouping section 103 determines whether any of the lower-level folders collected in the folder selected by the user by selecting the corresponding icon, for example, contains the content to be deleted which has been identified by the process of step S371. For example, suppose that the user has selected the icon 414 on the second level, and the list of the contents and third-level folders (i.e., the folders 421 to 423) corresponding to the icon 414 is being displayed. In this case, the grouping section 103 determines whether any of the third-level folders 421 to 423 contains the content to be deleted.

If it is determined at step S372 that there is the folder that contains the content to be deleted, control proceeds to step S373.

At step S373, the grouping section 103 deletes the content in question (i.e., the content that has been identified by the process of step S371) from that folder.

At step S374, the grouping section 103 subtracts one from the number of contents collected in this folder. As a result, the "Number of Titles" part of the folder additional information of this folder is changed. Moreover, the start time or end time in the folder additional information of this folder is also changed as necessary.

At step S375, the grouping section 103 determines whether or not the number of contents collected in this folder is one or greater. That is, it is determined whether or not the number of contents collected in the folder is one or greater (i.e., whether or not the number of contents collected in the folder is zero) after the content is deleted from the folder by the process of step S373, for example.

If it is determined at step S375 that the number of contents is not one or greater (i.e., the number of contents is zero), control proceeds to step S376, and the grouping section 103 deletes the folder.

Meanwhile, if it is determined at step S375 that the number of contents is one or greater, control proceeds to step S377, skipping step S376.

If it is determined at step S372 that there is no folder that contains the content to be deleted, the processes of steps S373 to S376 are skipped. If it is determined at step S372 that there is no folder that contains the content to be deleted, that means that the content has not been contained in any folder but has been displayed along with the corresponding thumbnail or the like, and therefore the display is not changed in connection with the folders, but on the display, the content is deleted together with the corresponding thumbnail or the like.

At step S377, the grouping section 103 determines whether there is another content that has been deleted. If it is determined at step S377 that there is another content that has been deleted, control returns to step S371, and the subsequent processes are repeated.

If it is determined at step S377 that there is no other content that has been deleted, control proceeds to step S378, and the display on the screen is changed. As a result, the display screen as shown in FIG. 31 is changed into the state as shown in FIG. 32, as described above, for example.

The content deleting process is performed in the above-described manner.

Contents of the last or special installment of serialized dramas or the like that are broadcast in series are sometimes given a different title from a title for the other installments, for example. In the case of such contents that are given the different title from that for the other installments, it is unlikely that the content will be contained in an appropriate folder as a result of the processes as described above with reference to FIGS. 3, 4, and 8. It may so happen that the content is contained in an inappropriate folder by mistake. As such, in the data processing apparatus 11 according to this embodiment of the present invention, the user is allowed to change the title of any recorded content.

There will now be described a change in the display of the list of contents and folders in this embodiment of the present invention, when the title of a content has been changed while the list of the contents and lower-level folders collected in the folder selected by the user on the certain level by selecting the corresponding icon, for example, is being displayed.

For example, suppose a situation in which the list of the contents and folders corresponding to the second-level icon 414 is being displayed as shown in FIG. 27 as a result of the icon 414 being selected. In this case, if the title of one of the two contents collected in the folder 421 is changed to "One and Only Love", for example, the display screen as shown in FIG. 27 is changed into a state as shown in FIG. 36.

Figure 36:
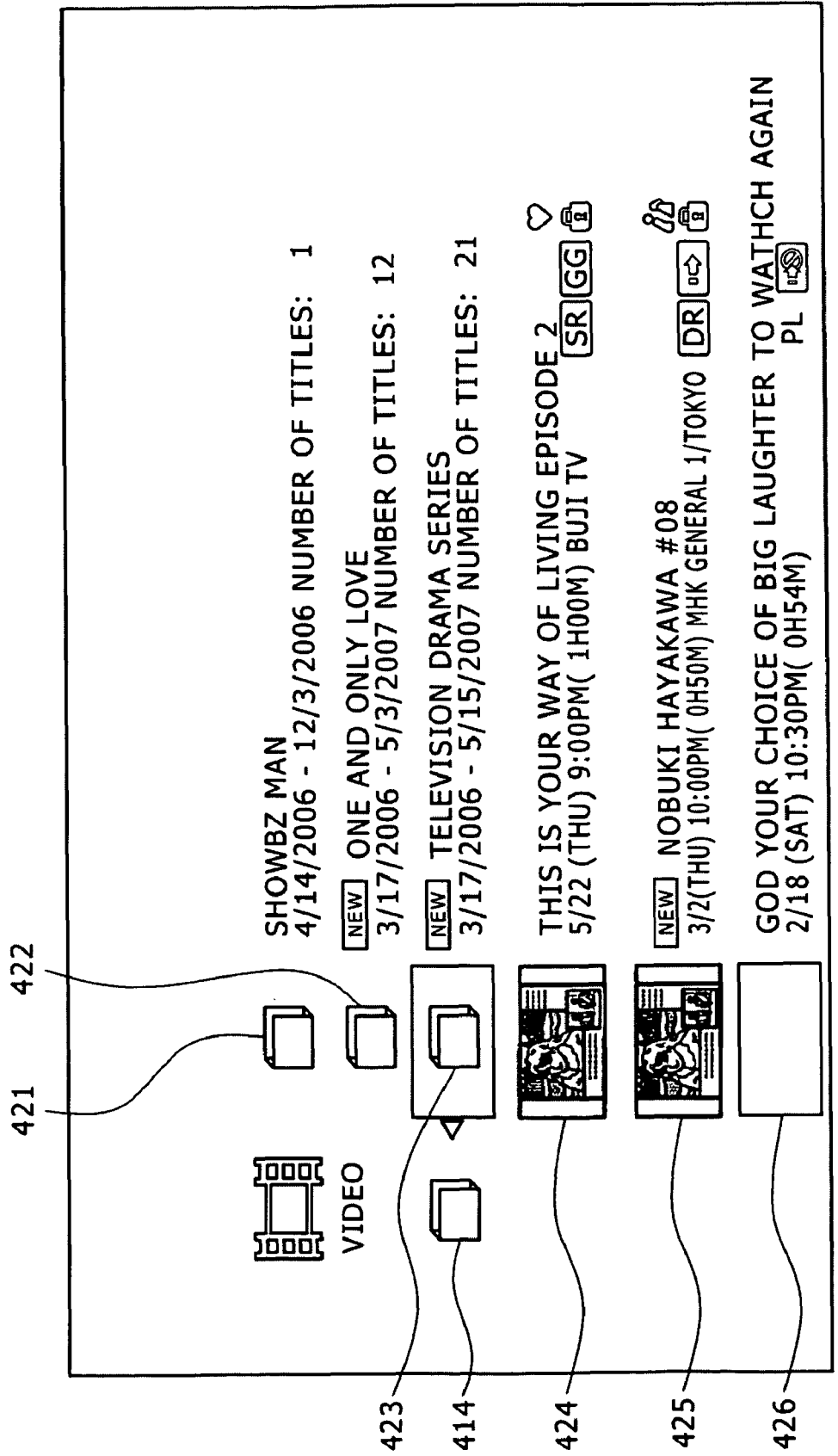
FIG. 36 is a diagram for explaining a change in the display screen when a title of a content has been changed.

In the example of FIG. 36, "Number of Titles" (i.e., the number of contents) for the third-level folder 421, whose folder name is "SHOWBZ MAN", is "1 (=2−1)", instead of "2" as in FIG. 27, while "Number of Titles" (i.e., the number of contents) for the third-level folder 422, whose folder name is "One and Only Love", is "12 (=11+1)", instead of "11" as in FIG. 27. That is, if the title of the content to be contained in a certain third-level folder is changed while the list of the contents and third-level folders corresponding to the selected second-level icon is being displayed, the folder additional information that is displayed to the right of that third-level folder is changed.

In the example of FIG. 36, the displays of only "Number of Titles" for the folders 421 and 422 have been changed. Note, however, that the displays of the start time or end time of the folders 421 and 422 are also changed as necessary depending on the title-changed content.

Figure 37:
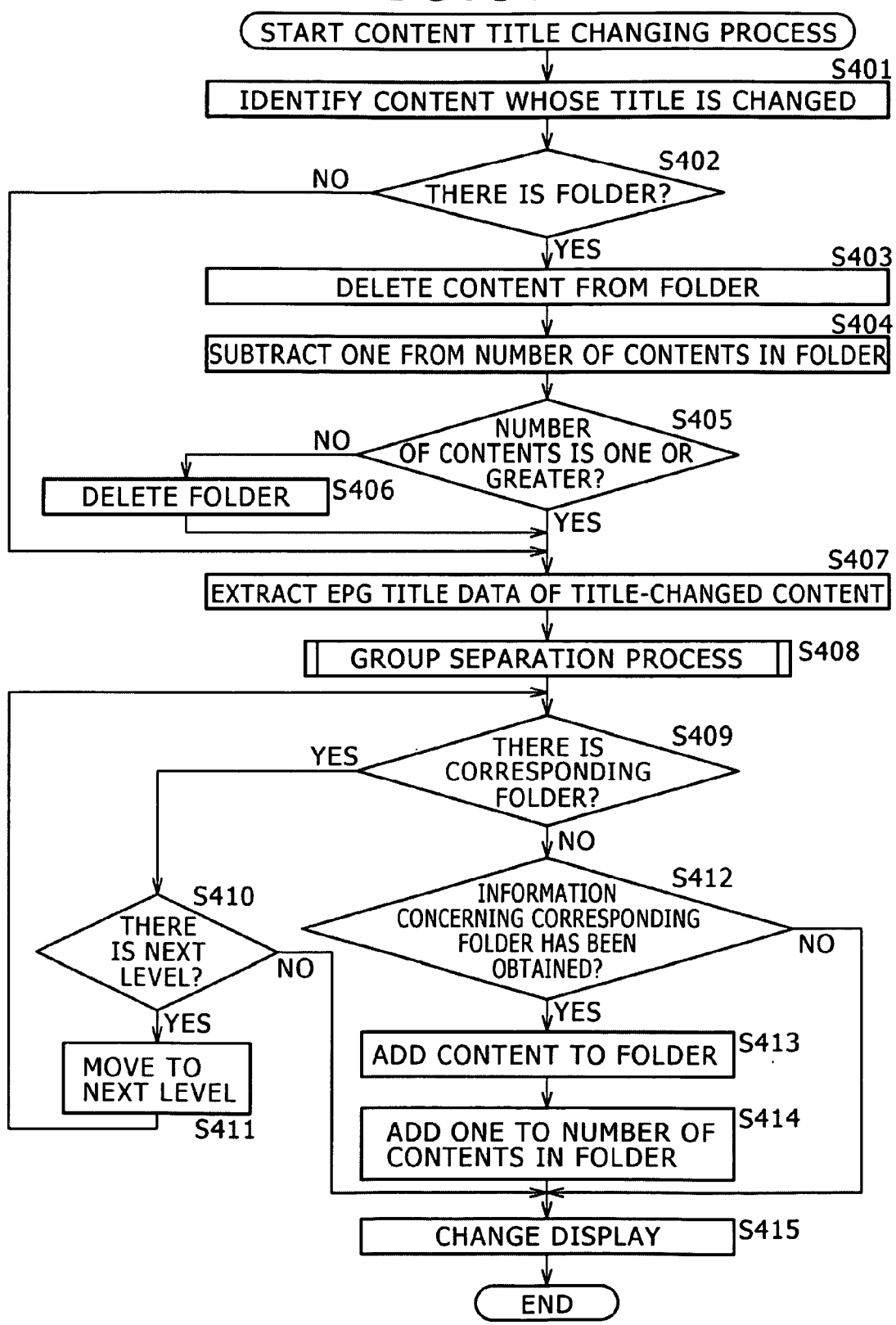
FIG. 37 is a flowchart illustrating an exemplary content title changing process.

Next, a content title changing process will now be described below with reference to a flowchart of FIG. 37. This process is performed, for example, when the title of the content has been changed while the list of the contents and lower-level folders collected in the folder selected by the user on the certain level by selecting the corresponding icon, for example, is being displayed.

At step S401, the grouping section 103 identifies the content whose title is changed.

At step S402, the grouping section 103 determines whether there is a folder that contains the content identified by the process of step S401. More specifically, the grouping section 103 determines whether any of the lower-level folders collected in the folder selected by the user by selecting the corresponding icon, for example, contains the content identified by the process of step S401 as the content whose title is to be changed. For example, suppose that the list of the contents and third-level folders (i.e., the folders 421 to 423) corresponding to the second-level icon 414 selected by the user is being displayed. In this case, it is determined whether the content whose title is to be changed is contained in any of the third-level folders 421 to 423.

If it is determined at step S402 that there is a folder that contains the content, control proceeds to step S403.

At step S403, the grouping section 103 deletes the content in question (i.e., the content identified by the process of step S401) from that folder.

At step S404, the grouping section 103 subtracts one from the number of contents in that folder. As a result, the "Number of Titles" part of the folder additional information of the folder will be changed. Moreover, the start time or end time in the folder additional information of the folder is also changed as necessary.

At step S405, the grouping section 103 determines whether or not the number of contents in the folder is one or greater. That is, it is determined whether or not the number of contents collected in the folder is one or greater (i.e., whether or not the number of contents collected in the folder is zero) after the content is deleted from the folder by the process of step S403, for example.

If it is determined at step S405 that the number of contents is not one or greater (i.e., the number of contents is zero), control proceeds to step S406. At step S406, the grouping section 103 deletes the folder.

Meanwhile, if it is determined at step S405 that the number of contents is one or greater, control proceeds to step S407, skipping step S406.

If it is determined at step S402 that there is no folder that contains the content, control proceeds to step S407, skipping steps S403 to S406.

At step S407, the EPG data acquisition section 101 extracts the EPG title data of the title-changed content, and supplies the EPG title data to the group separation section 102 via the control section 105.

At step S408, the group separation section 102 performs the group separation process based on the EPG title data extracted at step S407. This process is the same as the process as described above with reference to FIG. 4, and a detailed description thereof is omitted. As a result of this process, the character sequence of the EPG title data is separated into different groups based on the predetermined mark keywords.

At step S409, the grouping section 103 determines whether there is a folder that corresponds with the character sequence of the EPG title data, which has been subjected to the group separation by the process of step S408. More specifically, the grouping section 103 determines whether any of the lower-level folders collected in the folder selected by the user by selecting the corresponding icon, for example, corresponds with the character sequence of the EPG title data. For example, suppose that the user has selected the icon 414 on the second level, and the list of the contents and third-level folders (i.e., the folders 421 to 423) corresponding to the icon 414 is being displayed. In this case, the grouping section 103 determines whether any of the third-level folders 421 to 423 corresponds with the character sequence of the EPG title data.

If it is determined at step S409 that there is the corresponding folder, control proceeds to step S410.

At step S410, the grouping section 103 determines whether the corresponding folder found by the process of step S409 contains any lower-level folder, thereby determining whether there is a next level. If it is determined at step S410 that there is the next level, control proceeds to step S411, and moves to the next level (i.e., the subordinate level). Then, control returns to step S409.

If it is determined at step S409 that there is no corresponding folder, control proceeds to step S412. At step S412, it is determined whether information for identifying the folder that has been determined by the process of step S409 to correspond with the character sequence of the EPG title data has been obtained.

If it is determined at step S412 that the information for identifying the folder that has been determined to correspond with the character sequence of the EPG title data has been obtained, control proceeds to step S413. At step S413, the grouping section 103 adds the content to the folder that corresponds with the character sequence of the EPG title data. That is, the number of contents collected in this folder increases by one.

At step S414, the grouping section 103 adds one to the number of contents collected in this folder. As a result, the "Number of Titles" part of the folder additional information of this folder is changed. Moreover, the start time or end time in the folder additional information of the folder is also changed as necessary.

If it is determined at step S412 that the information for identifying the folder that has been determined to correspond with the character sequence of the EPG title data has not been obtained, control proceeds to step S415, skipping steps S413 and S414.

After the process of step S414, or if it is determined at step S412 that the information for identifying the folder that has been determined to correspond with the character sequence of the EPG title data has not been obtained, or if it is determined at step S410 that there is not the next level, control proceeds to step S415.

Note that if it is determined at step S412 that the information for identifying the folder that has been determined to correspond with the character sequence of the EPG title data has not been obtained, that means that there is no folder that corresponds with the character sequence of the EPG title data, and accordingly, the title-changed content is not added to any folder and instead displayed on its own.

If it is determined at step S402 that there is no folder that contains the content, that means that the content has not been contained in any folder but has been displayed along with the corresponding thumbnail or the like, and therefore the display is not changed in connection with the folders, but on the display, the content is deleted together with the corresponding thumbnail or the like, or the title of the content is changed.

At step S415, the display on the screen is changed. As a result, the display screen as shown in FIG. 27 is changed into the state as shown in FIG. 36, as described above, for example.

The content title changing process is performed in the above-described manner.

Thus, the user-friendly manner of displaying the list of contents is achieved.

Note that the above-described series of processes may be implemented in either hardware or software. In the case where the above-described series of processes is implemented in software, a program that constitutes the software is installed, from a network or a storage medium, into a computer having a dedicated hardware structure or a general-purpose personal computer 700 as shown in FIG. 38, for example, which becomes capable of performing various functions when various programs are installed thereon.

Figure 38:
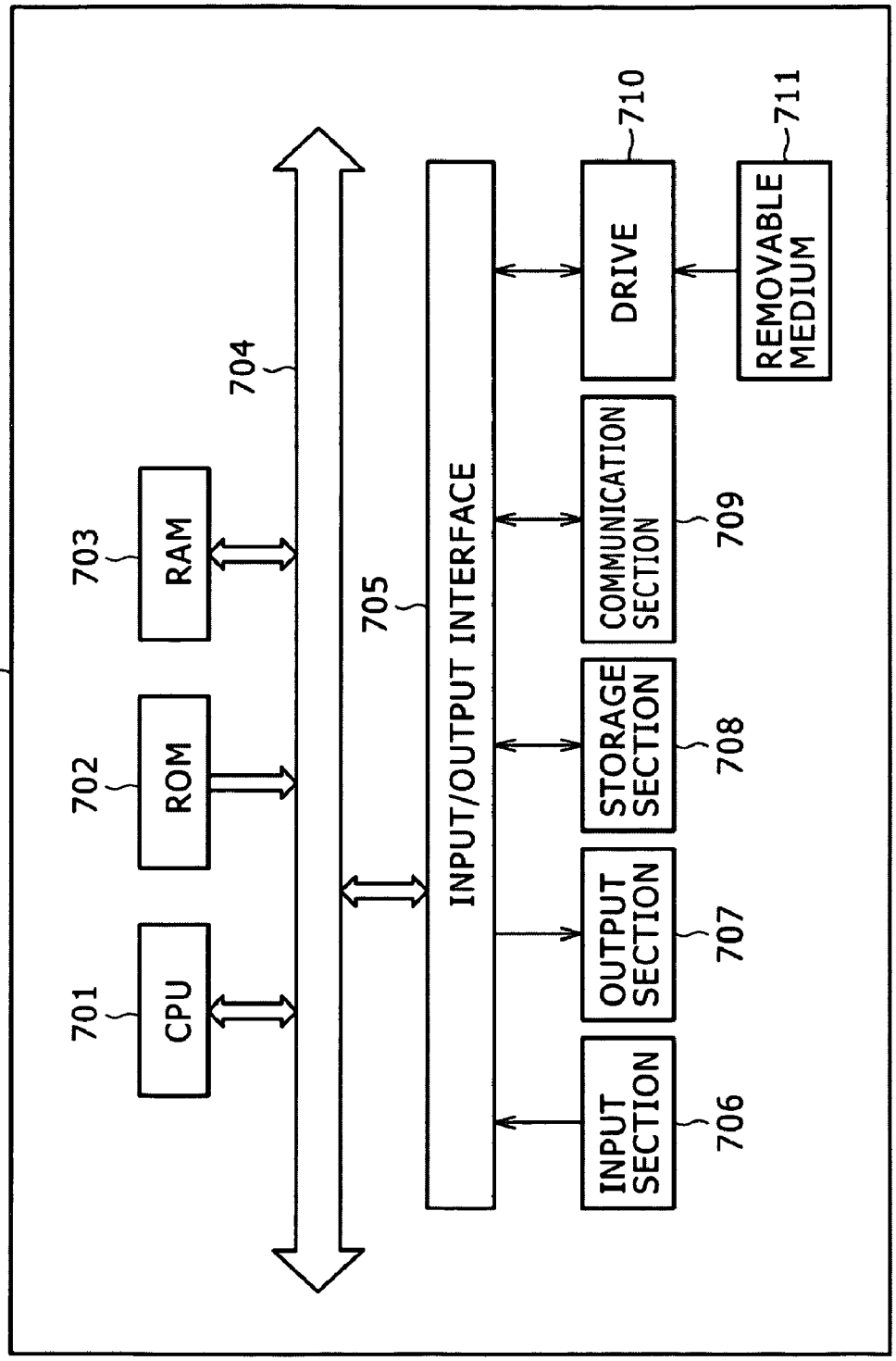
FIG. 38 is a block diagram illustrating an exemplary structure of a personal computer.

In FIG. 38, a central processing unit (CPU) 701 performs various processes in accordance with a program stored in a read only memory (ROM) 702 or a program loaded from a storage section 708 into a random access memory (RAM) 703. In the RAM 703, data that is necessary when the CPU 701 performs the various processes and so on are also stored as appropriate.

The CPU 701, the ROM 702, and the RAM 703 are connected to one another via a bus 704. An input/output interface 705 is also connected to the bus 704.

To the input/output interface 705 are connected: an input section 706, which is formed by a keyboard, a mouse, and the like; an output section 707, which is formed by a display, such as a cathode ray tube (CRT) or a liquid crystal display (LCD), a loudspeaker, and the like; the storage section 708, which is formed by a hard disk or the like; and a communication section 709, which is formed by a modem, a network interface card such as an LAN card, or the like. The communication section 709 performs a communication process via the network such as the Internet.

A drive 710 is also connected to the input/output interface 705 as necessary. A removable medium 711, such as a magnetic disk, an optical disk, a magneto-optical disk, or a semiconductor memory, is mounted on the drive 710 as appropriate. A computer program read from the removable medium 711 is installed into the storage section 708 as necessary.

In the case where the above-described series of processes is implemented in software, the program that constitutes the software is installed from the network, such as the Internet, or the storage medium, such as the removable medium 711.

Note that this storage medium is not limited to the removable medium 711 having the program stored therein as illustrated in FIG. 38, which is delivered separately from the apparatus for providing the program to the user. Examples of the removable medium 711 include the magnetic disk (including a floppy disk (registered trademark)), the optical disk (including a compact disk-read only memory (CD-ROM) and a digital versatile disk (DVD)), the magneto-optical disk (including a Mini-Disk (MD) (registered trademark)), and the semiconductor memory. Alternatively, the storage medium may be the ROM 702, the hard disk or the like contained in the storage section 708, or the like, which has the program stored therein and is delivered to the user together with the apparatus that contains them.

Note that the steps of the above-described series of processes as described above in the present specification may be performed chronologically in the orders as described above, but do not need to be performed chronologically. Some steps may be performed in parallel or independently of one another.

It should be understood by those skilled in the art that various modifications, combinations, sub-combinations and alterations may occur depending on design requirements and other factors insofar as they are within the scope of the appended claims or the equivalents thereof.

What is claimed is:

1. A data processing apparatus that sets identification information for identifying each of a plurality of contents based on metadata added to each of the contents, the apparatus comprising:
    title information acquisition means for acquiring title information of each of the contents, the title information concerning a title of the content and being included in the metadata;
    information extraction means for comparing the title information of each of the contents to extract a part of the title information that is common to all of the contents;
    identification information setting means for setting the identification information of each of the contents based on the other part of the title information that is not the part of the title information that is common to all of the contents; and
    title information separating means for separating the title information of each of the contents into a plurality of pieces of unit information,
    wherein said information extraction means compares the pieces of unit information of the title information of each of the contents to extract unit information common to different ones of the contents, the common unit information being extracted to form a visually recognizable hierarchy.

2. The data processing apparatus according to claim 1 wherein
    said identification information setting means sets the identification information of each of the contents based on unit information that has not been extracted by said information extraction means from the pieces of unit information of the title information of the content.

3. The data processing apparatus according to claim 2, wherein said identification information setting means sets, as the identification information of the content, one or more of the pieces of unit information that are not included in the pieces of unit information of the title information of any other content.

4. The data processing apparatus according to claim 2, wherein said identification information setting means sets the identification information of the content based on another piece of information included in the metadata than the title information of the content, if one or more of the pieces of unit information that are not included in the pieces of unit information of the title information of any other content satisfy a predetermined condition.

5. The data processing apparatus according to claim 2, wherein said title information separating means includes:
    morphological analysis means for subjecting the title information of each of the contents acquired by said title information acquisition means to morphological analysis; and
    keyword detection means for detecting previously set keywords based on morphemes obtained as a result of the morphological analysis by the morphological analysis means, and
    each of the pieces of unit information is composed of one or more of the keywords detected by the keyword detection means.

6. The data processing apparatus according to claim 2, wherein said title information separating means separates the title information of each of the contents into the pieces of unit information by detecting predetermined keywords previously set.

7. The data processing apparatus according to claim 1, further comprising:
    recording means for recording data of each of the contents; and
    presenting means for presenting a list of the identification information,
    wherein data of a content corresponding to identification information selected from the list of the identification information is read from said recording means.

8. The data processing apparatus according to claim 7, wherein said presenting means presents the identification information of the contents so as to be associated with the common part of the title information extracted by said information extraction means, the identification information corresponding to the title information including the common part of the title information.

9. The data processing apparatus according to claim 1, wherein an upper limit of the number of hierarchical levels concerning the common unit information extracted by said information extraction means so as to form the hierarchy is set by a user.

10. A data processing method employed by a data processing apparatus that sets identification information for identifying each of a plurality of contents based on metadata added to each of the contents, the method comprising the steps of:

acquiring title information of each of the contents, the title information concerning a title of the content and being included in the metadata;

a processor comparing the title information of each of the contents to extract a part of the title information that is common to all of the contents;

setting, in at least one memory, the identification information of each of the contents based on the part of the title information that is not the part of the title information common to all of the contents;

separating the title information of each of the contents into a plurality of pieces of unit information; and comparing the pieces of unit information of the title information of each of the contents to extract unit information common to different ones of the contents, the common unit information being extracted to form a visually recognizable hierarchy.

11. A non-transitory computer-readable medium storing a program for causing a computer to perform a process of setting identification information for identifying each of a plurality of contents based on metadata added to each of the contents, the program causing the computer to function as:

title information acquisition means for acquiring title information of each of the contents, the title information concerning a title of the content and being included in the metadata;

information extraction means for comparing the title information of each of the contents to extract a part of the title information that is common to all of the contents;

identification information setting means for setting the identification information of each of the contents based on the part of the title information that is not the part of the title information common to all of the contents; and title information separating means for separating the title information of each of the contents into a plurality of pieces of unit information, wherein said information extraction means compares the pieces of unit information of the title information of each of the contents to extract unit information common to different ones of the contents, the common unit information being extracted to form a visually recognizable hierarchy.

12. A data processing apparatus that generates print data for printing, on a storage medium, information for identifying a plurality of contents stored in the storage medium, the apparatus comprising:

title acquisition means for acquiring a character sequence denoting a title of each of the contents stored in the storage medium;

title information separating means for separating the title of each of the contents into a plurality of pieces of unit information;

information extraction means for comparing the pieces of unit information of the title of each of the contents to extract unit information common to different ones of the contents, the common unit information being extracted to form a visually recognizable hierarchy; and print data generation means for generating the print data, wherein a part of the character sequence denoting the title of each of the contents, the part being common to all of the contents, is printed in a first area on the storage medium, and the part of the character sequence, denoting the title of each of the contents other than the part of the character sequence common to all of the contents, is printed in a second area on the storage medium.

13. The data processing apparatus according to claim 12, wherein information concerning a date and time associated with each of the contents is additionally printed in the second area.

14. The data processing apparatus according to claim 13, wherein said print data generation means generates print data for additionally printing, in a third area on the storage medium, a character sequence that is generated based on the information concerning the date and time associated with each of the contents.

15. The data processing apparatus according to claim 12, wherein, out of the character sequences printed in the second area, a character sequence that is common to two or more of the contents is printed at a predetermined position in the second area.

16. The data processing apparatus according to claim 12, wherein the contents stored in the storage medium are classified into N sets, the first and second areas on the storage medium are each divided into N parts, with respect to each of the N sets of contents, a part of the character sequence denoting the title of each of the contents, the part being common to all of the contents in the same set, is extracted and printed in a separate one of the N parts of the first area, and with respect to each of the N sets of contents, the other part of the character sequence denoting the title of each of the contents than the part of the character sequence that is common to all of the contents in the same set is printed in a separate one of the N parts of the second area.

17. The data processing apparatus according to claim 12, further comprising printing means for printing the character sequences on the storage medium based on the print data.

18. A data processing apparatus that sets identification information for identifying each of a plurality of contents based on metadata added to each of the contents, the apparatus comprising:

a title information acquisition section configured to acquire title information of each of the contents, the title information concerning a title of the content and being included in the metadata;

an information extraction section configured to compare the title information of each of the contents to extract a part of the title information that is common to all of the contents;

an identification information setting section configured to set the identification information of each of the contents based on the other part of the title information than the part of the title information that is common to all of the contents; and a title information separating section configured to separate the title information of each of the contents into a plurality of pieces of unit information, wherein said information extraction section compares the pieces of unit information of the title information of each of the contents to extract unit information common to different ones of the contents, the common unit information being extracted to form a visually recognizable hierarchy.

19. A data processing apparatus that generates print data for printing, on a storage medium, information for identifying a plurality of contents stored in the storage medium, the apparatus comprising:
- a title acquisition section configured to acquire a character sequence denoting a title of each of the contents stored in the storage medium;
- a title information separating section configured to separate the title of each of the contents into a plurality of pieces of unit information;
- an information extraction section configured to compare the pieces of unit information of the title of each of the contents to extract unit information common to different ones of the contents, the common unit information being extracted to form a visually recognizable hierarchy; and
- a print data generation section configured to generate the print data, wherein
- a part of the character sequence denoting the title of each of the contents, the part being common to all of the contents, is printed in a first area on the storage medium, and
- the part of the character sequence, denoting the title of each of the contents other than the part of the character sequence common to all of the contents, is printed in a second area on the storage medium.

* * * * *